US012752428B2

(12) United States Patent
Wu et al.

(10) Patent No.: US 12,752,428 B2
(45) Date of Patent: Oct. 6, 2026

(54) SYSTEM AND METHOD FOR CALIBRATION OF HUMANOID ROBOTS

(71) Applicant: Figure AI Inc., San Jose, CA (US)

(72) Inventors: Hao Wu, San Jose, CA (US); Louis Foucard, San Jose, CA (US); Christopher Stathis, San Jose, CA (US); Alonso Marco-Valle, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/342,470

(22) Filed: Sep. 26, 2025

(65) Prior Publication Data

US 2026/0084309 A1 Mar. 26, 2026

Related U.S. Application Data

(60) Provisional application No. 63/699,201, filed on Sep. 26, 2024, provisional application No. 63/705,802, (Continued)

(51) Int. Cl.
*B25J 9/00* (2006.01)
*B25J 9/16* (2006.01)
*B25J 19/02* (2006.01)

(52) U.S. Cl.
CPC ............. *B25J 9/1692* (2013.01); *B25J 9/163* (2013.01); *B25J 9/1697* (2013.01); *B25J 19/023* (2013.01)

(58) Field of Classification Search
None
See application file for complete search history.

(56) References Cited

U.S. PATENT DOCUMENTS

| | | | |
|---|---|---|---|
| 5,280,431 | A | 1/1994 | Summerville |
| 5,673,367 | A | 9/1997 | Buckley |

(Continued)

FOREIGN PATENT DOCUMENTS

| | | |
|---|---|---|
| CN | 102357889 | 2/2012 |
| CN | 209615545 | 11/2019 |

(Continued)

OTHER PUBLICATIONS

Pateromichelakis et al., Head-eyes system and gaze analysis of the humanoid robot Romeo, 2014, IEEE, p. 1374-131379 (Year: 2014).

(Continued)

*Primary Examiner* — Truc M Do

(57) ABSTRACT

The present disclosure provides a method for calibrating a humanoid robot, comprising obtaining a humanoid robot with original kinematic biasing values, controlling the humanoid robot through predetermined poses, capturing image data of body parts using vision sensors mounted on the humanoid robot while moving through the poses, determining revised kinematic biasing values by processing the image data using a bipedal spatial perception model trained using synthetic image data containing keypoints, and replacing the original kinematic biasing values with the revised kinematic biasing values. The bipedal spatial perception model processes captured image data to generate observed keypoint locations on robot components, which are compared with kinematic-based locations from joint encoder measurements to minimize discrepancies through optimization algorithms.

10 Claims, 27 Drawing Sheets

Related U.S. Application Data filed on Oct. 10, 2024, provisional application No. 63/763,209, filed on Feb. 25, 2025, provisional application No. 63/772,440, filed on Mar. 14, 2025, provisional application No. 63/706,779, filed on Oct. 14, 2024.

(56) References Cited

U.S. PATENT DOCUMENTS

| | | | | |
|---|---|---|---|---|
| 7,024,276 | B2 | 4/2006 | Ito | |
| 7,072,741 | B2 | 7/2006 | Nagashima | |
| 7,308,336 | B2 | 12/2007 | Takenaka | |
| 7,319,918 | B2 | 1/2008 | Takenaka | |
| 7,386,364 | B2 | 6/2008 | Mikami | |
| 7,664,569 | B2 | 2/2010 | Shimizu | |
| 7,912,574 | B2 | 3/2011 | Wurman | |
| D641,808 | S | 7/2011 | Matsuda | |
| 8,224,652 | B2 | 7/2012 | Wang | |
| D677,743 | S | 3/2013 | Koshiishi | |
| D687,908 | S | 8/2013 | Hoang | |
| D689,566 | S | 9/2013 | Wong | |
| 8,676,381 | B2 | 3/2014 | Kwon | |
| 8,942,848 | B2 | 1/2015 | Pratt | |
| 8,942,849 | B2 | 1/2015 | Maisonnier | |
| 9,205,560 | B1 | 12/2015 | Edsinger | |
| 9,302,393 | B1 | 4/2016 | Rosen | |
| 9,448,560 | B2 | 9/2016 | D'Andrea | |
| 9,494,415 | B2 | 11/2016 | Sweetser | |
| 9,569,976 | B2 | 2/2017 | Krauss | |
| D794,692 | S | 8/2017 | Haranaka | |
| D795,320 | S | 8/2017 | Liu | |
| D795,321 | S | 8/2017 | Liu | |
| 9,789,607 | B1 | 10/2017 | Whitman | |
| 9,842,585 | B2 | 12/2017 | Huang | |
| 9,868,210 | B1 | 1/2018 | Whitman | |
| D835,214 | S | 12/2018 | Xiong | |
| D838,759 | S | 1/2019 | Kowalski | |
| D841,708 | S | 2/2019 | Koshiishi | |
| 10,203,209 | B2 | 2/2019 | Roumeliotis | |
| 10,349,245 | B2 | 7/2019 | Tokuchi | |
| D866,684 | S | 11/2019 | Früh | |
| D868,866 | S | 12/2019 | Gable | |
| D872,152 | S | 1/2020 | Xiong | |
| D873,320 | S | 1/2020 | Clerc | |
| 10,545,497 | B1 | 1/2020 | Cui | |
| 10,571,896 | B2 | 2/2020 | Benaim | |
| D885,451 | S | 5/2020 | Chen | |
| D888,120 | S | 6/2020 | Hurst | |
| D892,886 | S | 8/2020 | Klassen | |
| D892,887 | S | 8/2020 | Klassen | |
| D893,573 | S | 8/2020 | Yan | |
| D898,789 | S | 10/2020 | Nazarikhorram | |
| D911,459 | S | 2/2021 | Xiong | |
| 10,946,528 | B2 | 3/2021 | Gupta | |
| 10,960,539 | B1 | 3/2021 | Kalakrishnan | |
| D932,531 | S | 10/2021 | Xu | |
| 11,188,821 | B1 | 11/2021 | Kalakrishnan | |
| 11,247,738 | B2 | 2/2022 | Lavalley | |
| 11,416,003 | B2 | 8/2022 | Whitman | |
| 11,498,223 | B2 | 11/2022 | Williams | |
| 11,546,504 | B2 | 1/2023 | Kim | |
| 11,600,010 | B2 | 3/2023 | Doutre | |
| D985,643 | S | 5/2023 | Li | |
| 11,645,444 | B2 | 5/2023 | Scheutz | |
| 11,736,677 | B2 | 8/2023 | Grunnet-Jepsen | |
| 11,833,680 | B2 | 12/2023 | Deits | |
| 11,851,120 | B2 | 12/2023 | Fay | |
| 11,999,423 | B2 | 6/2024 | Whitman | |
| 12,054,208 | B2 | 8/2024 | Swilling | |
| 12,070,863 | B2 | 8/2024 | Whitman | |
| 12,077,229 | B2 | 9/2024 | Whitman | |
| 12,097,626 | B2 | 9/2024 | Ikeda | |
| D1,051,193 | S | 11/2024 | Mahoor | |
| 12,134,181 | B2 | 11/2024 | Klingensmith | |
| 12,172,537 | B2 | 12/2024 | Gonano | |
| 12,205,214 | B2 | 1/2025 | Starke | |
| 12,214,497 | B2 | 2/2025 | Whitman | |
| 12,235,652 | B2 | 2/2025 | Whitman | |
| 12,240,117 | B2 | 3/2025 | Chebotar | |
| D1,069,875 | S | 4/2025 | Belon | |
| 12,290,940 | B1 | 5/2025 | Abate | |
| D1,082,881 | S | 7/2025 | Wang | |
| 12,365,094 | B2 | 7/2025 | Mccall | |
| 12,403,611 | B2 | 9/2025 | Mccall | |
| 12,466,075 | B2 * | 11/2025 | Stathis | B25J 9/1697 |
| 12,472,641 | B1 * | 11/2025 | Raaj | B25J 13/089 |
| 12,482,243 | B1 * | 11/2025 | Cass | G06V 10/774 |
| 12,515,706 | B2 | 1/2026 | Li | |
| 2002/0103576 | A1 | 8/2002 | Takamura | |
| 2003/0060930 | A1 | 3/2003 | Fujita | |
| 2004/0015265 | A1 | 1/2004 | Asano | |
| 2004/0019485 | A1 | 1/2004 | Kobayashi | |
| 2004/0039483 | A1 | 2/2004 | Kemp | |
| 2004/0230340 | A1 * | 11/2004 | Fukuchi | G05D 1/2469 318/568.12 |
| 2006/0217838 | A1 | 9/2006 | Sugino | |
| 2009/0059033 | A1 | 3/2009 | Shimada | |
| 2010/0280662 | A1 | 11/2010 | Abdallah | |
| 2011/0058800 | A1 | 3/2011 | Lee | |
| 2011/0071671 | A1 | 3/2011 | Ihrke | |
| 2012/0072215 | A1 | 3/2012 | Yu | |
| 2012/0078419 | A1 | 3/2012 | Kim | |
| 2012/0155775 | A1 * | 6/2012 | Ahn | G05D 1/0272 701/527 |
| 2012/0215539 | A1 | 8/2012 | Juneja | |
| 2012/0310412 | A1 | 12/2012 | Seo | |
| 2013/0175816 | A1 | 7/2013 | Kawasaki | |
| 2013/0345863 | A1 | 12/2013 | Linder | |
| 2014/0039675 | A1 | 2/2014 | Ead | |
| 2014/0316566 | A1 | 10/2014 | Mazel | |
| 2015/0192399 | A1 | 7/2015 | Raab | |
| 2015/0290795 | A1 | 10/2015 | Oleynik | |
| 2016/0008988 | A1 | 1/2016 | Kennedy | |
| 2016/0064263 | A1 | 3/2016 | Hosek | |
| 2017/0028551 | A1 | 2/2017 | Hemken | |
| 2017/0028563 | A1 | 2/2017 | Hemken | |
| 2017/0080582 | A1 | 3/2017 | Mugnier | |
| 2017/0125008 | A1 | 5/2017 | Maisonnier | |
| 2017/0326736 | A1 | 11/2017 | Nagatsuka | |
| 2018/0136912 | A1 | 5/2018 | Venkataramani | |
| 2018/0182260 | A1 | 6/2018 | Ciniello | |
| 2018/0232201 | A1 | 8/2018 | Holtmann | |
| 2018/0357552 | A1 | 12/2018 | Campos | |
| 2019/0005374 | A1 | 1/2019 | Shankar | |
| 2019/0079924 | A1 | 3/2019 | Sugiura | |
| 2019/0100263 | A1 | 4/2019 | Amino | |
| 2019/0130896 | A1 | 5/2019 | Zhou | |
| 2019/0163985 | A1 | 5/2019 | Wang | |
| 2019/0329413 | A1 | 10/2019 | Johnson | |
| 2019/0371307 | A1 | 12/2019 | Zhao | |
| 2020/0009739 | A1 | 1/2020 | Moon | |
| 2020/0086479 | A1 | 3/2020 | Messier | |
| 2020/0114506 | A1 | 4/2020 | Toshev | |
| 2020/0117214 | A1 * | 4/2020 | Jonak | G06T 7/13 |
| 2020/0117336 | A1 | 4/2020 | Mani | |
| 2021/0181716 | A1 | 6/2021 | Quinlan | |
| 2021/0331313 | A1 * | 10/2021 | Klingensmith | B25J 13/006 |
| 2021/0387346 | A1 | 12/2021 | Gillett | |
| 2021/0390420 | A1 | 12/2021 | Barnett | |
| 2022/0226996 | A1 | 7/2022 | Ishizuka | |
| 2022/0294062 | A1 | 9/2022 | Kamon | |
| 2022/0390952 | A1 | 12/2022 | Yu | |
| 2022/0410380 | A1 | 12/2022 | Lu | |
| 2023/0048725 | A1 | 2/2023 | Barbour | |
| 2023/0126906 | A1 | 4/2023 | Kranski | |
| 2023/0143315 | A1 | 5/2023 | Whitman | |
| 2023/0168921 | A1 | 6/2023 | Kim | |
| 2023/0173683 | A1 | 6/2023 | Gomez | |
| 2023/0182296 | A1 | 6/2023 | Sermanet | |
| 2023/0222454 | A1 | 7/2023 | Cella | |
| 2023/0306302 | A1 | 9/2023 | Mori | |
| 2023/0347514 | A1 | 11/2023 | Xiao | |
| 2023/0390948 | A1 | 12/2023 | Hsu | |
| 2024/0091964 | A1 | 3/2024 | Smith | |

(56) References Cited

U.S. PATENT DOCUMENTS

| | | | | |
|---|---|---|---|---|
| 2024/0095077 | A1 | 3/2024 | Singh | |
| 2024/0181637 | A1 | 6/2024 | Gillett | |
| 2024/0193848 | A1 | 6/2024 | Wang | |
| 2024/0199068 | A1 | 6/2024 | Pavone | |
| 2024/0217104 | A1 | 7/2024 | Neville | |
| 2024/0228191 | A1 | 7/2024 | Kumar | |
| 2024/0289973 | A1* | 8/2024 | Liu | A61F 2/6607 |
| 2025/0018583 | A1 | 1/2025 | Monti | |
| 2025/0050507 | A1 | 2/2025 | Camasmie | |
| 2025/0103064 | A1 | 3/2025 | Shan | |
| 2025/0147517 | A1 | 5/2025 | Swilling | |
| 2025/0196326 | A1 | 6/2025 | Katz | |
| 2025/0196327 | A1 | 6/2025 | Geating | |
| 2025/0218160 | A1 | 7/2025 | Wang | |
| 2026/0016809 | A1 | 1/2026 | Shu-Xing Cheng | |

FOREIGN PATENT DOCUMENTS

| | | | |
|---|---|---|---|
| CN | 210998685 | | 7/2020 |
| CN | 115649316 | | 1/2023 |
| CN | 218802294 | | 4/2023 |
| CN | 117301022 | | 12/2023 |
| CN | 117462367 | | 1/2024 |
| CN | 118809620 | A | 10/2024 |
| KR | 3020240036125 | | 9/2024 |
| SU | 1734994 | | 5/1992 |
| WO | 2023107501 | | 6/2023 |
| WO | 2023110778 | | 6/2023 |
| WO | 2023246994 | | 12/2023 |
| WO | 2023246995 | | 12/2023 |
| WO | 2024058844 | | 3/2024 |
| WO | 2024085904 | | 4/2024 |
| WO | 2024112350 | | 5/2024 |
| WO | 2024112351 | | 5/2024 |
| WO | 2024123766 | | 6/2024 |
| WO | 2024163992 | | 8/2024 |
| WO | 2025019583 | | 1/2025 |
| WO | 2025042802 | | 2/2025 |
| WO | 2025072321 | | 4/2025 |

OTHER PUBLICATIONS

Pateromichelakis et al., Head-eyes system and gaze analysis of the humanoid robot Romeo, 2014, IEEE, p. 1374-1379 (Year: 2014).
Peng et al., "DeepMimic: Example-Guided Deep Reinforcement Learning of Physics-Based Character Skills," ACM Trans. Graph., vol. 37, No. 4, Article 143. Publication date: Aug. 2018.
Pirk, Sören, et al. "Online object representations with contrastive learning." arXiv preprint arXiv:1906.04312 (Jun. 10, 2019).
Radford et al., "Improving Language Understanding by Generative Pre-Training," 2018.
Radford et al., "Language Models are Unsupervised Multitask Learners," 2019.
Radford et al., "Learning Transferable Visual Models From Natural Language Supervision," Proceedings of the 38 th International Conference on Machine Learning, PMLR 139, 2021.
Raffel et al., "Exploring the Limits of Transfer Learning with a Unified Text-to-Text Transformer," Journal of Machine Learning Research 21 (2020) 1-67.
Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).
Rombach et al., "High-Resolution Image Synthesis with Latent Diffusion Models," IEEE Xplore (2022).
Sanh et al., "DistilBERT, a distilled version of BERT: smaller, faster, cheaper and lighter," arXiv:1910.01108v4 (Mar. 1, 2020).
Schulman et al., "Proximal Policy Optimization Algorithms," arXiv:1707.06347v2 (Aug. 28, 2017).
Sermanet, Pierre, et al. "Time-contrastive networks: Self-supervised learning from video." 2018 IEEE international conference on robotics and automation (ICRA). IEEE, (Mar. 20, 2018).
Sharma et al., "Third-Person Visual Imitation Learning via Decoupled Hierarchical Controller," 33rd Conference on Neural Information Processing Systems (NeurIPS 2019), Vancouver, Canada.
Sieb et al., "Graph-Structured Visual Imitation," 3rd Conference on Robot Learning (CoRL 2019), Osaka, Japan. (May 12, 2020).
Smith et al., "AVID: Learning Multi-Stage Tasks via Pixel-Level Translation of Human Videos," arXiv:1912.04443v3 (Jun. 21, 2020).
Stadie et al., "Third-Person Imitation Learning," arXiv:1703.01703v2 (Sep. 22, 2019).
Sun et al., "Learning by Watching via Keypoint Extraction and Imitation Learning," Machines 2022, 10, 1049. https://doi.org/10.3390/machines10111049 (Nov. 9, 2022).
Team, Octo Model, et al. "Octo: An open-source generalist robot policy." arXiv preprint arXiv:2405.12213 (May 20, 2024).
Touvron et al., "Llama 2: Open Foundation and Fine-Tuned Chat Models," arXiv:2307.09288v2 (Jul. 19, 2023).
Vaswani et al., "Attention Is All You Need," 31st Conference on Neural Information Processing Systems (NIPS 2017), Long Beach, CA, USA. (Jun. 12, 2017).
Wang et al., "Structbert: Incorporating Language Structures Into Pre-Training for Deep Language Understanding,," arXiv:1908.04577v3 (Sep. 27, 2019).
Wiedebach, Georg, et al. "Walking on partial footholds including line contacts with the humanoid robot atlas." 2016 IEEE-RAS 16th International Conference on Humanoid Robots (Humanoids). IEEE, 2016.
Xiong et al., "Learning by Watching: Physical Imitation of Manipulation Skills from Human Videos," arXiv:2101.07241v2 (Nov. 14, 2021).
Yaghoubi et al., Region-Based CNNs for Pedestrian Gender Recognition in Visual Surveillance Environments, 2019, IEEE, p. 1-5 (Year: 2019).
Yao et al., "Filip: Fine-Grained Interactive Language-Image Pre-Training," arXiv:2111.07783v1 (Nov. 9, 2021).
Yin et al., "A Survey on Multimodal Large Language Models," arXiv:2306.13549v2 (Apr. 1, 2024).
Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).
Zhang et al., "Llama-Adapter: Efficient Fine-Tuning of Large Language Models With Zero-Initialized Attention," arXiv:2303.16199v3 (Sep. 18, 2024).
Zhang et al., "MM-LLMs: Recent Advances in MultiModal Large Language Models," arXiv:2401.13601v5 (May 28, 2024).
Zhou et al., "Watch, Try, Learn: Meta-Learning From Demonstrations and Rewards," arXiv:1906.03352v4 (Jan. 30, 2020).
Zitkovich, Brianna, et al. "Rt-2: Vision-language-action models transfer web knowledge to robotic control." Conference on Robot Learning. PMLR, (Jul. 28, 2023).
Online Hierarchical Optimization for Humanoid Control (Year: 2016).
A Resilient and Energy-Aware Task Allocation Framework for Heterogeneous Multi-Robot Systems (Year: 2021).
Jiang et al. "Active Retrieval Augmented Generation," Dec 6-10, 2023, Proceedings of the 2023 Conference on Empirical Methods in Natural Language Processing, pp. 7969-7992. (Year: 2023).
Tian et al. "Design of a Flexible Articulated Robotic Hand for a Humanoid Robot," Oct. 15-17, 2019, 2019 IEEE-RAS 19th International Conference on Humanoid Robots (Humanoids), pp. 572-577. (Year: 2019).
Albers et al., Upper Body of a new Humanoid Robot—the Design of Armar III, 2006, IEEE, p. 308-309 (Year: 2006).
Available online at https://www.youtube.com/watch?v=-9EM5_VFIt8, at least as early as Apr. 16, 2024.
Available online at https://www.youtube.com/watch?v=-HizP4UQvug, at least as early as Apr. 25, 2024.
Available online at https://youtu.be/SS3Ga2HQQ0s?si=Dwr3sJuCsOeUoSLj, at least as early as Nov. 20, 2023.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.

(56) References Cited

OTHER PUBLICATIONS

Available online at https://www.youtube.com/watch?v=20GHG-R9eFI, at least as early as Mar. 6, 2023.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=B_I2k7MZEKg, at least as early as Jun. 30, 2024.
Available online at https://www.youtube.com/watch?v=bdVrWxjK2vo, at least as early as Sep. 17, 2024.
Available online at https://www.youtube.com/watch?v=Bmglbk_Op64&t=1s, at least as early as Nov. 10, 2011.
Available online at https://www.youtube.com/watch?v=bUrLuUxv9gE, at least as early as Aug. 30, 2024.
Available online at https://www.youtube.com/watch?v=CbA9wA9etGA, at least as early as Sep. 19, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://www.youtube.com/watch?v=IE-YBaYjbqY, at least as early as Dec. 10, 2013.
Available online at https://www.youtube.com/watch?v=ioOkbUQqmZ0, at least as early as Nov. 9, 2022.
Available online at https://www.youtube.com/watch?v=jWTWWuzB6Cg, at least as early as Aug. 27, 2024.
Available online at https://www.youtube.com/watch?v=LBem19AmTT4, at least as early as Apr. 7, 2015.
Available online at https://www.youtube.com/watch?v=MCbGeC-kuBM, at least as early as Aug. 5, 2024.
Available online at https://www.youtube.com/watch?v=oXBYZxa25vc&t=1s, at least as early as Apr. 3, 2013.
Available online at https://www.youtube.com/watch?v=q8ldbodRG14, at least as early as Feb. 26, 2024.
Available online at https://www.youtube.com/watch?v=q8ldbodRG14, at least as early as May 22, 2019.
Available online at https://www.youtube.com/watch?v=ujdK3yd2gHY, at least as early as Jul. 2, 2024.
Available online at https://www.youtube.com/watch?v=UPOLcE1vwA0, at least as early as Apr. 28, 2016.
Available online at https://www.youtube.com/watch?v=y-j4dixQQml&t=222s, at least as early as May 22, 2012.
Available online at https://www.youtube.com/watch?v=yBmatGQ0giY&t=1s, at least as early as Aug. 11, 2022.
Available online at https://www.youtube.com/watch?v=zkBnFPBV3f0, at least as early as Jul. 11, 2013.
Available online at https://www.youtube.com/watch?v=zLhA-RWBBYU, at least as early as Jul. 5, 2024.
Available online at https://youtu.be/_MBd_XfXy9M?si=PbEHUJpRUFqaxS3J, at least as early as Jun. 26, 2023.
Available online at https://youtu.be/BNSZ8Fwcd20?si=_YnVgjYblVuhASk1, at least as early as Oct. 27, 2023.
Available online at https://youtu.be/BvFxD-8AhJA?si=Vx1F4a76tbQDUX48, at least as early as Nov. 16, 2023.
Available online at https://youtu.be/cpraXaw7dyc?si=JvPaT6eMA18psrmU, at least as early as Dec. 13, 2023.
Available online at https://youtu.be/GtPs_ygfaEA?si=7lv6MEFvFoaacKfa, at least as early as Aug. 15, 2023.
Available online at https://youtu.be/SHPxcRBIXN0?si=VbJqbK7jzUqtZGmn, at least as early as Sep. 26, 2023.
Available online at https://youtu.be/sih1DeJ4Hmk?si=fJsKpvRFPzFejmS6, at least as early as Dec. 27, 2023.
Available online at https://youtu.be/XiQkeWOFwmk?si=1qOPC8gXgmmGvXRT, at least as early as May 16, 2023.
Barker et al., Natural head movement for HRI with a muscular-skeletal head and neck robot, 2017, IEEE, p. 587-592 (Year: 2017).
Brohan, Anthony, et al. "Rt-1: Robotics transformer for real-world control at scale." arXiv preprint arXiv:2212.06817 (Dec. 13, 2022).
Brown et al., "Language Models are Few-Shot Learners," arXiv:2005.14165v4 (Jul. 22, 2020).
Calvert, Duncan, et al. "A fast, autonomous, bipedal walking behavior over rapid regions." 2022 IEEE-RAS 21st International Conference on Humanoid Robots (Humanoids). IEEE, 2022.
Chang et al., "A Survey on Evaluation of Large Language Models," ACM Trans. Intell. Syst. Technol., vol. 15, No. 3, Article 39. (Mar. 2024).
Chen et al., "InternVL: Scaling up Vision Foundation Models and Aligning for Generic Visual-Linguistic Tasks," https://github.com/OpenGVLab/InternVL (2024).
Cheng et al., "Human Posture Estimation Using Voxel Data for "Smart" Airbag Systems: Issues and Framework," IEEE, p. 84-89 (2004).
Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.
Ding, M., Yang, Z., Hong, W., Zheng, W., Zhou, C., Yin, D., & Tang, J. (2021). Cogview: Mastering text-to-image generation via transformers. arXiv:2105.13290v3. (Year: 2021).
Ding, Tianli, et al. "Goalseye: Learning high speed precision table tennis on a physical robot." arXiv preprint arXiv:2210.03662 (Oct. 13, 2022).
Driess, Danny, et al. "Palm-e: An embodied multimodal language model." (Mar. 6, 2023).
Droeschel et al., "Learning to Interpret Pointing Gestures with a Time-of-Flight Camera," IEEE, p. 481-488 (2011).
Dwibedi, Debidatta, et al. "Learning actionable representations from visual observations." 2018 IEEE/RSJ international conference on intelligent robots and systems (IROS). IEEE, Feb. 2, 2018).
English Translation of CN-118809620-A (Year: 2024).
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Frohlich et al., "Design and Impementation of a Spherical Joint for Mobile Manipulators," IEEE, p. 251-258 (2016).
Gao et al., Development of a low motion-noise humanoid neck: Statics analysis and experimental validation, 2010, IEEE, p. 1203-1208 (Year: 2010).
Garcia, Gabriel, Robert Griffin, and Jerry Pratt. "0-step capturability, motion decomposition and global feedback control of the 3D variable height-inverted pendulum." arXiv preprint arXiv:1912.06078 (2019).
Gia et al., "Densely Connected Feature Pyramid Network for Image Segmentation," 2020 8th International Conference on Digital Home (ICDH).
Griffin, Robert J., et al. "Capture point trajectories for reduced knee bend using step time optimization." 2017 IEEE-RAS 17th International Conference on Humanoid Robotics (Humanoids). IEEE, 2017.
Griffin, Robert J., et al. "Footstep planning for autonomous walking over rough terrain." 2019 IEEE-RAS 19th international conference on humanoid robots (humanoids). IEEE, 2019.
Griffin, Robert J., et al. "Straight-leg walking through underconstrained whole-body control." 2018 IEEE International Conference on Robotics and Automation (ICRA). IEEE, 2018.
Griffin, Robert J., et al. "Walking stabilization using step timing and location adjustment on the humanoid robot, atlas." 2017 IEEE/RSJ International Conference on Intelligent Robots and Systems (IROS). IEEE, 2017.
Gupta, Abhishek, et al. "Bootstrapped autonomous practicing via multi-task reinforcement learning." arXiv preprint arXiv:2203.15755 (Mar. 29, 2022).
Gupta, Abhishek, et al. "Relay policy learning: Solving long-horizon tasks via imitation and reinforcement learning." arXiv preprint arXiv:1910.11956 (Oct. 25, 2019).

(56) References Cited

OTHER PUBLICATIONS

Haddadin et al., The "DLR crash report": Towards a standard crash-testing protocol for robot safety—Part II: Discussions, 2009, IEEE, p. 280-287 (Year: 2009).
Hebi Robotics, "T-Series Actuator," Jan. 29, 2024.
Heravi, Negin, et al. "Visuomotor control in multi-object scenes using object-aware representations." arXiv preprint arXiv:2205.06333 (May 12, 2022).
Jang, Eric, et al. "Bc-z: Zero-shot task generalization with robotic imitation learning." Conference on Robot Learning. PMLR, (Feb. 4, 2022).
Jeung et al., Realization of human neck motion with novel robotic mechanism, 2016, IEEE, p. 482-486 (Year: 2016).
Jin et al., "Unified Language-Vision Pretraining in LLM With Dynamic Discrete Visual Tokenization," arXiv:2309.04669v3 [cs.CV] Mar. 22, 2024.
Keselman et al., "Intel RealSense stereoscopic depth cameras," in Proceedings of the IEEE Conference on Computer Vision and Pattern Recognition Workshops, pp. 1-10, 2017.
Kim et al., "Giving Robots a Hand: Learning Generalizable Manipulation with Eye-in-Hand Human Video Demonstrations," arXiv:2307.05959v1 (Jul. 12, 2023).
Kim et al., "Parallel Feature Pyramid Network for Object Detection," ECCV 2018.
Kim, Moo Jin, et al. "Openvla: An open-source vision-language-action model." arXiv preprint arXiv:2406.09246 (Jun. 13, 2024).
Kirillov et al., "Panoptic Feature Pyramid Networks," IEEE Xplore (2019).
Lee et al., "Learning Robot Activities from First-Person Human Videos Using Convolutional Future Regression," IEEE Xplore (2017).
Li et al., "Supervision Exists Everywhere: a Data Efficient Contrastive Language-Image Pre-Training Paradigm," arXiv:2110.05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lim et al., Basic emotional walking using a biped humanoid robot, 1999, IEEE, p. 954-959 (Year: 1999).
Lin et al., "Feature Pyramid Networks for Object Detection," IEEE Xplore (2017).
Lin et al., "Feature Pyramid Networks for Object Detection," IEEE Xplore (2024).
Lin et al., "VILA: On Pre-training for Visual Language Models," https://github.com/Efficient-Large-Model/VILA (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).
Liu et al., "Improved Baselines with Visual Instruction Tuning," IEEE Xplore (2024).
Liu et al., "ROBERTa: A Robustly Optimized BERT Pretraining Approach," arXiv:1907.11692v1 (Jul. 26, 2019).
Liu et al., "Visual Instruction Tuning," 37th Conference on Neural Information Processing Systems (NeurIPS 2023).
Lynch, Corey, and Pierre Sermanet. "Language conditioned imitation learning over unstructured data." arXiv preprint arXiv:2005.07648 (Jul. 7, 2020).
Lynch, Corey, et al. "Interactive language: Talking to robots in real time." IEEE Robotics and Automation Letters (Oct. 12, 2023).
Lynch, Corey, et al. "Learning latent plans from play." Conference on robot learning. PMLR, (Dec. 20, 2020).
Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).
Mandi et al., "Towards More Generalizable One-shot Visual Imitation Learning," bencharXiv:2110.13423v2 [cs.RO] Feb. 8, 2022.
Maniparambil et al., "Do Vision and Language Encoders Represent the World Similarly?" IEEE Xplore (2024).
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
Mokhtari et al., Taban:A Retro-Projected Social Robotic—Head for Human-Robot Interaction, 2019, IEEE, p. 46-51 (Year: 2019).
N. Vahrenkamp, S. Wieland, P. Azad, D. Gonzalez, T. Asfour and R. Dillmann, "Visual servoing for humanoid grasping and manipulation tasks," Humanoids 2008—8th IEEE-RAS International Conference on Humanoid Robots, Daejeon, Korea (South), 2008, pp. 406-412, doi: 10.1109/ICHR.2008.4755985. (Year: 2008).
Nakada et al., Deep Learning of Neuromuscular and Visuomotor Control of a Biomimetic Simulated Humanoid, 2020, IEEE, p. 3952-3959 (Year: 2020).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).

* cited by examiner

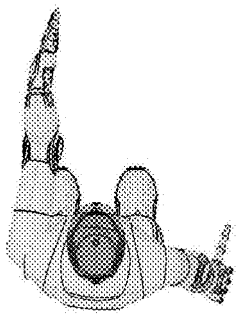
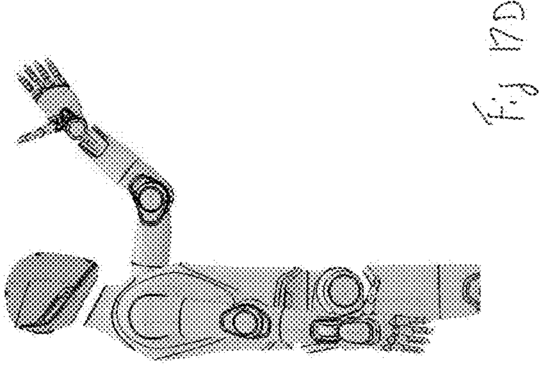
Fig 17D
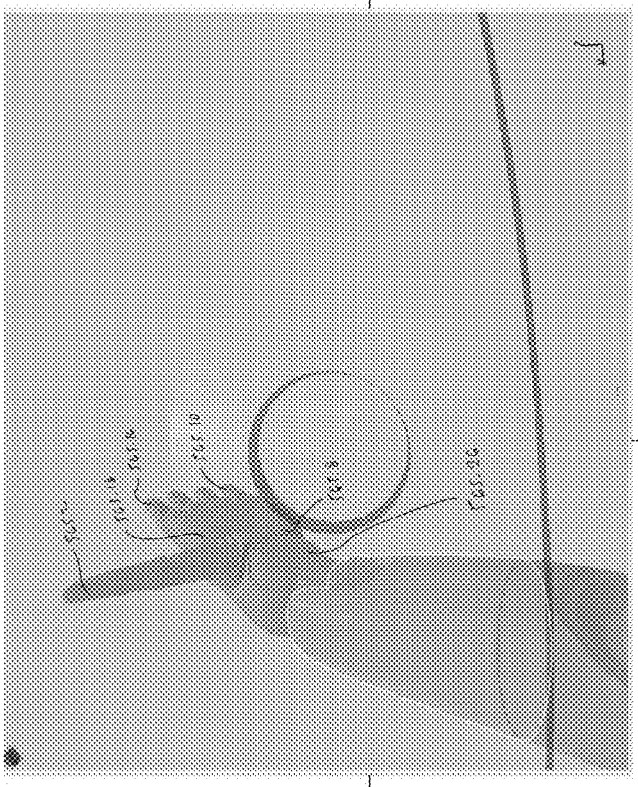
Fig 17E
Fig 17A
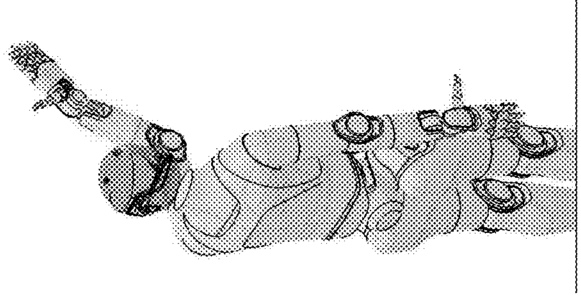
Fig 17B
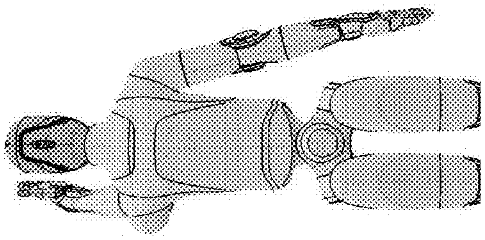

Fig

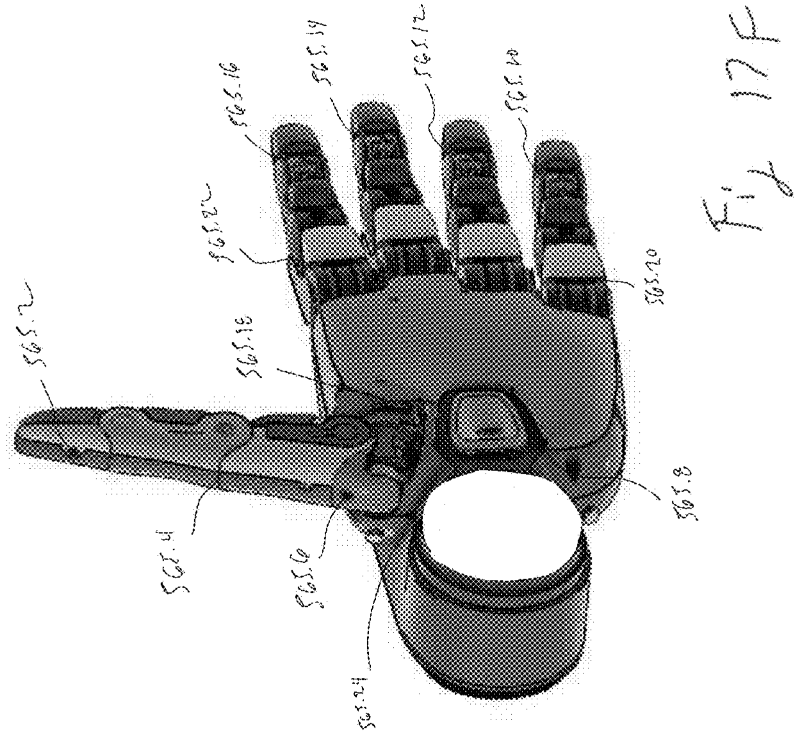
Fig 17F
Fig 18F
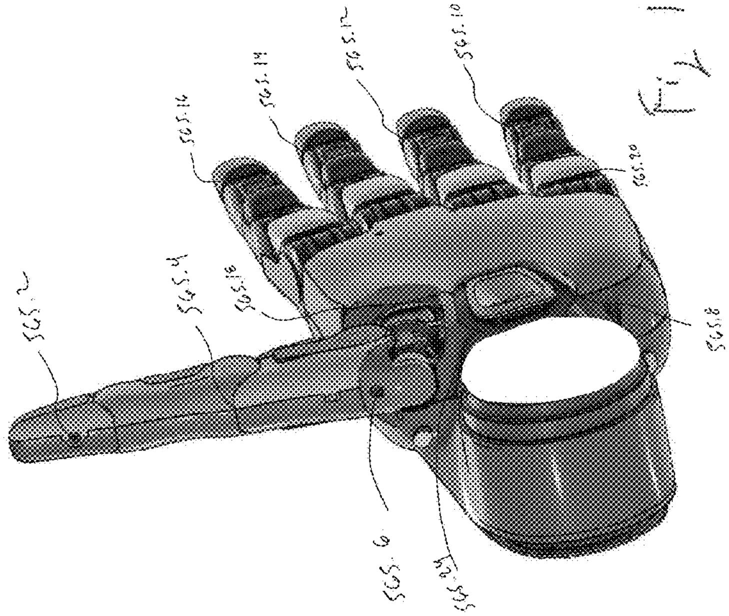

4050

SYSTEM AND METHOD FOR CALIBRATION OF HUMANOID ROBOTS

CROSS-REFERENCE TO RELATED APPLICATIONS

This application claims the benefit of and priority to U.S. Provisional Patent Application Nos. 63/699,201, 63/705,802, 63/706,778, 63/763,209, 63/772,440, which is expressly incorporated by reference herein in its entirety.

TECHNICAL FIELD

This disclosure relates to systems, methods, and techniques for calibrating a humanoid robot, and more specifically for calibrating a humanoid robot using visual input from the robot's own camera system.

BACKGROUND

Humanoid robots are complex mechanisms composed of numerous links and joints that form kinematic chains from a base to various end-effectors like hands and feet. The robot's control system depends on a kinematic model, which is a mathematical representation of its geometry, to calculate the joint angles required to position an end-effector at a desired location. However, discrepancies often exist between this theoretical model and the actual physical robot. These inaccuracies can stem from manufacturing tolerances, variations in assembly, and the wear of mechanical components over time. Such deviations can lead to significant errors in the robot's movements, resulting in failed tasks and potential collisions. Consequently, the use of a calibration process is essential. Yet, conventional calibration techniques present several technical challenges, require extensive setups, are often inefficient and error-prone. Therefore, there is a significant need for a improved calibration methodology.

SUMMARY OF INVENTION

The presently disclosed subject matter is directed to a method for calibrating a humanoid robot. Particularly, the method comprises obtaining a humanoid robot with a set of original kinematic biasing values. The method includes controlling the humanoid robot through a plurality of predetermined poses. The method includes capturing image data of one or more body parts of the humanoid robot using one or more vision sensors mounted on the humanoid robot while the humanoid robot moves through the plurality of predetermined poses. The method includes determining a set of revised kinematic biasing values by processing the image data using a bipedal spatial perception model, wherein the bipedal spatial perception model is trained using synthetic image data that contains one or more keypoints. The method includes replacing the set of original kinematic biasing values with the set of revised kinematic biasing values.

The presently disclosed subject matter is directed to a method for calibrating a humanoid robot. Particularly, the method comprises obtaining a humanoid robot with a set of original kinematic biasing values. The method includes capturing image data of one or more body parts of the humanoid robot using one or more vision sensors mounted on the humanoid robot while the humanoid robot is performing an operational task. The method includes determining a set of revised kinematic biasing values by processing the image data using a bipedal spatial perception model, wherein the bipedal spatial perception model is trained using synthetic image data of the humanoid robot. The method includes replacing the set of original kinematic biasing values with the set of revised kinematic biasing values.

The presently disclosed subject matter is directed to a method for calibrating a humanoid robot. Particularly, the method comprises controlling the humanoid robot through a plurality of predetermined poses. The method includes capturing, via one or more cameras mounted on the humanoid robot, image data of one or more body parts of the humanoid robot as the humanoid robot moves through the plurality of predetermined poses. The method includes recording measurement data from joint encoders of the humanoid robot corresponding to the plurality of predetermined poses. The method includes processing the image data using a bipedal spatial perception model (BSPM) to determine observed locations of a plurality of keypoints on the one or more body parts. The method includes determining kinematic-based locations of the plurality of keypoints based on the measurement data. The method includes determining revised kinematic biasing values by minimizing discrepancies between the observed locations and the kinematic-based locations.

The presently disclosed subject matter is directed to a humanoid robot system. Particularly, the system comprises a plurality of joints, each joint having a joint encoder. The system includes one or more cameras mounted on a head of the humanoid robot. The system includes one or more processors. The system includes a memory storing instructions that, when executed by the one or more processors, cause the humanoid robot system to control the humanoid robot through a plurality of predetermined poses, capture image data of one or more body parts of the humanoid robot via the one or more cameras as the humanoid robot moves through the plurality of predetermined poses, process the image data using a bipedal spatial perception model (BSPM) to determine observed locations of a plurality of keypoints on the one or more body parts, determine kinematic-based locations of the plurality of keypoints based on measurement data from the joint encoders, and determine revised kinematic biasing values by minimizing discrepancies between the observed locations and the kinematic-based locations.

The presently disclosed subject matter is directed to a method for generating a bipedal spatial perception model (BSPM) for humanoid robot calibration. Particularly, the method comprises obtaining a core dataset comprising visual image data and associated ground truth data indicating physical properties and spatial positions of robot components. The method includes generating synthetic training data by modifying configurable parameters of the core dataset using domain randomization, wherein the synthetic training data comprises a larger volume of images than the core dataset. The method includes training the BSPM on a training dataset comprising the core dataset and the synthetic training data to detect keypoints on humanoid robot components. The method includes deploying the trained BSPM on a humanoid robot for use in calibrating the humanoid robot by comparing observed keypoint locations with kinematic-based keypoint locations.

The presently disclosed subject matter is directed to a computer-readable storage medium storing instructions that, when executed by one or more processors of a humanoid robot, cause the humanoid robot to perform a calibration process. Particularly, the calibration process comprises moving through a plurality of predetermined poses. The process includes capturing image data of end effectors or feet of the humanoid robot via head-mounted cameras during the movement. The process includes processing the image data using a bipedal spatial perception model (BSPM) to identify observed locations of keypoints on the end effectors or feet. The process includes determining kinematic-based locations of the keypoints based on joint encoder data. The process includes transforming the observed locations and kinematic-based locations to a common coordinate frame. The process includes updating joint angle biases of the humanoid robot based on an optimization algorithm that minimizes differences between the observed locations and kinematic-based locations in the common coordinate frame.

The presently disclosed subject matter is directed to a method for calibrating a humanoid robot. Particularly, the method comprises applying, on exterior surfaces of the robot, micro-scale fiducial patterns that are detectable in at least one of an ultraviolet or infrared spectral band and substantially unobtrusive in visible light. The method includes controlling the robot through calibration motions. The method includes using onboard cameras to capture images of the fiducial patterns. The method includes using inertial measurement unit (IMU) signals to (i) trigger image capture during low-motion intervals and/or (ii) de-blur images using inertial priors. The method includes determining calibration parameters by minimizing discrepancies between visually observed fiducial locations and kinematic predictions.

The presently disclosed subject matter is directed to a method of calibrating extrinsic parameters of one or more head-mounted cameras of a humanoid robot. Particularly, the method comprises holding limb and torso joints fixed to create a static three-dimensional constellation of robot keypoints with known poses from forward kinematics. The method includes articulating neck joints to capture images of the constellation from multiple viewpoints. The method includes estimating keypoint locations for each camera. The method includes solving only for the head kinematic chain parameters to determine a rigid transform between each camera optical frame and the head frame.

The presently disclosed subject matter is directed to a humanoid robot comprising cameras, at least one of an inertial measurement unit (IMU) and a microphone array, and one or more processors configured to estimate rigid transformations between respective sensor coordinate frames by fusing visual observations with inertial and/or acoustic observations, and to apply the transformations to enable audio-visual or visual-inertial tasks including sound-source localization and robust calibration under motion blur or occlusion.

The presently disclosed subject matter is directed to a method for self-calibrating a humanoid robot. Particularly, the method comprises predicting upcoming tasks. The method includes selecting calibration poses that emphasize informative Jacobian directions for those tasks. The method includes executing the selected poses. The method includes estimating calibration parameters using observations from onboard cameras and joint sensors, whereby accuracy is preferentially improved in task-critical subspaces.

The presently disclosed subject matter is directed to a method for online self-calibration during normal robot operation without a scripted routine. Particularly, the method comprises computing calibration residuals and detector confidence scores from images of robot body parts. The method includes updating calibration parameters only when residuals and confidences satisfy predetermined criteria. The method includes applying bounded parameter updates per cycle. The method includes performing health checks. The method includes automatically rolling back the most recent updates upon a failed health check.

The presently disclosed subject matter is directed to a humanoid robot control system configured to compare multiple encoder modalities for a joint, to treat vision-derived observations as an arbiter upon divergence, to estimate encoder self-bias in real time, and to trigger either targeted joint recalibration or fault handling based on the estimated bias.

The presently disclosed subject matter is directed to a two-stage calibration method. Particularly, the method comprises executing a first stage that estimates extrinsics using a fiducial-based routine during robot motion. The method includes computing post-stage residuals. The method includes conditionally executing a second stage that refines parameters using one of keypoint-based or holistic pose-based estimation only when the residuals exceed a threshold.

In some embodiments, a multi-stage calibration process is initiated, where a first stage uses fiducial-based extrinsic estimation executed during continuous robot motion, and a second stage is triggered when a residual error exceeds an adaptive threshold based on observed noise levels and keypoint confidence. This second stage refines kinematic parameters such as joint angle offsets, link lengths, and link twists. It may employ a keypoint-based solver when sufficient keypoints are visible, or a holistic pose-based solver otherwise. The calibration process can terminate automatically when the residual falls below a convergence threshold or a time budget is reached, and can be configured to run as an automated routine at startup, continuously in the background to correct for drift from thermal expansion or mechanical wear, or on a targeted subset of joints after maintenance.

In some embodiments, a bipedal spatial perception model (BSPM) is trained to identify one or more body parts (e.g., end effectors, feet) and a plurality of keypoints on them. These keypoints may correspond to visually distinct geometric features such as screw heads, cutout corners, and groove endpoints, or be located on visible fasteners, panel edges, and cutouts. The BSPM may be trained on a dataset comprising 80% to 99.99999% synthetic image data, generated using domain randomization to systematically vary parameters like lighting, robot poses, camera angles, backgrounds, and intrinsic camera parameters based on expected operational conditions. The BSPM, which can comprise a feature pyramid network (FPN) for multi-scale feature extraction, is trained using supervised learning with a composite loss function (e.g., Dice loss, IoU loss, mean squared error) and may be quantized to 8-bit integer precision for efficient deployment on onboard hardware. Alternatively, fiducial patterns, such as micro-printed dot grids detectable in the ultraviolet band, may be applied to body parts like the hands or feet to increase observability.

In some embodiments, the robot is controlled through a plurality of predetermined poses, such as moving its end effectors and feet in regularly defined circular motions within the field of view of one or more cameras. To improve data quality, image capture is triggered when IMU-derived angular velocity and acceleration fall below thresholds, captured images are deblurred using a point-spread function parameterized by IMU-measured motion, and camera exposures are synchronized to IMU timestamps to reduce rolling-shutter distortion. For extrinsic calibration, visual, inertial, and acoustic measurements are time-synchronized to a common clock. The system may lock the torso, arms, and legs to maintain a static keypoint constellation while the neck is actuated through yaw, pitch, and roll sequences to provide non-coplanar viewpoints. Measurements from a microphone array, such as time-difference-of-arrival estimates, can be used to constrain camera-to-array extrinsics. Confidence scores from the various modalities may weight their respective residuals in the estimation.

In some embodiments, revised kinematic biasing values are determined by minimizing a discrepancy between visually observed data and kinematically predicted data. The BSPM determines the observed locations or the full six-degree-of-freedom (6-DoF) pose of body parts from image data, while kinematic-based locations or poses are calculated from joint encoder data. An optimization algorithm, such as a gradient-based solver, minimizes a cost function incorporating position and orientation errors across all predetermined poses. To address non-convexity, the solver may be run multiple times with different initial values. Alternatively, the estimation can be performed using a factor-graph or bundle-adjustment framework, or a hybrid approach where a short sliding window of data is solved via bundle adjustment and the state is propagated by a Kalman-type filter. In other embodiments, the BSPM may be configured to directly output the revised kinematic biasing values by analyzing image data, robot measurement data, or both.

In some embodiments, the system continuously monitors calibration health. Encoder self-bias is modeled as a slowly varying offset estimated with an exponential moving average. If this estimated bias exceeds a threshold, targeted recalibration of the affected joint is initiated. A persistent bias beyond a fault threshold generates a maintenance alert and transitions the joint to a safe operating mode. All divergence events and bias estimates are logged with timestamps for diagnostics. To ensure stability, parameter updates are limited by per-parameter step sizes and cumulative drift ceilings, and may require multi-frame consensus where residuals and detector confidences are aggregated over several frames. System health checks can include cross-validation against an independent routine, such as a self-contact task where success is confirmed via force sensor feedback. If validation fails, the system can rollback to a last-known-good parameter set and suppress updates for a cooldown interval. Acceptance criteria for new parameters may comprise dual thresholds on both normalized reprojection error and predicted task performance degradation.

In some embodiments, the system actively selects poses to improve calibration efficiency. Pose selection aims to maximize a task-weighted Fisher Information Metric computed from a kinematic Jacobian, with candidates filtered to maintain visibility of a minimum number of keypoints per camera. This process is subject to joint-limit, self-collision, and energy-use constraints. Task predictions from a scheduler can inform the weighting over a given time horizon. Furthermore, previously effective calibration poses can be stored in a library and recalled when the current task context matches within a similarity threshold.

BRIEF DESCRIPTION OF THE DRAWINGS

The accompanying drawing figures depict one or more implementations in accordance with the present teachings, by way of example only, and not by way of limitation. These figures are intended to illustrate and not to restrict the scope of the disclosure. In the figures, like reference numerals refer to the same or similar elements. This convention is maintained throughout the drawings for consistency and clarity.

FIGS. 17A-17D are various third-person views of the humanoid robot of FIGS. 1-3B in a first pose, wherein the humanoid robot is viewing its end effector in a first location;

FIG. 17E is a robot's perspective view of the end effector when said humanoid robot is in the first pose;

FIG. 17F is a zoomed-in view of FIG. 17E, wherein a plurality of keypoints are shown on the end effector in the first location;

FIGS. 18A-18D are various third-person views of the humanoid robot of FIGS. 1-3B in a second pose, wherein the robot is viewing its end effector in a second location;

FIG. 18E is a robot's perspective view of the end effector when said humanoid robot is in the second pose;

FIG. 18F is a zoomed-in view of FIG. 18E, wherein a plurality of keypoints are shown on the end effector in the second location;

DETAILED DESCRIPTION

Figure 1:
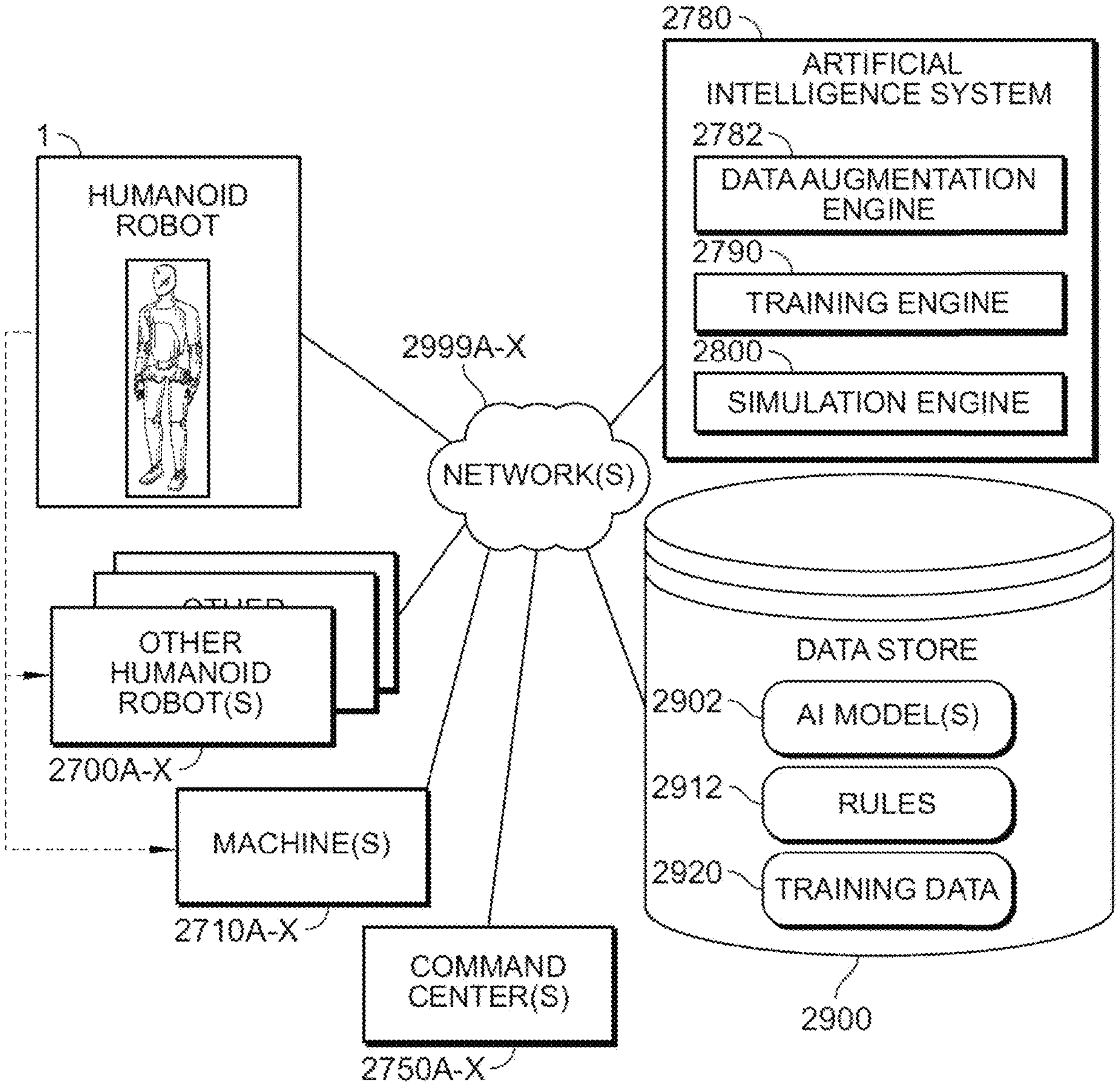
FIG. 1 is a diagram illustrating an environment and a network in which one or more humanoid robots of FIG. 1 may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively highlevel, without extensive detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts, and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not include that particular feature, structure, or characteristic. Moreover, such phrases are not necessarily referring to the same embodiment. Further, when a particular feature, structure, or characteristic is described in connection with an embodiment, it is submitted that it is within the knowledge of one of skill in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be universally applied. Rather, in some embodiments, such features may be arranged in a different manner and/or order than shown in the illustrative figures. Additionally, the inclusion of a structural or method feature in a particular figure is not meant to imply that such a feature is present in all embodiments and, in some embodiments, may not be included or may be combined with other features.

A. INTRODUCTION

Robot calibration, such as for the disclosed humanoid robot, pertains to obtaining measurements of the kinematic structure of the humanoid robot. This process includes determining the position of joints of different parts of the humanoid robot (including arms, legs, hands, and feet) and/or the position or orientation of cameras or other visual sensors mounted to the humanoid robot (e.g., mounted to the robot head or torso). It further involves measuring offsets between actual and expected joint measurements and subsequently correcting those offsets. Kinematic calibration mitigates compounding issues in humanoid robots that can be caused by manufacturing error, deterioration of mechanical and electronic components over the lifetime of the robot (e.g., caused by wear and tear during operation), and other imperfections that are difficult to measure or observe. However, preexisting robotics calibration techniques pose several technical challenges in providing a scalable and efficient solution to calibration that is not error-prone. For example, laser-based tracking techniques that involve aligning lasers at marks printed on parts of the robot to collect measurement data can be time-consuming (e.g., as much as three to four hours per robot) and prone to error, because hitting the marks with the laser is a delicate procedure that demands a high degree of precision. As another example, mechanical alignment techniques that involve comparing robot measurement data to ground truth data obtained by mounting the robot to a jig, external fiducial, or other mechanical fixture may involve time-consuming and expensive manual operations, and scalability may be limited by the availability of such jigs or other fiducials. Techniques such as the aforementioned laser-based and ground-truth-based approaches are difficult to repeat given the complexity and time resources involved for an individual robot, and are thus inefficient at scale.

As stated above, this disclosure relates to systems, methods, and techniques for camera-based self-calibration for a humanoid robot. The disclosed technology includes techniques for determining camera offsets and/or joint angle biases for a humanoid robot based on visual input from the camera system of the robot itself. Disclosed technologies include capturing image data and humanoid robot joint data during an initialization or calibration process and then determining calibration data through data alignment and/or joint angle bias optimization. Disclosed technologies may also include capturing image data and humanoid robot joint data and directly calculating calibration data during online operation of the humanoid robot, without a particular dedicated calibration process. In some embodiments, this calibration proceeds opportunistically during normal operation without a scripted routine. The system may monitor residuals and confidence scores, apply bounded parameter updates, and roll back changes if health checks fail.

The calibration process disclosed herein can leverage the robot's own onboard cameras and proprioceptive sensors to enhance kinematic accuracy without reliance on external metrology equipment. The self-calibration may rely on comparing the robot's internally measured configuration, derived from sensors like joint encoders, with a visually perceived configuration obtained by its head-mounted cameras observing its own limbs. Two primary visual perception methods are detailed: a keypoint-based approach and a holistic pose estimation approach. The keypoint-based method identifies and tracks the precise 3D positions of specific, visually distinct features on the robot's body. These detectable features may include visible fasteners, panel edges, cutouts, or grooves, with or without cosmetic shells, and the system may adapt keypoint priors to whichever surface features are present. This approach offers high potential accuracy but with minor susceptibility to visual occlusions. In addition, a pose-based visual calibration method determines the full six-degree-of-freedom (6-DoF) pose of a joint or body part, where the system replaces sparse keypoint detection with a holistic body or effector pose estimator. These estimated 6-DoF poses are compared against kinematic predictions, and calibration parameters are updated to minimize the resulting pose residuals, providing greater robustness in cluttered environments at the potential expense of precision. An optimization algorithm can then reconcile the data from these two sensory modalities to calculate and apply corrective offsets.

In some embodiments, visual detectors provide observations that are transformed to a common frame and fed to a numerical optimizer in an algorithm-only observation pipeline. The solver updates kinematic and sensor parameters using gradient-based or quasi-Newton methods. Accordingly, the disclosed technology allows for a repeatable, fast, and ground truth-agnostic calibration of the humanoid robot. For example, in some embodiments, a robot may be calibrated efficiently during the robot's daily checkout and initialization process without manual supervision. Further, in some embodiments, calibration of the robot may be monitored and/or updated continually while the robot is operating, which may find and correct calibration errors more quickly than is possible with existing systems, which may only ensure robot calibration at a particular point in time. Improving robot calibration may improve robot navigation accuracy, for example by removing the portion of navigation error caused by camera miscalibration or encoder drift. The system may compare multiple encoder modalities and use vision as an arbiter when readings diverge, allowing for encoder self-bias tracking. Detected bias may then prompt calibration or fault handling. Further, the disclosed technology does not use external jigs, laser alignment systems, or other external ground truth systems, and thus may reduce cost and complexity and increase scalability as compared to existing calibration techniques.

Another advantage of the disclosed self-calibration method is its extensibility beyond correcting simple joint angle biases. The underlying optimization framework can be adapted to calibrate for other geometric parameters in the robot's kinematic model, such as link lengths and link twists, thereby correcting for a wider range of manufacturing, assembly, and wear-induced inaccuracies. In some embodiments, this extended geometric parameter calibration includes joint offsets as well as link lengths and twists in the calibration state. Correcting both offset and geometry terms improves reach accuracy across the full workspace. Furthermore, the methods derive significant benefit from the use of a custom-built perception model, termed a Bipedal Spatial Perception Model (BSPM). This model, trained on synthetic and real data specific to the robot's own morphology, is inherently more robust and reliable for identifying the robot's own parts under varied conditions than traditional computer vision techniques that rely on generic mathematical formulas or less specialized algorithms. The disclosed methods can be flexibly deployed in various scenarios, including comprehensive whole-body calibrations during startup, rapid targeted calibrations of specific joints after maintenance, and efficient periodical background calibration at real-time. This may include a two-stage (coarse→fine) calibration, where a fast fiducial-based routine provides an initial extrinsic guess, after which a fine alignment stage refines parameters only if residuals exceed a threshold. This reduces run time while preserving accuracy under challenging viewpoints.

B. DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that the medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface ($P_G$) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
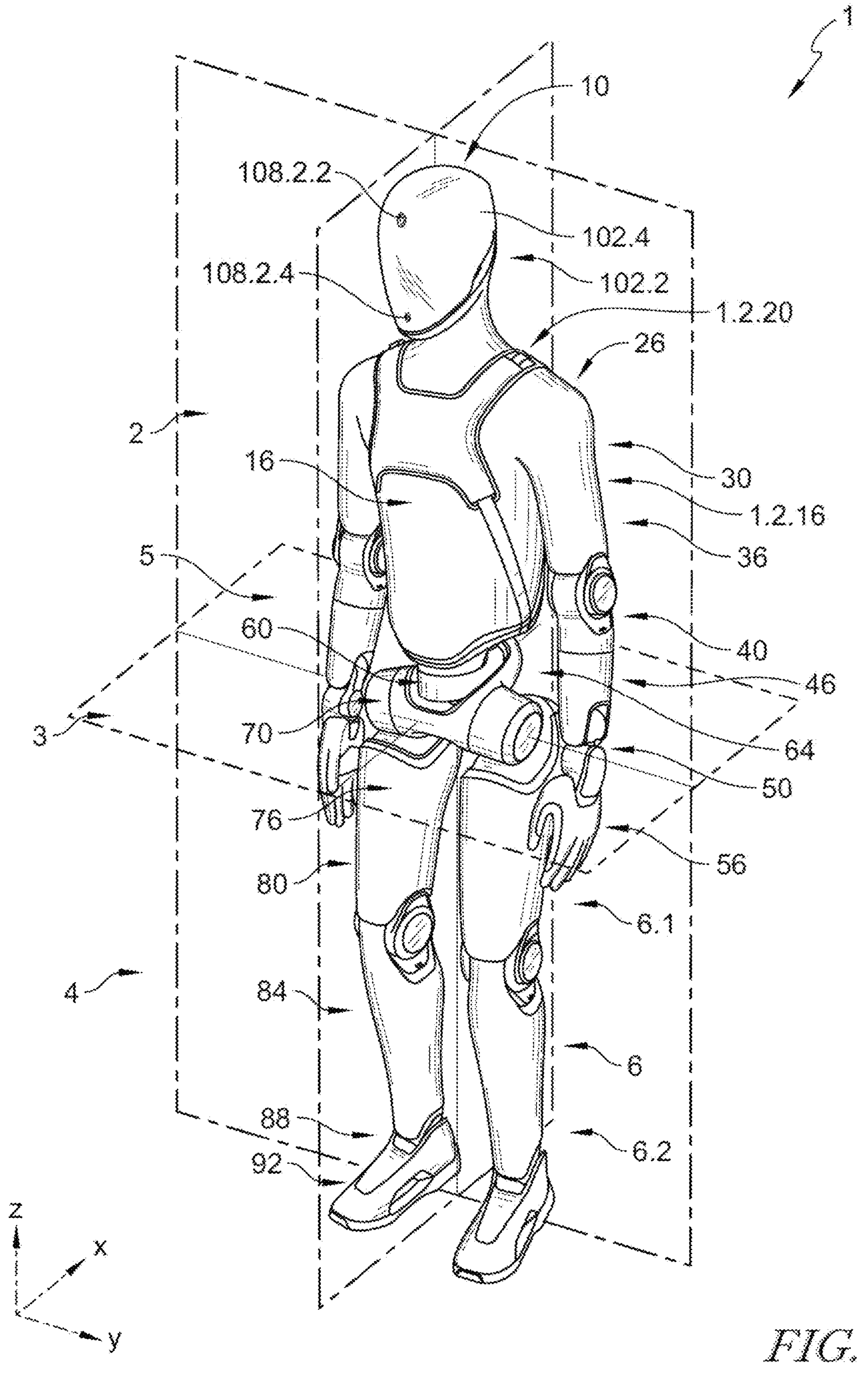
FIG. 3A is a perspective view of a humanoid robot of FIGS. 1-2.
Figure 3B:
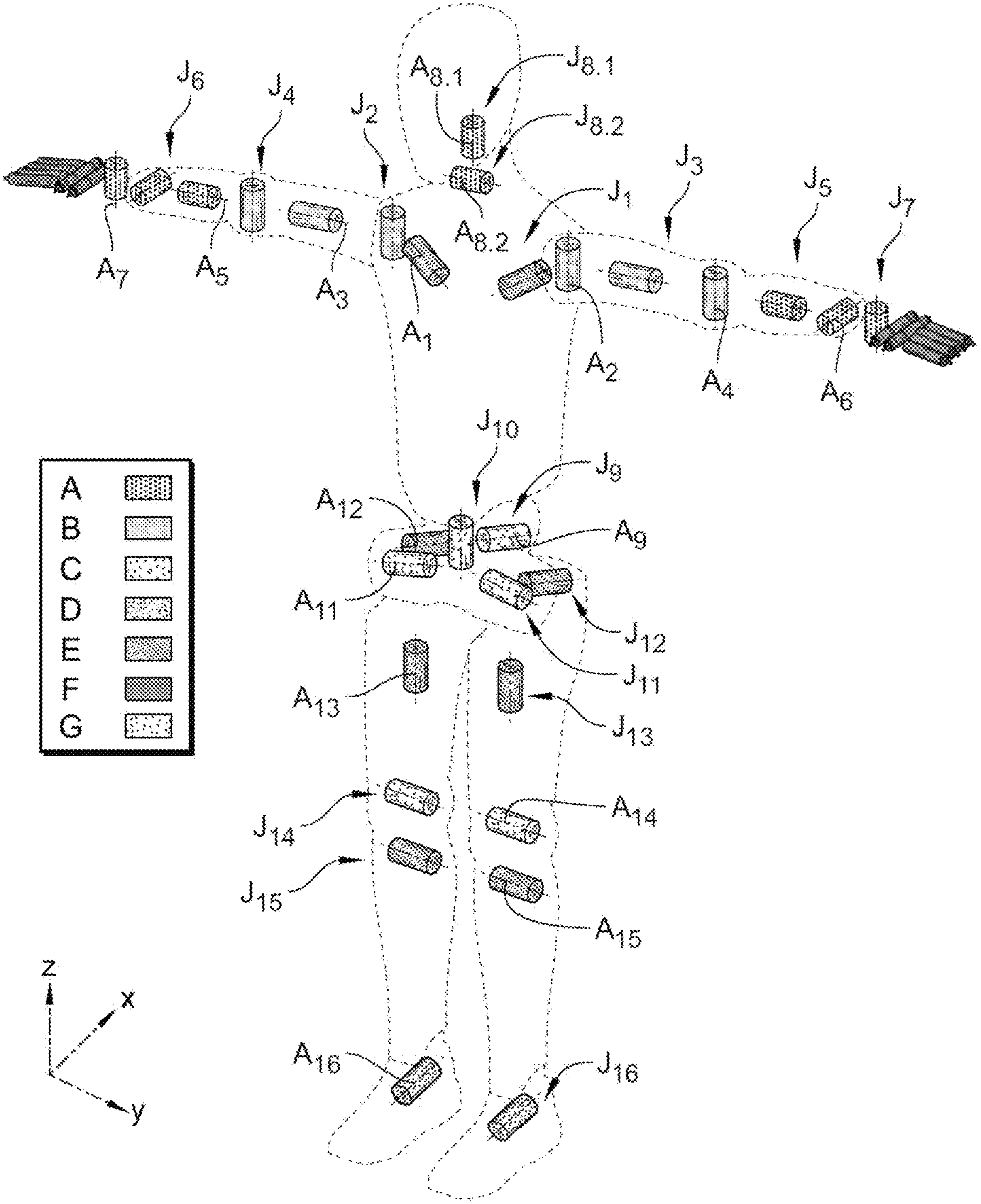
FIG. 3B is a diagram illustrating a plurality of actuators contained within the humanoid robot of FIGS. 1-3A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, the axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high clastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. ROBOT(S) AND ENVIRONMENT

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. HUMANOID ROBOT

Figure 2:
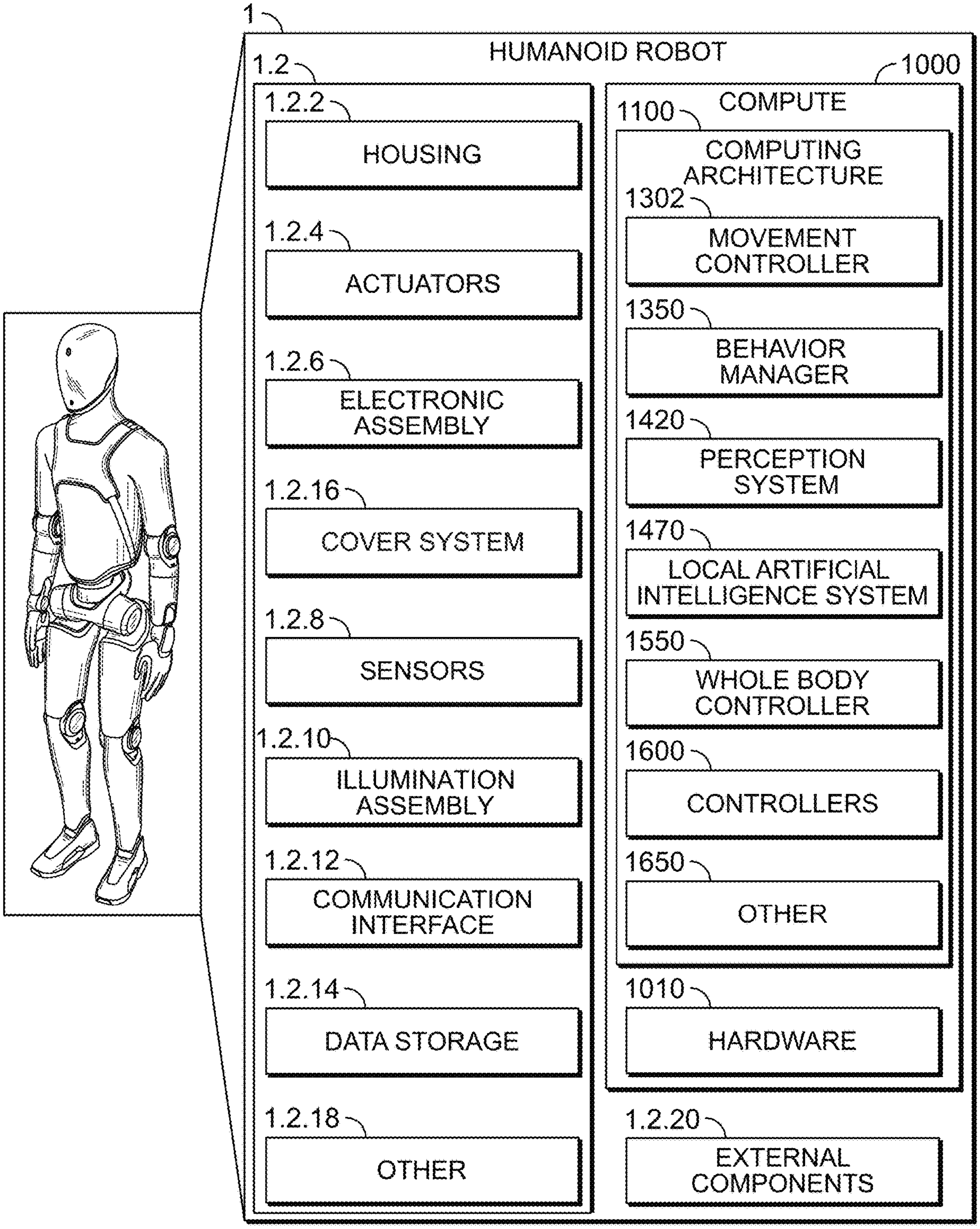
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100.

a. Humanoid Robot Configuration

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as checks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Variations of this design may include the addition of a third actuator to provide roll motion, which would further increase the range of movement of the head 10.1 to three degrees of freedom (3-DoF) and could enable more expressive head gestures, such as tilting the head sideways to convey curiosity or empathy. Alternatively, for specialized applications, the actuators (J8.1) and/or (J8.2) may be replaced with compact linear actuators or parallel-link mechanisms.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

Figure 4:
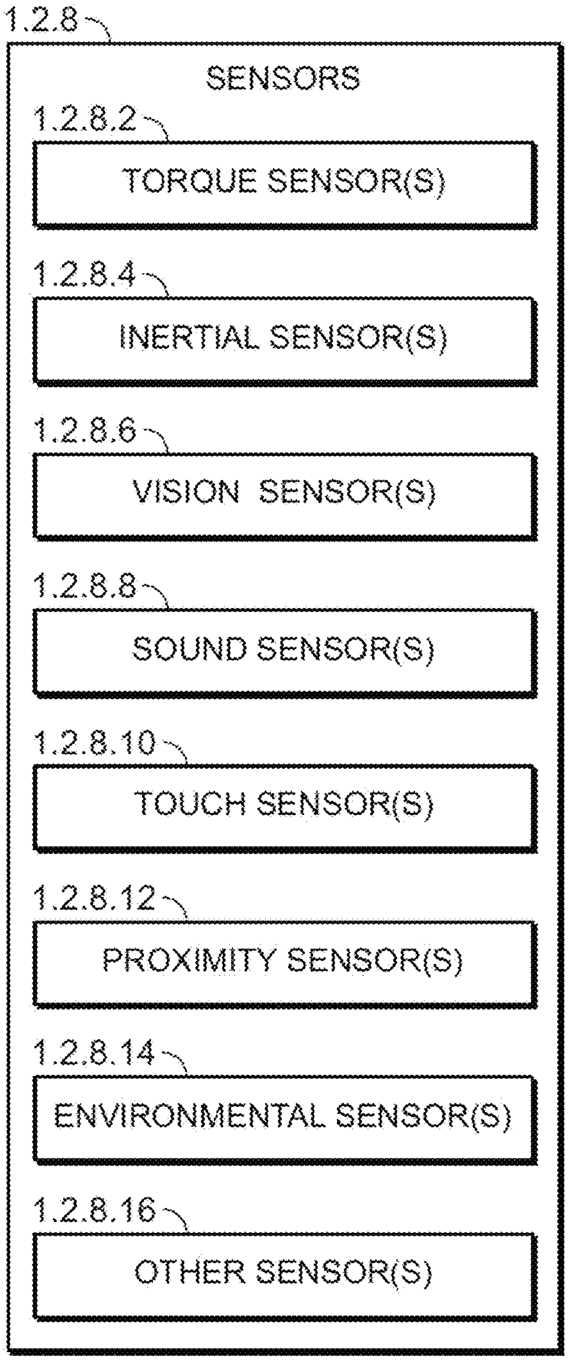
FIG. 4 is a block diagram of sensors for the humanoid robot of FIGS. 1-3B.

The actuators 1.2.4 contained within the robot 1 include thirty actuators (J1)-(J16), excluding the end effectors, that are housed within various components of the robot 1 to actuate movement of the components. An additional aggregate total of twelve actuators are in both hands 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the below table ii. Sensors As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, vision sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and

TABLE 1

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts. The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

Global Positioning System (GPS) receivers (e.g., to provide location data based on satellite signals, for use in outdoor navigation and positioning).

The vision sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Vision sensors 1.2.8.6 may also include event-based cameras, which report changes in pixel intensity rather than full frames, offering advantages in speed and data efficiency for dynamic scenes. Examples of the vision sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iii. Communication Interfaces

Figure 5:
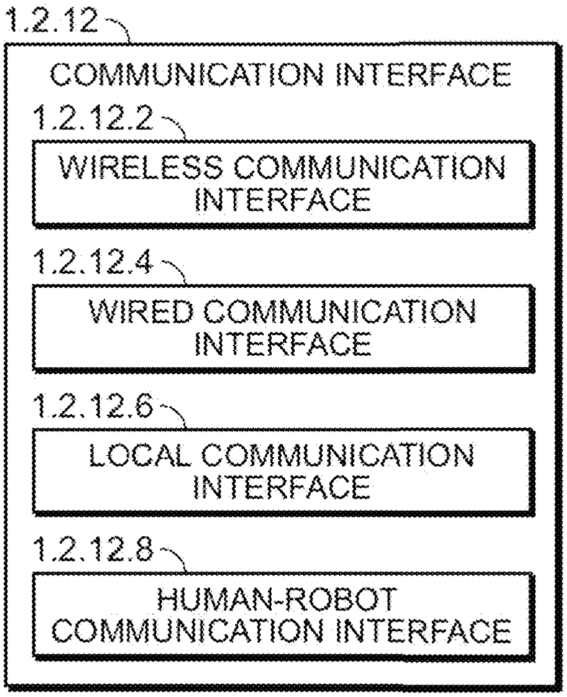
FIG. 5 is a block diagram of a communication interface for the humanoid robot of FIGS. 1-3B.

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Arca Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

c. Compute

As illustrated in FIG. 2, the compute 1000 may comprise any combination of hardware, software, and circuitry to perform various computing functions that enable the humanoid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferential, Apple Neural Engine, and Huawei Ascend; and Neuromorphic Neural Network Processing Units such as Intel Loihi or BrainChip Akida), and other processors. For example, the other processors may be embodied as a single or multi-core processor, a microcontroller, or other processor or processing/controlling circuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650.

1. Movement Controller

Figure 6:
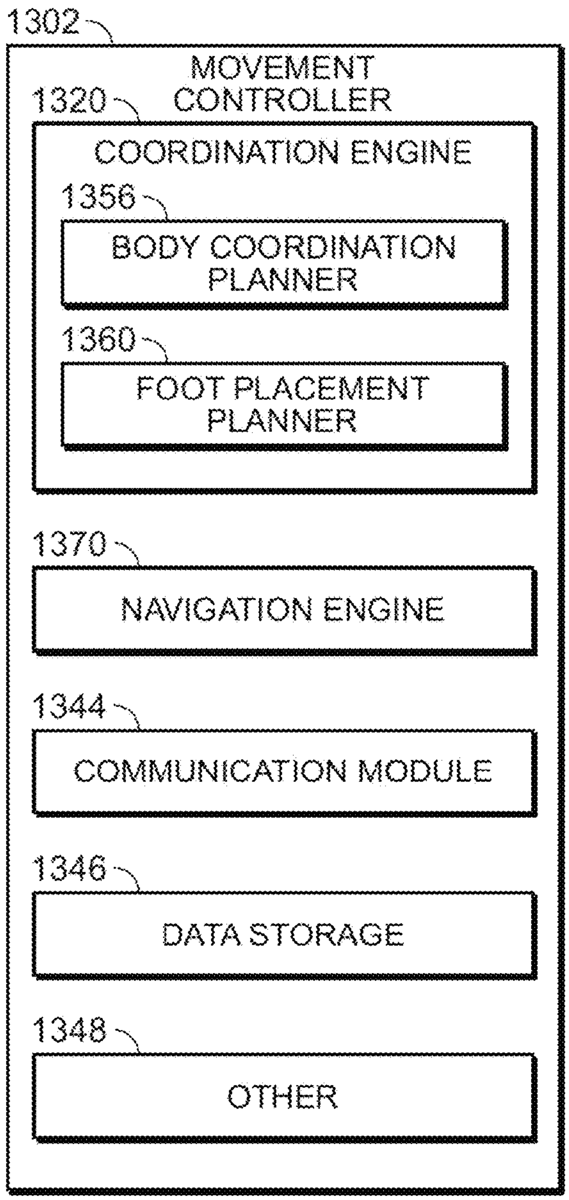
FIG. 6 is a block diagram of a movement controller for the humanoid robot of FIGS. 1-3B.

Referring to FIG. 6, the movement controller 1302 may be embodied as any hardware, software, or circuitry to determine a sequence of actions or a path for the humanoid robot 1 to achieve a given goal or complete a given task, in light of a current state, a set of constraints (e.g., the capabilities of the robot 1 and the environment and surroundings of the robot 1), and instructions from another sub-component of the robot 1 or another aspect of the overall architecture 1100. To carry this out, the movement controller 1302 may include a variety of components, such as: (i) a coordination engine 1320, (ii) a navigation engine 1370, (iii) a communication module 1344, (iv) a data storage 1346, and/or (v) other 1348.

The disclosed movement controller 1302 overcomes limitations associated with conventional robotic systems by enabling the robot 1 to: (i) coordinate its body using the body coordination planner 1356 and foot placement planner 1360 based on instructions from the local AI system 1470 and/or remote AI system 2780, (ii) navigate its world by mapping its environment (e.g., SLAM) and predict movement of objects within the environment, and (iii) communicate with its environment. The movement controller 1302 also enables the robot 1 to adapt in real-time to dynamic environments by continuously monitoring the execution of its plans and comparing the expected outcomes with actual results. The movement controller 1302 further solves the technical challenge of efficient resource allocation. By considering the current state of the robot 1, available energy, time constraints, and the relative importance of different goals, the movement controller 1302 optimizes the allocation of the computational and physical resources of the robot 1. Furthermore, the movement controller 1302 can addresses the issue of human-robot collaboration by incorporating models of human behavior and preferences into its decision-making process. This allows the robot 1 to generate plans that are not only efficient from a purely mechanical standpoint but are also intuitive and comfortable for human collaborators.

In an embodiment, the coordination engine 1320 receives task inputs from one or more AI systems 1470, 2780 and provides supplemental information to the whole body controller 1550 regarding the state, configuration, and/or position of the robot 1 within its environment. In particular, the coordination engine 1320 can utilize both the body coordination planner 1356 and the foot placement planner 1360 to control the body placement and foot placement of the humanoid robot 1 based on the inputs from the one or more AI systems 1470, 2780. Specifically, the coordination engine 1320 may break down or override the task inputs from the one or more AI systems 1470 to ensure efficient control of the robot 1 within a space, e.g., during movement such as walking, running, or jumping, to ensure balance, stability, and efficient locomotion of the humanoid robot 1. In other embodiments, the coordination engine 1320 and/or most of the movement controller 1302 may be consumed within the one or more AI systems 1470, 2780.

The navigation engine 1370 may be embodied as any combination of hardware, software, and/or circuitry to map the environment and surroundings based on obtained sensor data (and data that may be obtained from external sources such as other humanoid robots 2700A-X, mapping services, weather services, GPS modules, etc.) and to generate one or more paths. The mapping for the environment by the navigation engine 1370 may then be provided to the one or more AI systems 1470, 2780 to enable the systems to plan the next move or task of the robot 1.

The data storage 1346 may be configured to store navigational data generated by the navigation engine 1370 and/or position data generated by the planners 1356, 1360. This navigational data and/or position data may be then fed back into the one or more AI systems 1470, 2780 to enable the systems to plan the next move or task. This data may be categorized as short-term memory data and/or long-term memory data. For example, the short-term memory data may include the position data, which comprises the positions of the robot 1 over the last predefined amount of time (e.g., 1 minute or 5 seconds, or anytime between). Meanwhile, the long-term memory data may include the navigational data, which comprises maps of every place any robot 1, 2700A-X has ever visited or been. The ability to feed different amounts of short-term memory data and/or long-term memory data into the one or more AI systems 1470, 2780 provides a significant advantage over conventional robots, as it can efficiently limit the data needed to perform the task without requiring unnecessary processing power that could not be performed on a mobile robot 1. It should be understood that the movement controller 1302 may be omitted and/or consumed by one or more models (e.g., RL trained models) that are contained within the local AI system 1470.

2. Behavior Manager

Figure 7:
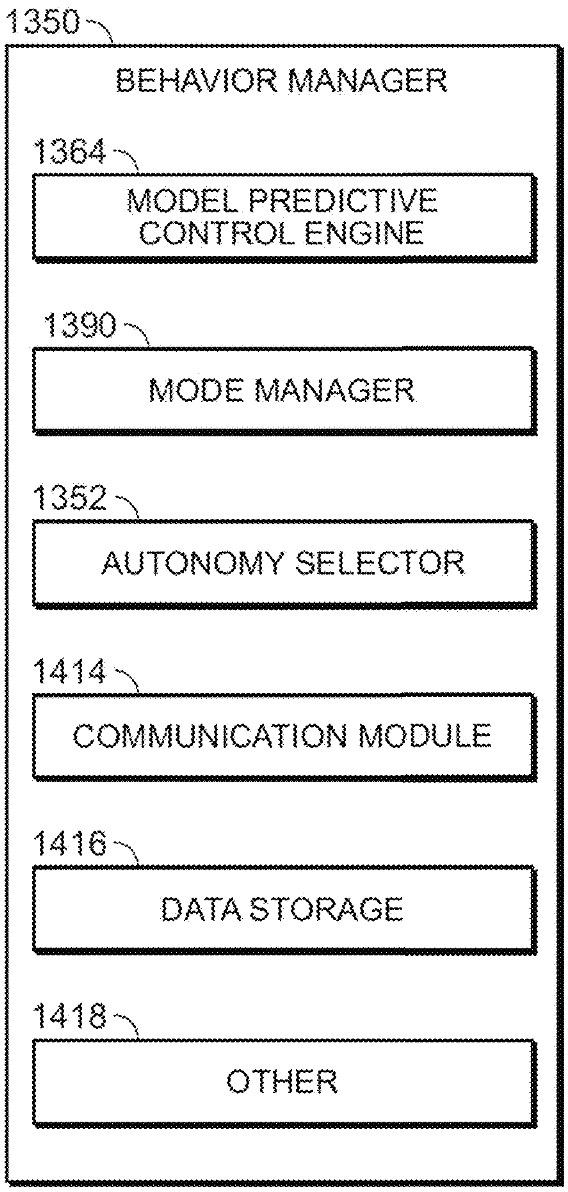
FIG. 7 is a block diagram of a behavior manager for the humanoid robot of FIGS. 1-3B.

Referring to FIG. 7, the behavior manager 1350 may be embodied as any hardware, software, or circuitry for managing behaviors or actions of the humanoid robot 1 based on a given goal, sensor data, and the environment and surroundings of the humanoid robot 1. To accomplish this, the behavior manager 1350 includes: (i) at least one model predictive control engine 1364, (ii) a mode manager 1390, (iii) an autonomy selector 1352, (iv) a communications module 1414, (v) a data storage 1416, and (vi) other modules or components 1418. The disclosed behavior manager 1350 solves several critical technical issues in the field of robotics. One technical issue solved by the behavior manager 1350 is the integration and coordination of multiple modules within a single robotic system. The behavior manager 1350 also solves the technical issue of ensuring that the behaviors of the robot 1 are executed in the correct order, which prevents conflicts and ensures smooth transitions between different actions or states. For example, the manager 1350 might ensure that a "stand up" behavior is completed before a "walk" behavior is initiated, or that an "object recognition" behavior is performed before an attempt to grasp an object is made.

The model predictive control engine 1364 aids in predicting future states of the humanoid robot 1 based on its current state, and/or making decisions to optimize behavior and performance over a given time period. The MPC engine 1364 may select from one or more predefined or learned actions for the humanoid robot 1 to take in response to various stimuli observed by the humanoid robot 1 (e.g., via sensors 1.2.8) and other factors such as assigned tasks to perform. For example, such MPC engine 1364 may select from or utilize different predefined routines or modes to accomplish path planning, obstacle avoidance, object grasping and manipulation, human-robot interaction, task planning and execution, decision making, coordination with other humanoid robots 2700A-X and machines 2710A-X, and safety and regulatory compliance behaviors. Over time, the MPC engine 1364 may communicate with the local AI system 1470 to enable the MPC engine 1364 to refine its selections based on learning algorithms that identify predefined or learned actions for the humanoid robot 1 based on the given tasks, scenarios, and constraints.

Meanwhile the mode manager 1390 can manage modes of the robot 1. Specifically, the mode manager 1390 is configured to select an appropriate mode or set of modes given a specified task, scenario, or constraint. For example, the mode manager 1390 may select between a power mode, a standby mode, a standing mode, a sitting mode, a movement mode (e.g., running, walking, jumping, hovering, etc.), a falling mode, a learning mode, a diagnostic mode, an emergency mode, etc. Over time, the mode manager 1390 may collaborate with the local AI system 1470 to refine its mode selection based on learning algorithms.

The autonomy selector 1352 may be configured to manage autonomous features of the behavior manager 1350. For example, an operator may, through the autonomy selector 1352, configure a level of autonomy of the humanoid robot 1 (e.g., such that the humanoid robot 1 operates manually, in which the operator may remotely control the operation of the robot 1, semi-autonomously, or fully autonomously). In an embodiment, the operator may, through the autonomy selector 1352, specify certain features to be conducted autonomously and others to, e.g., perform a repetitive task without any form of AI/ML-based behavior or to require some form of manual input for operation.

The communication module 1414 may be embodied as any combination of hardware, software, or circuitry to enable components of the behavior manager 1350 to communicate with one another and with other components of the humanoid robot 1 (such as of the compute 1000). The data storage 1416 may be any data storage device or partition on a data storage device for short-term or long-term storage of behavior controller data (e.g., event logs, movement data, training data, navigation logs, mapped area and path data, etc.). Other components 1418 may pertain to other hardware, software, and/or circuitry not previously discussed above relative to the behavior manager 1350, such as cache data, data aggregation modules, data augmentation modules, body part component health management, or calibration data management. It should be understood that the behavior manager 1350 may be omitted and/or consumed by one or more models (e.g., RL trained models) that are contained within the local AI system 1470.

3. Perception System

The perception system 1420 may be embodied as any hardware, software, or circuitry for obtaining audiovisual data (e.g., from sensors 1.2.8) and providing this data to the local AI system 1470 for executing AI-based vision techniques (e.g., object detection, image classification, segmentation, object tracking, facial recognition, scene understanding, depth estimation, anomaly detection, reinforcement learning etc.) to generate, from the audiovisual data, one or more three-dimensional (3D) images. The images may further be annotated with contextual data (e.g., foreground/background information, object classification data, labeling, etc.) for additional processing by the local AI system 1470 and the behavior manager 1350. It should be understood that the perception system 1420 may be omitted and/or folded into the local AI system 1470.

4. Local AI System

The local AI system 1470 may be embodied as any combination of hardware, software, or circuitry to drive semi- to fully-autonomous perception, learning, and behavior by the humanoid robot 1. The local AI system 1470 may: (i) include modes or architectures that are run on the disclosed local AI system 1470 only, (ii) include models or architectures where a portion of the model or architecture is run on the local AI system 1470 and another portion of the model or architecture is run on the remote AI system 2780, and (iii) include modes or architectures that are run on the disclosed remote AI system 2780 only. The local AI system 1470 is described in further detail relative to FIG. 8.

Figure 8:
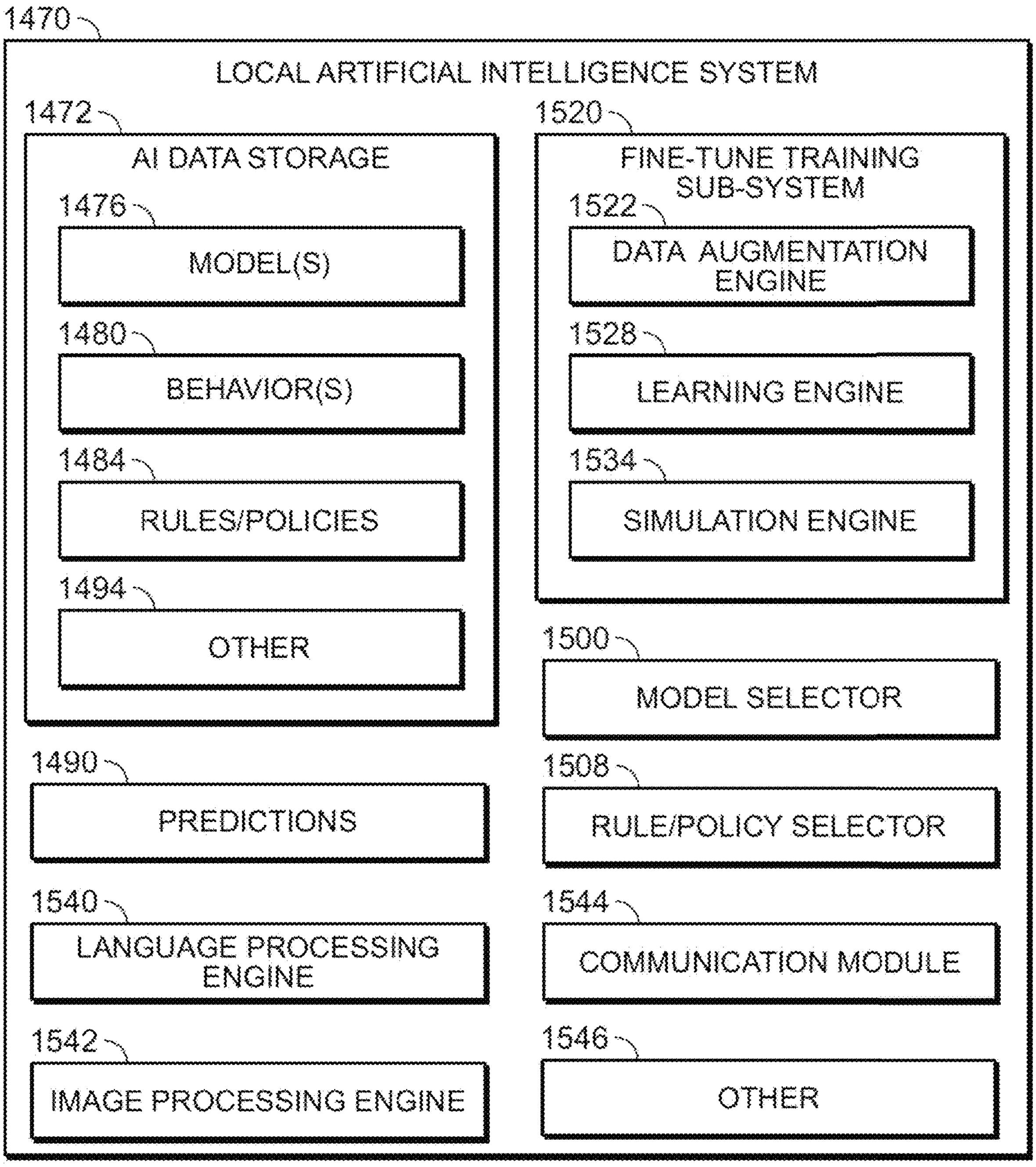
FIG. 8 is a block diagram of an onboard artificial intelligence (AI) system for the humanoid robot of FIG. 2.

Referring now to FIG. 8, the illustrative local AI system 1470 may include a variety of components, including an AI data storage 1472, predictions 1490, a model selector 1500, a rule and policy selector 1508, a training sub-system 1520, a language processing engine 1540, an image processing engine 1542, and a communication module 1544. However, it should be understood that the local AI system 1470 may interact with and form part of each and every other component (e.g., movement controller 1302, behavior manager 1350, perception 1420, whole body controller 1550, and controllers 1600). As such, in some embodiments, the compute 1000 may only include or primarily include the local AI system 1470. In other words, the local AI system 1470 may not be considered a separate component or system, but instead an integral component of other systems contained within the compute 1000. Thus, a primary technical issue solved by the local AI system 1470 is the challenge of real-time, context-aware decision-making. Traditional robotic systems often rely on pre-programmed responses or remote processing, which can lead to delays or inappropriate actions in dynamic situations. The local AI system 1470 overcomes this limitation by enabling rapid, localized processing of sensory inputs and the immediate generation of appropriate responses.

Another technical challenge addressed by the local AI system 1470 is the integration and interpretation of multi-modal sensory data. The humanoid robot 1 is equipped with various sensors, including visual, auditory, tactile, and proprioceptive systems. The AI system 1470 efficiently fuses these diverse data streams in real-time, creating a comprehensive and coherent representation of the state of the robot 1 and its environment. This integrated perception allows for more nuanced and accurate interactions with the physical world and human collaborators. The local AI system 1470 also solves the technical issue of adaptive learning and continuous improvement. Unlike static systems, this local AI system 1470 can modify its behavior based on experience and feedback. It employs advanced machine learning algorithms, potentially including deep reinforcement learning and online learning techniques, to continuously refine its decision-making processes. This adaptability allows the robot 1 to improve its performance over time, learn new tasks with minimal explicit programming, and adjust to changes in its operational environment or physical capabilities. A further technical challenge resolved by the local AI system 1470 is the efficient management of the limited computational resources of the robot 1. The AI system 1470 implements sophisticated task prioritization and resource allocation algorithms, ensuring that critical processes receive adequate computational power while less urgent tasks are managed efficiently. This dynamic resource management enables the robot 1 to maintain optimal performance across a wide range of operational scenarios, from simple repetitive tasks to complex problem-solving situations.

The AI data storage 1472 may further include one or more models 1476, behaviors 1480, rules and policies 1484, and other data 1494. The models 1476 may comprise one or more AI/ML-based models to perform the functions described herein, such as observing, reasoning, and learning behaviors based on the environment and surroundings and performing simple to complex tasks given the environment and surroundings, e.g., similar to the models 2902 of the remote AI system 2780. The illustrative model selector 1500 is configured to select an appropriate model or set of models 1476 given a specified task, scenario, or constraint. For example, the model selector 1500 may select a given model based on considerations such as the task, a cost to perform the task, performance efficiency, the environment and surroundings, resource management, or the current health status of the humanoid robot 1 or its components. Over time, the model selector 1500 may be refined based on learning algorithms that identify efficient models 1476 for given tasks, scenarios, and constraints. In an embodiment, the model may be selected in response to operator input as an alternative to automated selection. This may be useful, e.g., during the initialization of the humanoid robot 1.

The illustrative rule and policy selector 1508 may be configured to select one or more of the rules and policies 1484 that are stored in the AI data storage 1472 to be enforced during the operation of the humanoid robot 1, e.g., based on operator input given a context, environment, compliance and regulatory jurisdiction, safety considerations, and the like. In an embodiment, the rule and policy selector 1508 may automatically learn efficient methods for adapting to selected rules and policies over time.

The language processing engine 1540 may be embodied as any combination of hardware, software, or circuitry for obtaining, parsing, interpreting, and understanding natural language directives and concepts, and also for generating natural language speech. For example, the language processing engine 1540 may be configured to translate speech-to-text and text-to-speech. The image processing engine 1542 may be embodied as any combination of hardware, software, or circuitry for performing object detection, image classification, segmentation, object tracking, facial recognition, scene understanding, depth estimation, anomaly detection, or reinforcement learning on input visual data (e.g., as obtained by sensors 1.2.8 such as cameras or in preloaded training data).

The training sub-system 1520 may be embodied as any hardware, software, or circuitry configured to refine models 1476 and behaviors 1480 based on observed data and training data. The training sub-system 1520 may include a data augmentation engine 1522, a learning engine 1528, and a simulation engine 1534. The data augmentation engine 1522 may be embodied as any hardware, software, or circuitry configured to increase the size and diversity of training data, similar to the data augmentation engine 2782 of the remote AI system 2780. The learning engine 1528 may be embodied as any hardware, software, or circuitry for training the AI models 1476, given a set of rules and policies 1484, behaviors 1480, and training data, similar to the training engine 2790 of the remote AI system 2780. The simulation engine 1534 may be embodied as any hardware, software, or circuitry for executing one or more of the AI models 1476 in a virtualized simulation environment to simulate and analyze aspects of the humanoid robot 1, such as kinematics, sensor behavior, robot 1 behavior, and anomalies, similar to the simulation engine 2800 of the remote AI system 2780. Compared to the remote AI system 2780, the AI fine-tuning conducted by the local AI system 1470 may be localized to the specific humanoid robot 1, which can be advantageous in situations such as those where the humanoid robot 1 is configured to perform a specific task.

The other 1546 may include a communications module that is embodied as any combination of hardware, software, and/or circuitry to enable components of the local AI system 1470 to communicate with one another and with other components of the humanoid robot 1 (such as of the compute 1000). It should be understood that the controllers may be omitted and/or consumed by one or more models (e.g., RL trained models) that are contained within the local AI system 1470.

5. Whole Body Controller

The whole body controller 1550 may be embodied as any combination of hardware, software, or circuitry for receiving information from the behavior manager 1350 or the local AI system 1470. The whole body controller 1550 may thereafter send the information to other components of the compute 1000. For example, the whole body controller 1550 may transmit joint torque data, which is data pertaining to rotational forces exerted at "joints" of the humanoid robot 1, to the controllers 1600. It should be understood that the whole body controller 1550 may be omitted and/or consumed by one or more models (e.g., RL trained models) that are contained within the local AI system 1470.

The controllers 1600 may be embodied as any combination of hardware, software, and/or circuitry for transmitting joint torque data to the actuators 1.2.4, e.g., to extend and retract parts (such as arms, hands, fingers of the humanoid robot 1). The controllers 1600 may also infer joint torque and angle data received from other sensors 1.2.8, such as IMUs mounted on a given "body part." In some embodiments, the joint torque and angle data may be measured using rotary position sensors, optical reflection, or other methods. The whole body controller 1550 may also incorporate advanced control strategies, such as passivity-based control or adaptive control, to ensure stability and robustness in the presence of uncertainties or external disturbances. It should be understood that the controllers 1600 may be omitted and/or consumed by one or more models (e.g., RL trained models) that are contained within the local AI system 1470.

6. Other

Other components 1650 of the compute 1000 may include components not discussed above relative to the compute 1000, such as power management modules (e.g., to manage battery pack health, manage power usage profiles, etc.) and calibration modules (e.g., to ensure that actual kinetic movements of the humanoid robot 1 align with the expected kinetic movements determined based on calculations). The humanoid robot 1 may include other components 1.2.18, which can encompass components that do not necessarily fall within the aforementioned mechanical and electrical architecture 1.2, or compute 1000. For example, the other components 1.2.18 may include safety systems and mechanisms, emergency override systems, or ports for connecting peripheral devices.

E. HUMAN ROBOT CALIBRATION

Humanoid robots, such as robot 1, are complex mechanisms comprised of numerous links interconnected by joints, forming a kinematic chain that extends from a base link to various end-effectors, such as hands and feet. Each joint provides one or more degrees of freedom (DoFs), allowing the robot to articulate and perform a wide range of motions. The robot's control system relies on a kinematic model, a mathematical representation of its geometry, to calculate the joint angles to position an end-effector at a desired location and orientation in space. However, discrepancies between this theoretical model and the actual physical robot may exist. These inaccuracies can arise from manufacturing tolerances, assembly variations, and wear and tear on mechanical components over time. Such deviations can cause significant errors in the robot's movements, leading to failed tasks and potential collisions. Therefore, a calibration process is employed to identify the true kinematic parameters, such as link lengths and joint angle offsets, and update the model accordingly. This procedure allows the robot to achieve a higher degree of accuracy and repeatability in its actions, which facilitates the performance of complex manipulation and locomotion tasks reliably.

a. Overview

Figure 9:
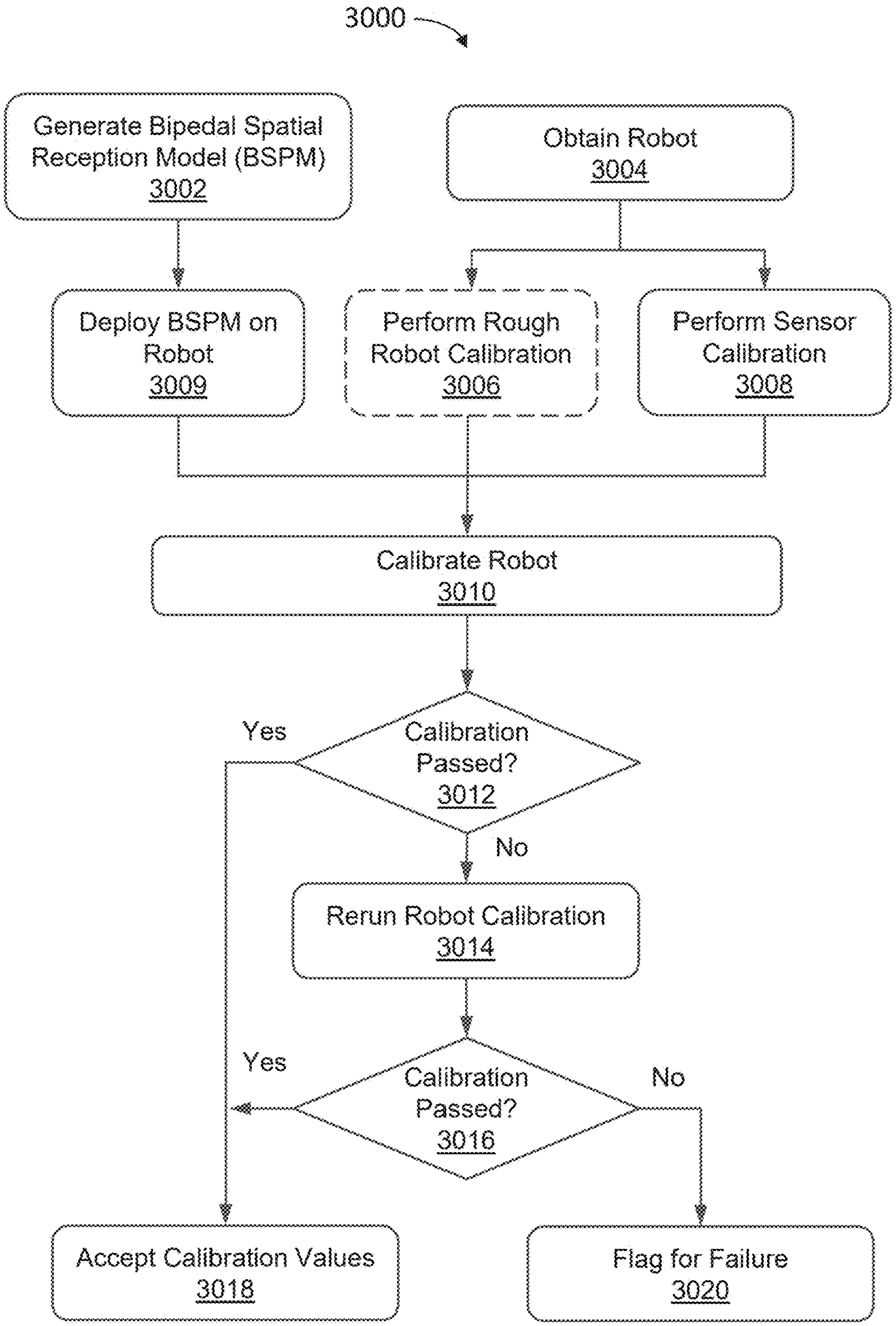
FIG. 9 is a flowchart showing a calibration process for the humanoid robot of FIGS. 1-3B.

A general process for calibrating a humanoid robot is outlined in the flowchart in FIG. 9. The general calibration process 3000 commences at step 3002 with the generation or acquisition of a bipedal spatial perception model (BSPM). This BSPM can be configured to detect objects in an image, including keypoints on the robot's own components (e.g., its feet and end-effectors). In addition to the generation of the BSPM, the physical robot 1 can be obtained at step 3004. Recognizing the inherent discrepancies that may exist between the factory calibration settings and the actual hardware of robot 1, a preliminary, or "rough," robot calibration can optionally be performed at step 3006. This optional step may involve coarse adjustments to the robot's sensors and actuators to bring them into a general operational state. Previous to, during, and/or subsequently, a dedicated sensor calibration can be performed at step 3008. This step focuses on accurately characterizing the intrinsic and extrinsic parameters of the robot's onboard sensors, such as its head-mounted cameras, to ensure the integrity and accuracy of the measurement data that will be collected during the main kinematic calibration phase.

Once the initial setup of obtaining the BSPM (3002), deploying the BSPM on the robot (3009), calibrating the robot sensors (3008), and optionally performing the rough robot calibration (3006) is complete, the main robot calibration step 3010 can then proceed. This step may involve a process of replacing or updating the biases or other parameters of the kinematic model. This update may be based upon: (i) the detected location of a plurality of keypoints that are positioned on the end effectors and/or feet, as determined using the BSPM, (ii) the calculated differences between the detected location of the plurality of keypoints on said end effectors and feet and a measured or kinematic-based location of the plurality of keypoints on said end effectors and/or feet, and/or (iii) determining the revised biases or parameters of the kinematic model that serve to minimize the discrepancy between said detected locations and the measured or kinematic-based locations. To help ensure that adjustments to the biases are correct and based on sufficiently rich data, the robot may be programmed to perform a known calibration routine, wherein its components are moved in a predetermined and observable manner. In some embodiments, the system predicts upcoming tasks and selects calibration poses that emphasize informative Jacobian directions for those tasks, thereby yielding better accuracy where it matters operationally. Pose selection may maximize a task-weighted Fisher Information Metric, and candidates may be filtered to maintain keypoint visibility while respecting joint-limit, self-collision, and energy-use constraints.

Once all of the biasing values have been adjusted, a validation check can be performed at step 3012 to determine if the calibration has met predefined accuracy criteria. If the calibration fails to meet the standards, the process may move to step 3014 to rerun the robot calibration, possibly with different initial conditions or optimization parameters. Following the rerun, a second validation check may occur at step 3016 to re-evaluate the outcome.

The process 3000 concludes based on the results of these validation checks. If the calibration is deemed successful at either the first check (step 3012) or the second check after a rerun (step 3016), the process proceeds to step 3018 to accept the new calibration values. At this stage, the newly identified calibration parameters are adopted, and the robot's internal control model is updated to reflect the revised kinematic biases, thereby completing the procedure successfully. However, if the calibration fails the second validation check at step 3016, the process moves to step 3020, where the calibration is flagged for failure. This final state indicates that the automated procedure was unable to achieve the standards even after a second attempt, signaling a potential need for manual intervention, further diagnostics, or hardware inspection. This systematic process 3000 provides a robust method for accurately calibrating a humanoid robot's kinematic model using its own onboard vision systems.

b. Generating the Bipedal Spatial Perception Model (BSPM)

Figure 10:
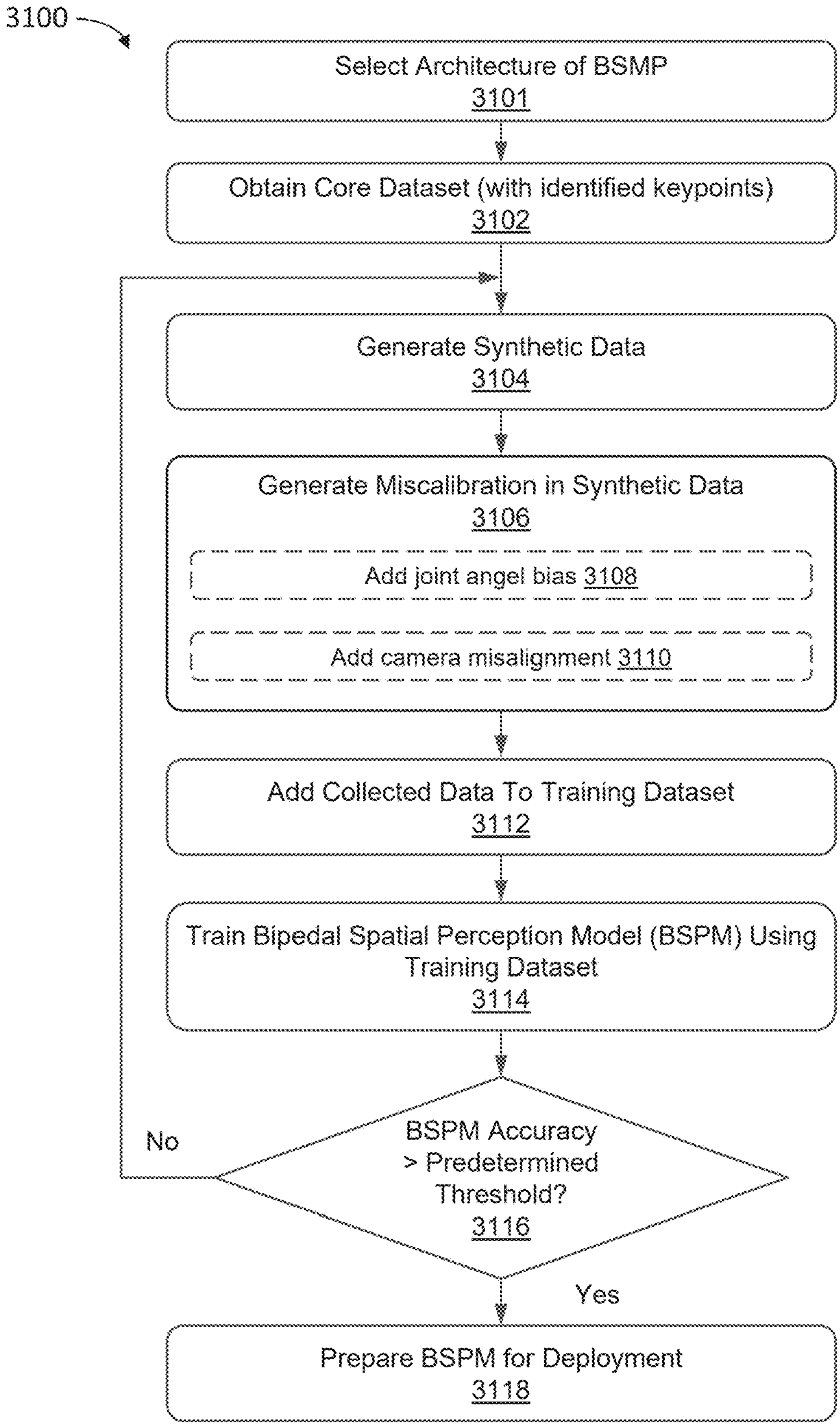
FIG. 10 is a flowchart showing a process for generating a first embodiment of a bipedal spatial perception model (BSPM) configured for use in the calibration process of FIG. 9.

Specifically, FIG. 10 provides a flowchart depicting a method 3100 for generating the BSPM. This method may include: (i) selecting or obtaining an architecture for the bipedal spatial perception model in block 3101, (ii) generating a comprehensive training dataset for the bipedal spatial perception model in blocks 3102-3112, (iii) training the bipedal spatial perception model, which may be any type of machine learning, deep learning, and/or generative AI-based model, in block 3114, and (iv) preparing the trained bipedal spatial perception model for deployment on a humanoid robot in block 3118.

i. Select Architecture

The first step (3101) in generating a bipedal spatial perception model is to select its architecture. Said selection may include selecting: (i) the number of model(s), (ii) the location for training the model(s), (iii) the location for running the model(s), and/or (iv) the identification of how the model(s) will interact with one another. For example, the design may select the use of a single model, that is trained in a remote AI system 2780, is designed to be run on the robot (e.g., at the edge), and the use of one model eliminates the need to determine interactions between models. However, in other embodiments, more than one model (e.g., between 2 and 10) may be used, the models may be split between a remote AI system 2780 and a local AI system 1470, and they may interact with each other using latency vectors or other communication protocols.

In addition to selecting the above factors, the designer can also select the type or technology of the model(s), the number of layers contained within each model, how many attention heads are used, the context windows, the number of parameters, the frequency that the model runs at, and/or any other known factor or parameter. For example, the design may select any type, combination, or hybrid of any machine learning model, which includes: generative models (e.g., generative adversarial networks (GANs) (DCGAN, CycleGAN, Pix2Pix, StyleGAN, BigGAN, conditional GANs), variational autoencoders (VAEs) (conditional VAE, VQ-VAE), diffusion models (DDPM, DALL-E 2), autoregressive models (PixelRNN, PixelCNN, Gated PixelCNN), super-resolution models (SRCNN, SRGAN, ESRGAN, EDSR), image inpainting and restoration models (context encoders, partial convolutions, DeepFill)), vision transformer models (e.g., core vision transformer models (vision transformer (ViT), DeiT (data-efficient image transformers), swin transformer, PVT), or hybrid models (CaiT, CvT, conformer)), attention-based models (e.g., Self-Attention Models (SAGAN, non-local neural networks), or spatial and channel attention (SE-ResNet, CBAM, BAM)), generative models utilizing graphs and geometry (e.g., graph-based models (GCNs, geometric deep learning models), or 3D generative models (3D-GAN, PointNet++, VoxelNet)), multi-modal and cross-modal models (e.g., image captioning models (Show and Tell, Show, Attend and Tell, transformer-based image captioning), visual question answering (VQA) models (MAC Network, Pythia, ViLT), or image-text retrieval models (CLIP, ALIGN, DALL-E), self-supervised and unsupervised models, neural architecture search (NAS) models, hybrid models integrating CNNs and transformers, multi-task and multi-objective models, optimization and regularization techniques in image models (e.g., data augmentation techniques, regularization techniques, loss functions specific to image tasks), Transfer Learning and Pre-Trained Models for Images (e.g., pre-trained CNNs, pre-trained transformer models), neural radiance fields (NeRF), self-supervised learning models, meta-learning models for images, few-shot and zero-shot learning models, multi-scale and multi-resolution models, neural architecture adaptations, and/or any combination or alteration of the above models.

Further, the designer can specify that the identified model (s) include any one of or be based on the technology described in the following papers: Radford, Alec, et al. "Learning transferable visual models from natural language supervision." International conference on machine learning. PMLR, 2021, Li, Yangguang, et al. "Supervision exists everywhere: A data efficient contrastive language-image pre-training paradigm." arXiv preprint arXiv: 2110.05208 (2021), Yao, Lewei, et al. "Filip: Fine-grained interactive language-image pre-training." arXiv preprint arXiv: 2111.07783 (2021), Rombach, Robin, et al. "High-resolution image synthesis with latent diffusion models." Proceedings of the IEEE/CVF conference on computer vision and pattern recognition. 2022, Li, Junnan, et al. "Blip: Bootstrapping language-image pre-training for unified vision-language understanding and generation." International conference on machine learning. PMLR, 2022, Zhang, Renrui, et al. "Llama-adapter: Efficient fine-tuning of language models with zero-init attention." arXiv preprint arXiv: 2303.16199 (2023), Liu, Haotian, et al. "Visual instruction tuning." Advances in neural information processing systems 36 (2024), Liu, Haotian, et al. "Improved baselines with visual instruction tuning." Proceedings of the IEEE/CVF Conference on Computer Vision and Pattern Recognition. 2024, Lin, Ji, et al. "Vila: On pre-training for visual language models." Proceedings of the IEEE/CVF Conference on Computer Vision and Pattern Recognition. 2024, Jin, Yang, et al. "Unified Language-Vision Pretraining in LLM with Dynamic Discrete Visual Tokenization, arXiv 2024." arXiv preprint arXiv: 2309.04669, Maniparambil, Mayug, et al. "Do Vision and Language Encoders Represent the World Similarly?." Proceedings of the IEEE/CVF Conference on Computer Vision and Pattern Recognition. 2024, Liu, Daizong, et al. "A Survey of Attacks on Large Vision-Language Models: Resources, Advances, and Future Trends." arXiv preprint arXiv: 2407.07403 (2024), Chang, Yupeng, et al. "A survey on evaluation of large language models." ACM Transactions on Intelligent Systems and Technology 15.3 (2024): 1-45, Yin, Shukang, et al. "A survey on multimodal large language models." arXiv preprint arXiv: 2306.13549 (2023), Zhang, Duzhen, et al. "Mm-llms: Recent advances in multimodal large language models." arXiv preprint arXiv: 2401.13601 (2024), Vaswani, A. "Attention is all you need." Advances in Neural Information Processing Systems (2017), Radford, A. "Improving language understanding by generative pre-training." (2018), Wang, Wei, et al. "Structbert: Incorporating language structures into pre-training for deep language understanding." arXiv preprint arXiv: 1908.04577 (2019), Radford, Alec, et al. "Language models are unsupervised multitask learners." OpenAI blog 1.8 (2019): 9, Liu, Yinhan. "Roberta: A robustly optimized bert pretraining approach." arXiv preprint arXiv: 1907.11692 (2019), Sanh, V. "DistilBERT, A Distilled Version of BERT: Smaller, Faster, Cheaper and Lighter." arXiv preprint arXiv: 1910.01108 (2019), Raffel, Colin, et al. "Exploring the limits of transfer learning with a unified text-to-text transformer." Journal of machine learning rescarch 21.140 (2020): 1-67, Brown, Tom B. "Language models are few-shot learners." arXiv preprint arXiv: 2005.14165 (2020), Touvron, Hugo, et al. "Llama 2: Open foundation and fine-tuned chat models." arXiv preprint arXiv: 2307.09288 (2023), Schulman, John, et al. "Proximal policy optimization algorithms." arXiv preprint arXiv: 1707.06347 (2017), Radford, Alcc, et al. "Learning transferable visual models from natural language supervision." International conference on machine learning. PMLR, 2021, Li, Yangguang, et al. "Supervision exists everywhere: A data efficient contrastive language-image pre-training paradigm." arXiv preprint arXiv: 2110.05208 (2021), Chen, Zhe, et al. "Internvl: Scaling up vision foundation models and aligning for generic visual-linguistic tasks." Proceedings of the IEEE/CVF Conference on Computer Vision and Pattern Recognition. 2024, all of which are incorporated herein by reference and in their entirety for any purpose.

In addition to, or instead of, using any one of the above model(s), the designer may specify that the BSPM includes a feature extractor. The feature extractor is configured to detect features in the input image data such as edges, shapes, motion, and textures in the image and transmit data describing these features to other processes. In an embodiment, the feature extractor may be implemented as a feature pyramid network (FPN), which is suitable for multi-scale feature extraction, such as in images where objects can appear at different sizes, scales, and orientations. As is known, an FPN is a feature extractor that generates multiple feature map layers (also known as multi-scale feature maps) in a bottom-up and top-down pathway resembling a pyramid. The bottom-up pathway uses a standard convolutional network, which may be an SE (3)-equivariant backbone to improve viewpoint robustness, to extract features at progressively decreasing spatial resolutions and increasing semantic depth. The top-down pathway then constructs high-resolution layers by upsampling the semantically rich feature maps and merging them with corresponding feature maps from the bottom-up pathway via lateral connections, ensuring that features at every scale have access to both fine-grained detail and high-level semantic information. The resulting feature maps are then output for downstream processing.

FPNs are described further in the context of image processing in the following papers: Lin, Tsung-Yi et al., "Feature Pyramid Networks for Object Detection," arXiv: 1612.03144 (2016); Kirillov, Alexander et al., "Panoptic Feature Pyramid Networks," CVPR, 2019, Jia, Yuhang et al., "Densely Connected Feature Pyramid Networks for Image Segmentation," IEEE (2020), Zhao, Gangming et al., "GraphFPN: Graph Feature Pyramid Network for Object Detection," arXiv: 2108.00580 (2021), Kim, Seung-Wook et al., "Parallel feature pyramid network for object detection," Proceedings of the European Conference on Computer Vision, pp. 234-250 (2018), all of which are incorporated herein by reference and in their entirety for any purpose. Other examples of feature extractors 3304 that can be adapted to the BSPM include: (i) any one of the above models, (ii) other models that are similar to an FPN, which include variants and extensions of feature pyramid networks (e.g., PANet (path aggregation network), bi-directional feature pyramid with adaptive feature fusion (BiFPN+), NAS-FPN (neural architecture search feature pyramid network), HR-FPN (high-resolution feature pyramid network), TDM-FPN (task-driven multi-scale feature pyramid network), multi-scale feature aggregation models (e.g., spatial pyramid pooling (SPP), atrous spatial, pyramid pooling (ASPP), pyramid scene parsing network (PSPNet), deep layer aggregation (DLA), Libra R-CNN), transformer-based multi-scale models (e.g., swin transformer (Shifted Window Transformer), pyramid vision transformer (PVT), VOLO (vision outlooker), Hybrid (e.g., YOLOv5 with PANet, CenterNet, FCOS), Other (e.g., Libra R-CNN, GFPN (gaussian FPN)), and/or any combination thereof, and/or (iii) any other known machine learning model.

ii. Generating Training Data

Once the architecture of the bipedal spatial perception model is selected, the designer must obtain training data to generate the model in blocks 3102-3112 of FIG. 10. Obtaining said training data starts with obtaining a core dataset in block 3102. Said core dataset may be obtained from: (i) visual image data collected from the real world, and/or (ii) visual data generated from detailed computer-aided design (CAD) objects along with their associated structural, mechanical, and physical properties. These properties may be modeled using finite element analysis (FEA) or any other type of modeling analysis to simulate how objects might deform under load, providing an additional layer of realism to the training data. If the core dataset includes visual image data collected from the real world, detailed information about the object's physical properties (e.g., size, thickness, border, length, width, etc.) and spatial position (e.g., its 6-DOF pose represented by X, Y, Z, and orientation as a quaternion or Euler angles x', y', z') will be provided with the visual image as ground truth. These physical properties and the spatial position may be provided by a human annotator or, preferably, by a machine. For example, said physical properties and spatial position may be provided by a machine that moves or rotates a part in space in front of a vision sensor (e.g., camera), wherein the movement of the part is known with high precision because it is controlled by a calibrated precision robot, allowing for automatic and accurate ground truth data generation. Additionally or alternatively, the core dataset may include: (i) joint measurements for each object if it is articulated, (ii) focal length and other intrinsic measurements associated with the camera, and (iii) robot arm texture data (which can be used to ascertain distance from the robot 1 to the object). Furthermore, keypoints can be added to or indicated on any data component described above, including CAD images and/or physical robot components. Preferably, the keypoints will be the same keypoints that are utilized during runtime. This symmetry between the training dataset and the runtime dataset will reduce the errors during runtime use of the model. However, it should be understood that the keypoints and robot models used during the training of the BSPM may differ from the robot components analyzed during runtime.

Once the core dataset is obtained in block 3102, a sufficiently large training dataset may be generated. This training dataset may include: (i) the original image data from the core dataset, (ii) annotated data related to the core dataset, (iii) a large volume of images from the synthetic data, and/or (iv) the configurable parameters used to generate the synthetic data, wherein said configurable parameters have been modified using a computer program. Because the exact modification of the core dataset is known as it is based on a simulation, then perfect ground truth is known for each of the images contained in the synthetic data. Unlike the training of many other models, the training of the bipedal spatial perception model may be based primarily, or almost solely, on generated or synthetic data. For example, the real data contained in the core dataset constitutes a small fraction, for example between 0.00000001% and 20%, preferably below 10%, and most preferably below 1% (e.g., between 80% and 99.99999% synthetic data), of the data contained in the overall training dataset. In other words, the core dataset is much smaller than the synthetic dataset, wherein a combination of the core dataset and the synthetic dataset form the complete training dataset. It is desirable to have the core dataset be significantly smaller than the synthetic dataset due to the difficulty and expense of accurately determining the location of keypoints contained in a real-world image. While the percentage of the core dataset to the synthetic dataset may be significantly different, the designer of the training data should review at least a portion of the images contained in the synthetic dataset to ensure that visual artifacts or unrealistic hallucinations are not prevalent. Additionally or alternatively, the training dataset may omit the core dataset and may only include synthetic data. However, doing so may degrade the accuracy of the BSPM because: (i) hallucinations in the training data may be more prevalent, and (ii) the BSPM can only be trained on data that has been generated by another model; thus, subtle randomness and other real-world factors may be omitted or missing from the dataset.

Figure 11C:
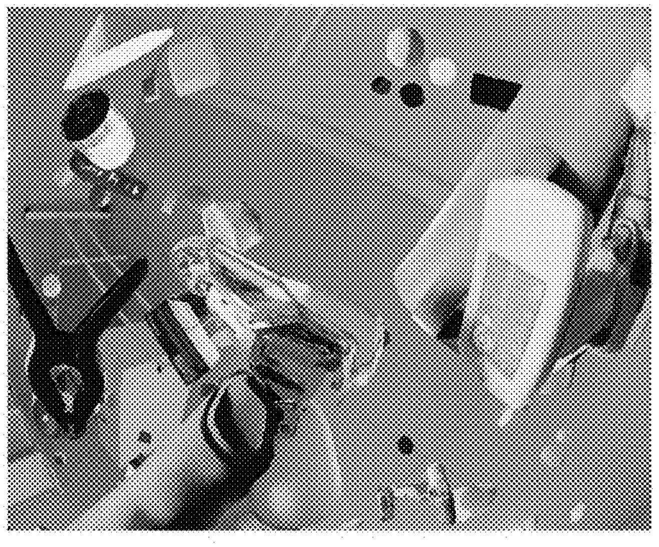
FIGS. 11A-11C are exemplary images depicting a robot foot rendered in various simulated three-dimensional (3D) environments, which are used as synthetic data for training the BSPM of FIG. 10.
Figure 11B:
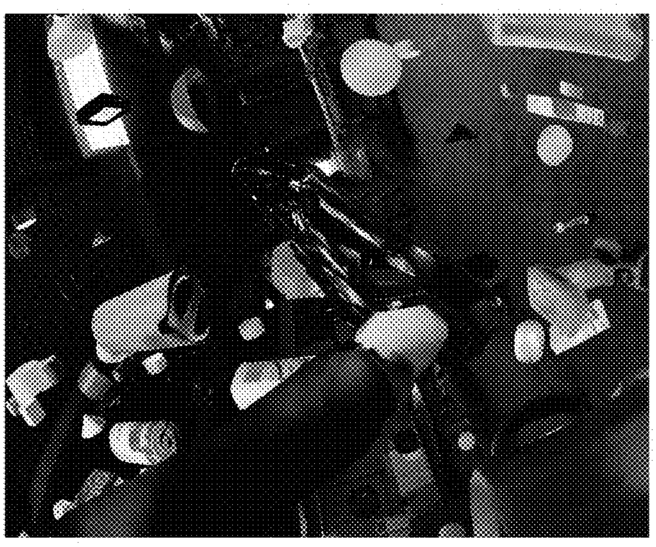
Figure 11A:
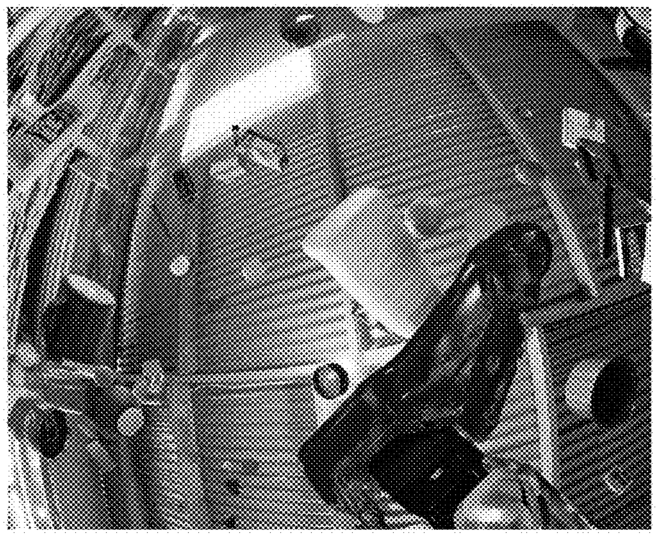

In order to generate the 3-dimensional (3D) synthetic dataset in block 3104, an alternative, secondary, or different machine learning model may be used to alter or modify the configurable parameters of the core dataset in a process often referred to as domain randomization. The configurable parameters of the core dataset include, but are not limited to: (i) type of objects (e.g., sheet metal, cans, stuffed animals, plates, machines, etc.), (ii) characteristics of objects (e.g., types, shapes, sizes, material properties, textures, position, rotation, vectors, etc.), (iii) robot 1 configurations and poses (3108), (iv) environmental parameters (e.g., lighting direction and intensity, climate conditions, backgrounds, the number and position of light sources), (v) intrinsic camera parameters (e.g., focal length, skew coefficient, optical center, aperture, lens distortions), (vi) an occlusion measure (e.g., a rate by which one or more objects in the scene may be partially occluded by other objects in the scene), (vii) camera position and angles (3110), (viii) 2D image data effects like motion blur or noise, (ix) any other known configurable parameter, and/or (x) any combination of the above. For illustrative purposes, FIGS. 11A-11C are provided as an example of the training data that may be used.

It should be understood that the changes to the configurable parameters may be completely random within specific ranges. Or, changes to the configurable parameters may be strategically chosen based on any number of specific factors, creating a form of curriculum learning. Said specific factors may include: (i) the probability of an object being located in that position based on the identified tasks that the robot will likely be performing, (ii) the type of object the robot will likely interact with, or (iii) the likelihood of a certain environmental condition or background being seen by the robot in its target operational domain. Further, the temperature or the randomness of the alternative, secondary, or different machine learning model may be varied to determine how far the configurable parameters alter or change the configurable parameters of the core dataset. Other factors, variables, or types of models (e.g., two different models may be used) may be used to generate the synthetic dataset. For instance, a closed-loop active synthetic data generation process may be used, where the perception model triggers targeted simulation renders for failure modes such as glare or occlusion, and this newly generated data continuously augments the training corpus.

iii. Training the BSPM

Once the training dataset has reached a first pre-determined size threshold, the bipedal spatial perception model can be trained (in block 3114) on said training dataset. Whether the training dataset has reached a first pre-determined size threshold may be determined by setting a pre-determined value, wherein the predetermined value may be set by a human or by a computing architecture. For example, the predetermined value may be based on: (i) a ratio of the number of permutations of configurable parameters contained in the dataset versus the total number of possible permutations, ensuring adequate coverage of the parameter space, or (ii) the number of known permutations that will likely be experienced by the BSPM in its deployment environment. Additionally, the predetermined value may be based on the available computing resources for training the BSPM. In particular, a larger dataset may be generated if there is more time and additional resources to train the BSPM. Alternatively, a smaller dataset may be generated if there is less time and/or fewer resources to train the BSPM. Finally, the predetermined value may also be simply based on the overall size of the dataset (e.g., contains any value between 10,000 to 10,000,000 images), the storage density of the dataset (e.g., includes any value over 2Gb to 500 Gb), and/or any other value that can measure the size of a dataset.

Said training of the BSPM can be carried out on any system using the training dataset that has reached the first pre-determined size threshold, including a computing system at a command center, a computing node of a cloud-based AI system 2780, or the computing architecture 1100 of the humanoid robot 1. The training of the BSPM can utilize any known method of training a model, some methods that may be used include: (i) supervised learning techniques (e.g., classification, regression, etc.), (ii) unsupervised learning (e.g., clustering, dimensionality reduction, anomaly detection, etc.), (iii) transfer learning (e.g., by leveraging pre-trained models), (iv) reinforcement learning (e.g., model-free methods, model-based methods), (v) semi-supervised learning (e.g., training with labeled and unlabeled data), (vi) any other known training method, and/or (vii) any combination thereof.

Specifically, supervised learning may include training the model on the large dataset consisting of the data contained in the generated training dataset. This approach allows the BSPM to adjust its internal parameters (weights and biases) to minimize a defined loss function, which measures the error between the BSPM outputs (e.g., the location of keypoints, revised kinematic biasing weights, and/or pose of the robot 1) and the known ground truth provided in said training dataset. This loss function may be a composite of multiple losses, such as Dice loss for segmentation, Intersection over Union (IoU) loss for object detection, and mean squared error or LI loss for pose vector components, thereby refining its ability to generate accurate and contextually relevant outputs. In addition to supervised learning, unsupervised learning techniques may be employed to further enhance the BSPM. These techniques primarily focus on identifying patterns and structures within the training dataset itself without explicit labels. For example, the BSPM can be trained using unsupervised methods such as clustering or self-supervised learning, where it learns to: (i) group similar objects together, (ii) identify similar visual features, and/or (iii) predict missing parts of objects or the robot. Transfer learning is another method used to fine-tune or train the BSPM. In this approach, the BSPM is first pre-trained on a large, general-purpose dataset and then fine-tuned on the smaller, domain-specific synthetic dataset. This allows the model to leverage the knowledge it has already acquired during pre-training and apply it to more specialized tasks, significantly reducing the amount of data and computational resources for training. In some embodiments, a small set of labeled real images may be used to adapt the detector after hardware changes in a few-shot domain adaptation process, maintaining accuracy while limiting annotation burden. Reinforcement learning can also be applied to train or fine-tune the BSPM. In this method, the model is trained to make decisions based on inputs, with the goal of maximizing a reward signal, such as one based on successful task completion. Finally, semi-supervised learning techniques can be utilized to fine-tune or train the BSPM when a limited amount of labeled training data is available.

Next, in block 3116, the accuracy of the trained BSPM can be determined by comparing the BSPM outputs (e.g., the location of keypoints, revised kinematic biasing weights, and/or pose of the robot 1) to the actual, ground truth parameters of a test dataset. Said test dataset may be contained within the training data as a hold-out set or may be a new dataset that the BSPM has never reviewed or seen before. If the accuracy of the comparison between the BSPM outputs and the ground truth parameters, as measured by relevant metrics like Intersection over Union (IoU) for detection or Average Distance of model points (ADD) for pose, is greater than a predetermined value (e.g., 90%, 95%, 97%, 99.5%), then the training of the BSPM is finalized and it is ready for deployment on the humanoid robot. This accuracy determination helps ensure that the BSPM can accurately generalize its learning to detect keypoints and/or generate biasing values for unseen robot configurations, new environmental parameters, different intrinsic camera parameters, and varying camera positions or angles.

However, if the accuracy of the comparison between the BSPM outputs and the ground truth parameters is less than the predetermined value (e.g., 90%, 95%, 97%, 99.5%), further training of the BSPM may be performed. This further training may involve: (i) generating a training dataset that has a second pre-determined size threshold, wherein the second pre-determined size threshold is larger than the first pre-determined size threshold, and then further training the BSPM using any known training method, (ii) using additional or different training methods on the same training dataset, (iii) generating a new training dataset that includes specific target domain data to bolster specific inaccuracies of the BSPM (e.g., specific target domain data may focus on identification of a specific keypoint located on an edge of a foot, if the BSPM consistently failed to properly identify the keypoint), or (iv) any other known method of improving the accuracy of the BSPM. The further training of the BSPM is completed after its accuracy of the comparison between the BSPM outputs and the ground truth parameters is greater than a predetermined value (e.g., 90%, 95%, 97%, 99.5%).

Before deployment in block 3118, the BSPM may undergo optimization and quantization (e.g., to 8-bit integer precision) to ensure it can execute with low latency on the robot's onboard hardware. For example, the perception network may be trained with quantization and structured sparsity to run on edge accelerators, achieving latency reductions without materially degrading accuracy. Such quantization-aware training with structured sparsity allows the perception network to run efficiently on edge accelerators with minimal degradation in accuracy. Once retrieved, the humanoid robot 1 may store the model therein. The model may be instantiated upon booting or rebooting the robot or based on a specification by a human operator or an automated command. Referring back to FIG. 9, the humanoid robot 1 may use or execute the BSPM during the operation of said robot 1. Further details about the use or execution of the BSPM are described below and in connection with FIGS. 15-16.

c. Sensor Calibration

While the BSPM is being generated in block 3002, the robot's sensors 1.2.8 (e.g., vision sensors 1.2.8.6) are calibrated in block 3008. The camera calibration procedure provides for the determination of: (i) the position and angle of the cameras relative to the installed robot component, (ii) the camera position and angle relative to one another, as said cameras are not directly coupled to the same PCB, (iii) any other intrinsic or extrinsic camera parameter(s) (e.g., focal length, skew coefficient, optical center, aperture, lens distortions) that may vary during installation or manufacturing, and/or (iv) any other camera value that may need to be calibrated to obtain accurate data from the sensors.

Figure 12B:
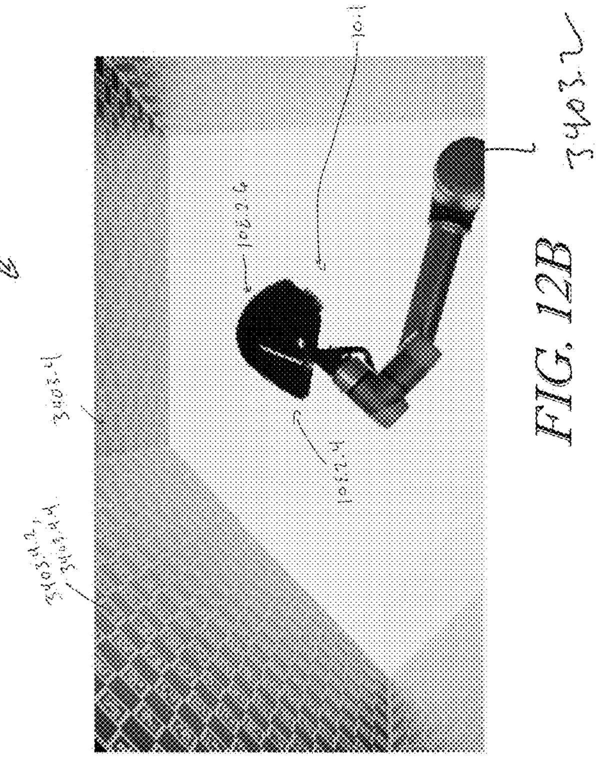
FIGS. 12A-12C are perspective views of a camera calibration system for calibrating head-mounted cameras of the humanoid robot of FIGS. 1-3B.
Figure 12A:
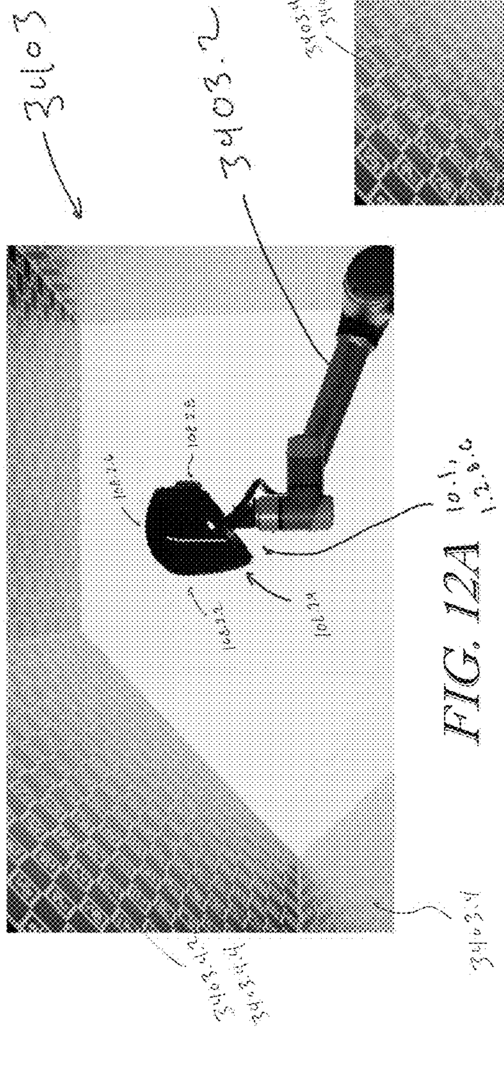
Figure 12C:
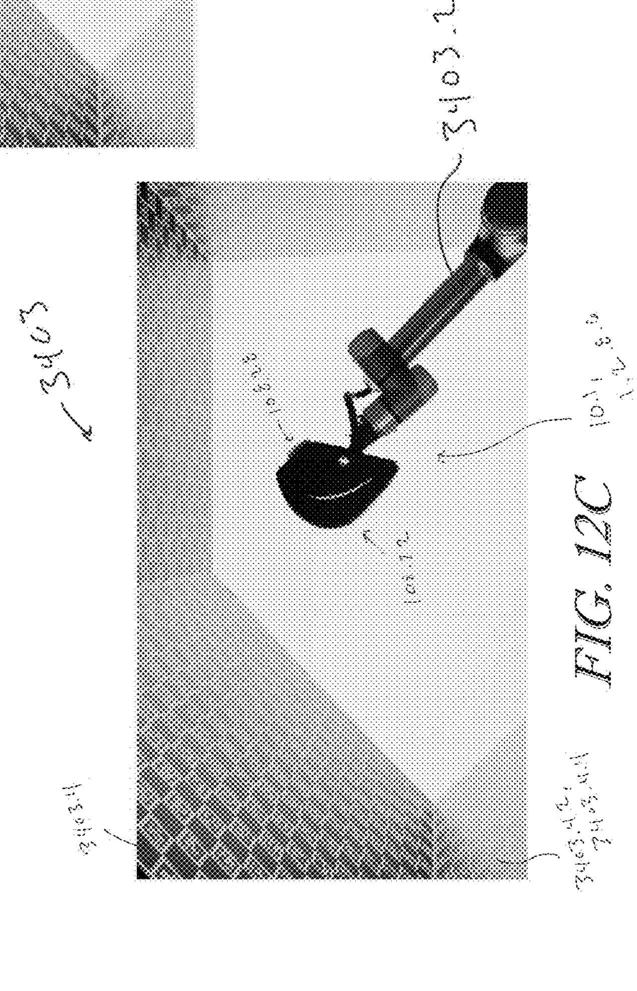

The first step in this process is to obtain the robot component (e.g., head 10.1) that includes the sensors 1.2.8 (e.g., vision sensors 1.2.8.6, and specifically the cameras 108.2.2, 108.2.4, 108.2.6, 108.2.8) that need to be calibrated. Once the robot component has been obtained, a calibration system 3403 must also be obtained. An example of said calibration system 3403 is shown in FIGS. 12A-12C, wherein said calibration system 3403 includes: (i) a movement device 3403.2 (e.g., a robotic arm) and (ii) a calibration fixture 3403.4. As shown in the figures, the calibration fixture 3403.4 has a fixed geometry that includes a known pattern or arrangement 3403.4.2 of markers or points 3403.4.4. The known pattern or arrangement 3403.4.2 may be any type of known pattern or arrangement, including a chessboard or checkerboard pattern. The markers or points 3403.4.4 may be any type of marker or point, including 2D planar markers such as ArUco, AprilTag, STag, CALTag, Whycon, TopoTag, CCTag, and/or any type of 3D marker. In one example, the calibration fixture 3403.4 may utilize a known pattern or arrangement 3403.4.2 that is a ChArUco board or any other similar board.

Once the setup has been obtained, the data acquisition phase in block 3404 can then commence. During this phase, the movement device 3403.2 is programmed to move through a series of distinct poses or configurations, as shown in FIGS. 12A-12C. At each pose or configuration, the sensor 1.2.8 captures data (e.g., an image) of the calibration fixture 3403.4. It should be understood that the programmed series may include a wide variety of distinct poses or configurations to ensure observability of all calibration parameters. Concurrently with each distinct pose or configuration where data is captured, the system 3403 also records the pose or configuration of the movement device 3403.2 based on its internal sensors (e.g., torque sensors, internal encoders, IMUs, etc.) in block 3408. Thus, the system 3403 records two data sets, wherein a first data set is the robot sensor data set and the second data set is the movement device data set.

An example of snapshots during the data acquisition phase is illustrated in FIGS. 12A-12C, which show multiple perspective views of the calibration system 3403. In this embodiment, a humanoid robot head 10.1, containing the cameras 108.2.2, 108.2.4, 108.2.6, 108.2.8 to be calibrated, is mounted on the movement device 3403.2—namely a robotic arm. The robotic arm positions the head 10.1 to face the calibration fixture 3403.4 that includes the known pattern or arrangement 3403.4.2 of markers or points 3403.4.4. FIGS. 12A-12C depict the robotic arm 3403.2 holding the head 10.1 at three different poses and orientations relative to the known pattern or arrangement 3403.4.2 of markers or points 3403.4.4.

The paired combination of the two data sets can then be analyzed via an external computer system. Said external computer system may first analyze the sensor data using: (i) the above-generated BSPM to determine the location of points, edges, lines, and/or surfaces associated with the known pattern or arrangement 3403.4.2 of markers or points 3403.4.4, and/or (ii) may use any other method of determining the location of points, edges, lines, and/or surfaces associated with the known pattern or arrangement 3403.4.2 of markers or points 3403.4.4. Once the locations of the points, edges, lines, and/or surfaces have been determined, these determined locations can be compared to the known locations of the points, edges, lines, and/or surfaces. The locations are known based off of knowing: (i) the pattern or arrangement 3403.4.2 of markers or points, (ii) the configuration of each individual marker or point 3403.4.4, (iii) the known movement of the movement device 3403.2, and/or (iv) any combination thereof. The comparison between the known locations and the determined locations may include using any known mathematical solver or optimization algorithm, which may be a non-linear least squares method, to determine the unknown transformation between the known locations and the determined locations in block 3410. The solution to the unknown transformation can then be used to adjust the intrinsic parameters (e.g., focal length, skew coefficient, optical center, aperture, lens distortions) of the sensors 1.2.8 (e.g., vision sensors 1.2.8.6, and specifically the camera 108.2.2, 108.2.4, 108.2.6, 108.2.8).

Following the intrinsic calibration for each sensor 1.2.8 (e.g., vision sensors 1.2.8.6, and specifically the camera 108.2.2, 108.2.4, 108.2.6, 108.2.8), the extrinsic parameters defining the kinematics of each camera's pose relative to the robot's head 10.1 and/or other cameras may be determined. This process may employ an iterative algorithm for updating the kinematic model's parameters, such as the Denavit-Hartenberg (DH) parameters. The process may begin by calculating the robot head's pose using the current DH parameters. This calculated pose is then compared to an actual measured pose, which may be obtained through the vision system observing a known external reference. The difference between the calculated and measured poses represents the error to be minimized. This error can be quantified by computing both position and orientation errors. The position error may be calculated as the Euclidean distance between the calculated and measured positions, while the orientation error may involve quaternion mathematics to determine the angular difference between the two orientations. This iterative comparison and error calculation cycle allows for the progressive refinement of the alignment of the coordinate frames of the sensor systems. In other embodiments, any other known transformation may be used to solve for the extrinsic parameters of all sensors 1.2.8 contained in said robot component.

To relate the calculated error to the required adjustments in the coordinate frames, the system may utilize a Jacobian matrix. The Jacobian may be constructed by treating each DH parameter as if it were a separate joint in the kinematic chain. The iterative algorithm may then use the pseudoinverse of this Jacobian matrix to update the DH parameters based on the calculated pose error vector. The process of recalculating the pose and updating the parameters is repeated until the error falls below a predefined threshold. To improve the robustness of this calibration, the system may incorporate additional error detection and correction methods. These methods may include outlier detection to remove anomalous measurements, weighted least squares to prioritize more reliable data, regularization to prevent overfitting and improve solution stability, and multi-start optimization to avoid local minima and find a global solution.

Finally, in block 3416, the computed calibration is validated and applied. The validation process may involve a series of checks that use both visual and physical feedback to assess the calibration's accuracy. In other embodiments, the calibration methodology may be extended to a multi-sensor suite. For instance, a humanoid head 10.1 may be equipped with other sensors (e.g., microphones, inertial measurement units (IMUs), positioning systems, etc.). Calibrating this heterogeneous sensor array involves not only determining the intrinsic parameters of each sensor but also finding the transformations (translations and rotations) between their respective coordinate frames. For example, in a cross-modal frame alignment, the system may estimate rigid transforms between cameras and auxiliary sensors such as IMUs or microphone arrays, after time-synchronizing measurements to a common clock. Fused observations enhance robustness under motion blur, occlusion, or acoustic/visual interference. This may involve jointly optimizing visual-inertial parameters using a factor-graph or bundle-adjustment framework, with confidence scores from each modality weighting respective residuals. Similarly, the system can calibrate the spatial relationship between cameras and microphone arrays to enable audio-visual tasks like sound source localization, using techniques such as time-difference-of-arrival estimates from the microphone array to constrain camera-to-array extrinsics. These estimated transformations can be periodically revalidated and updated during operation.

d. Deployment of the Bipedal Spatial Perception Model

Referring back to FIG. 9, once the sensor calibration has been performed in block 3008 and the optional rough robot calibration has been performed in block 3006, the BSPM can be deployed to the robot 1 in block 3009. In the event that the model is trained externally relative to the humanoid robot 1, such as on a separate computing system or node, the trained model may be transmitted to the humanoid robot 1. For instance, the computing system may automatically push the trained model to the humanoid robot 1, or make the model available to the humanoid robot 1 for retrieval (e.g., by uploading the model to a model repository accessible by the humanoid robot 1, or storing the model on a peripheral device such as a flash drive which may be connected to the humanoid robot 1).

e. Use of the Bipedal Spatial Perception Model

Figure 14:
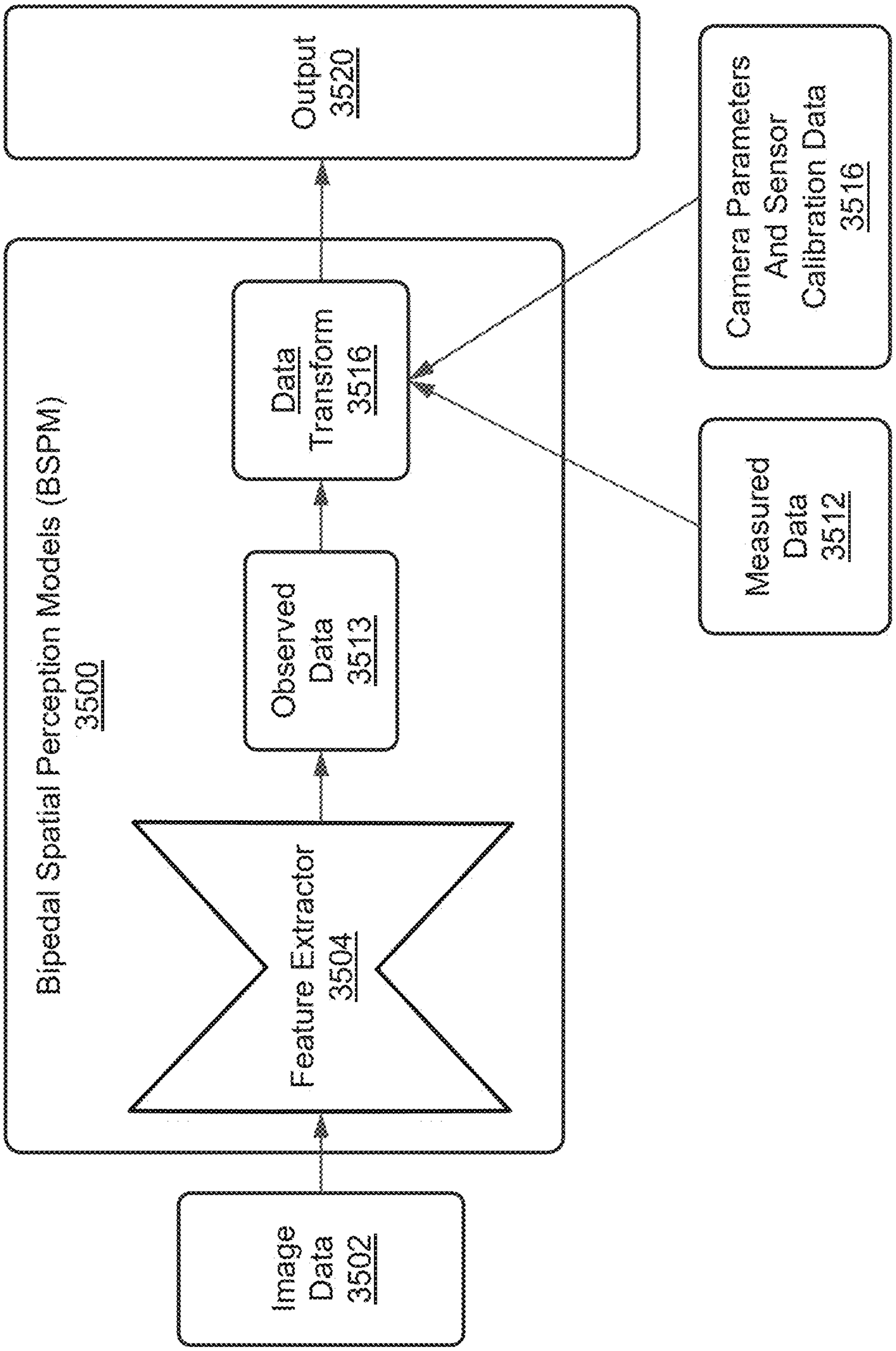
FIG. 14 is a high-level block diagram illustrating data inputs and outputs of the BSPM.
Figure 15:
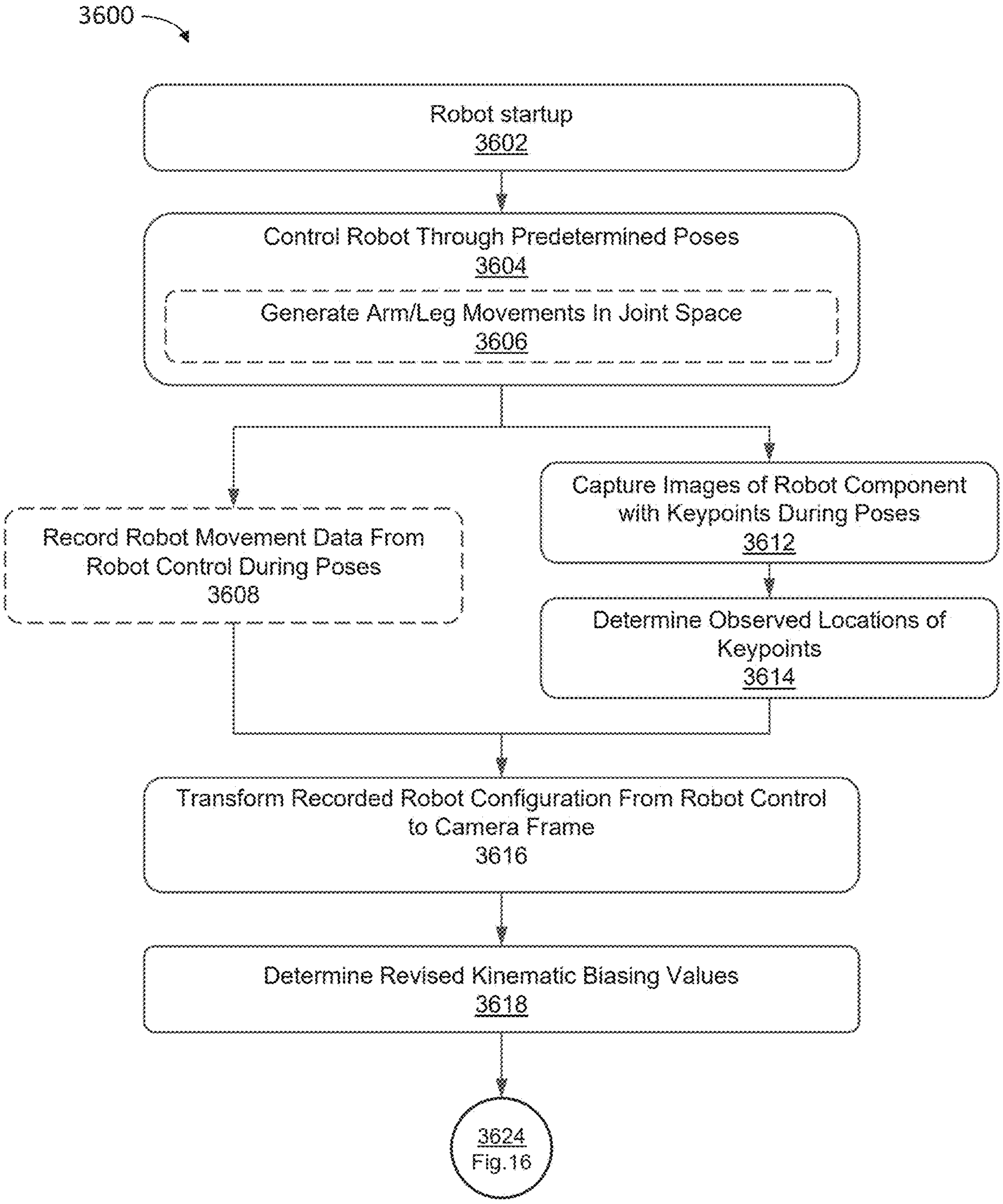
FIGS. 15 and 16 are flowcharts showing an online self-calibration process for the humanoid robot shown in FIGS. 1-3B, wherein said online self-calibration process utilizes the BSPM of FIG. 10.
Figure 16:
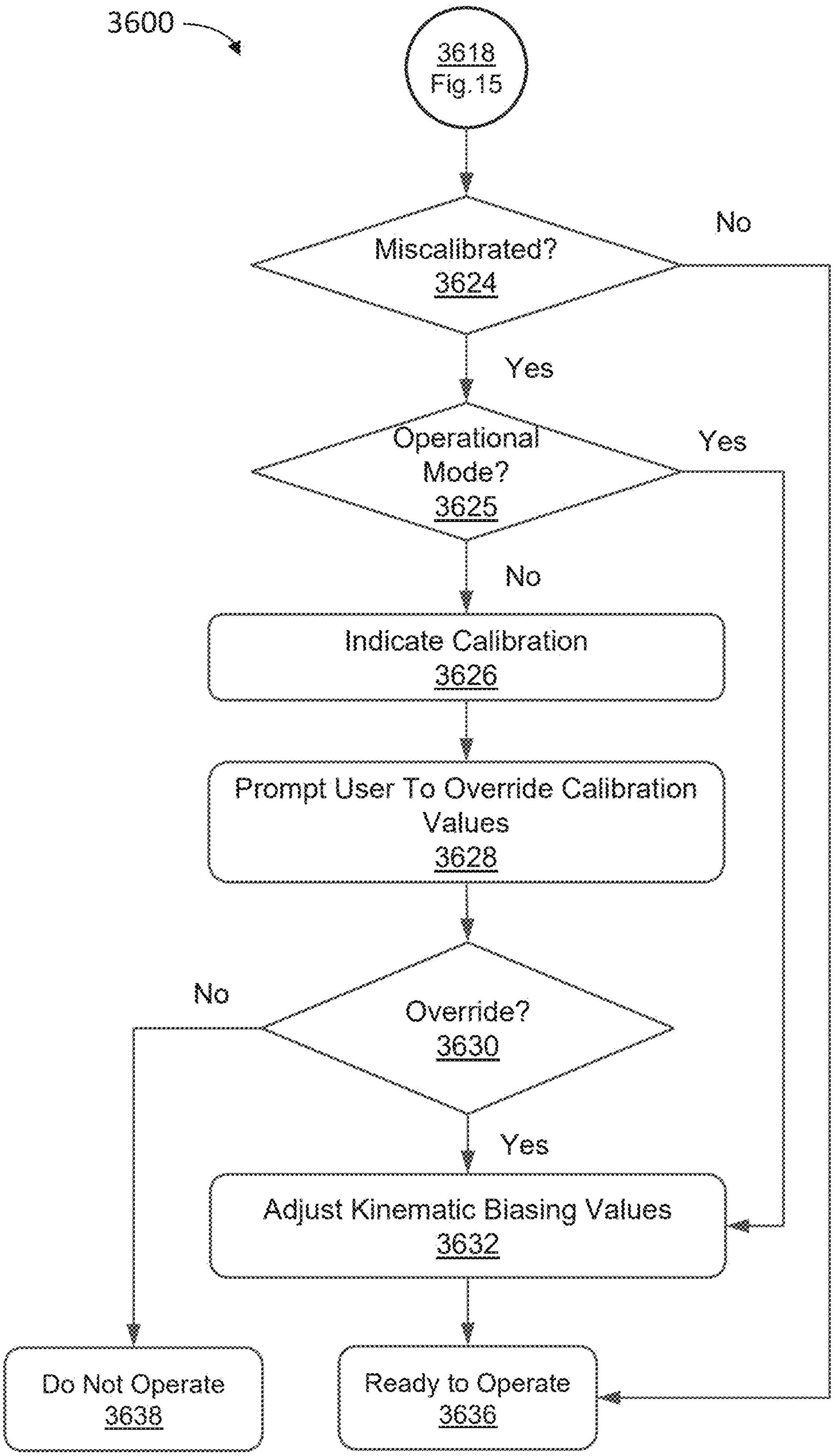
Figures 18A, 18B, 18D, 18E:
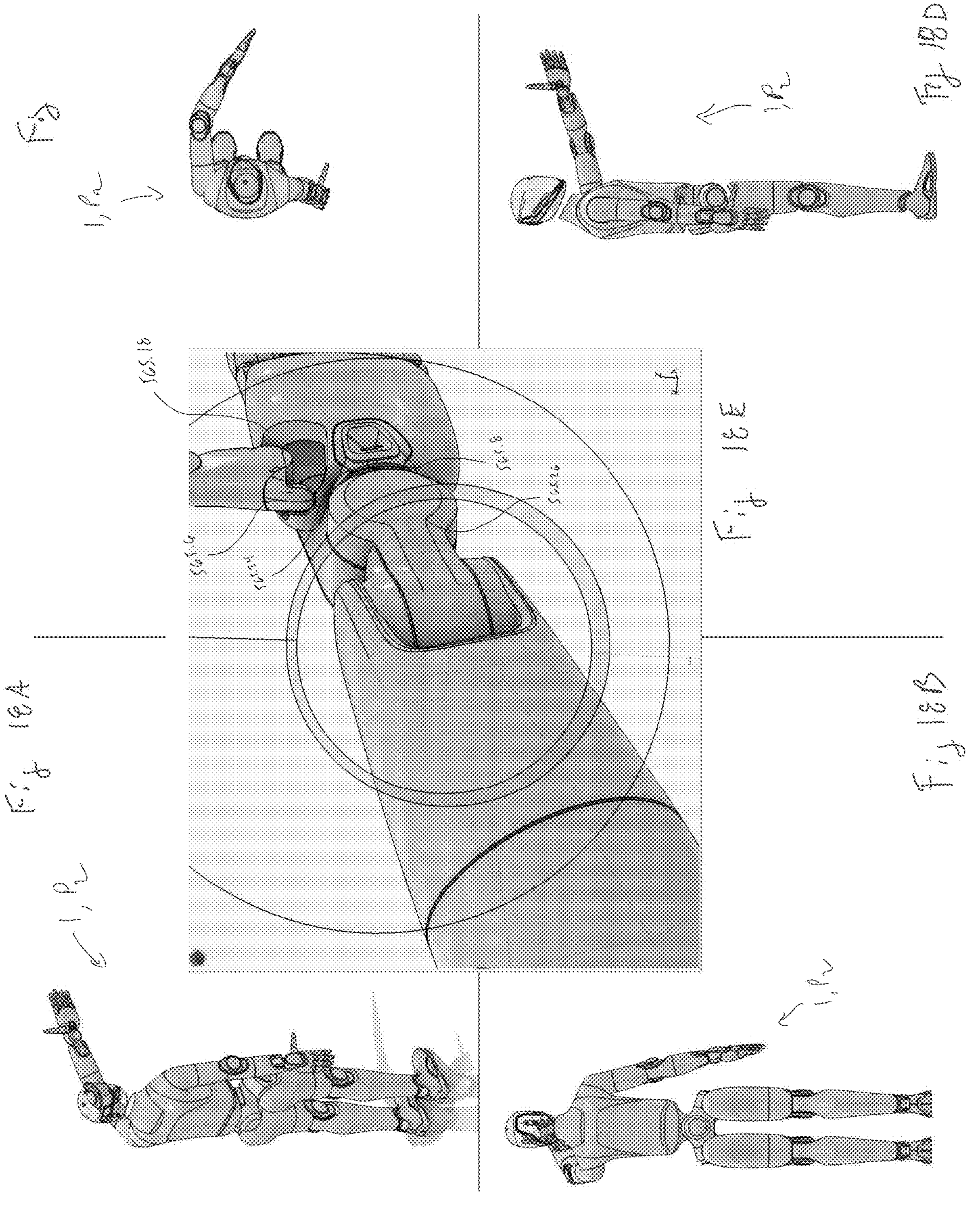
Figures 19A, 19B, 19C, 19D, 19E:
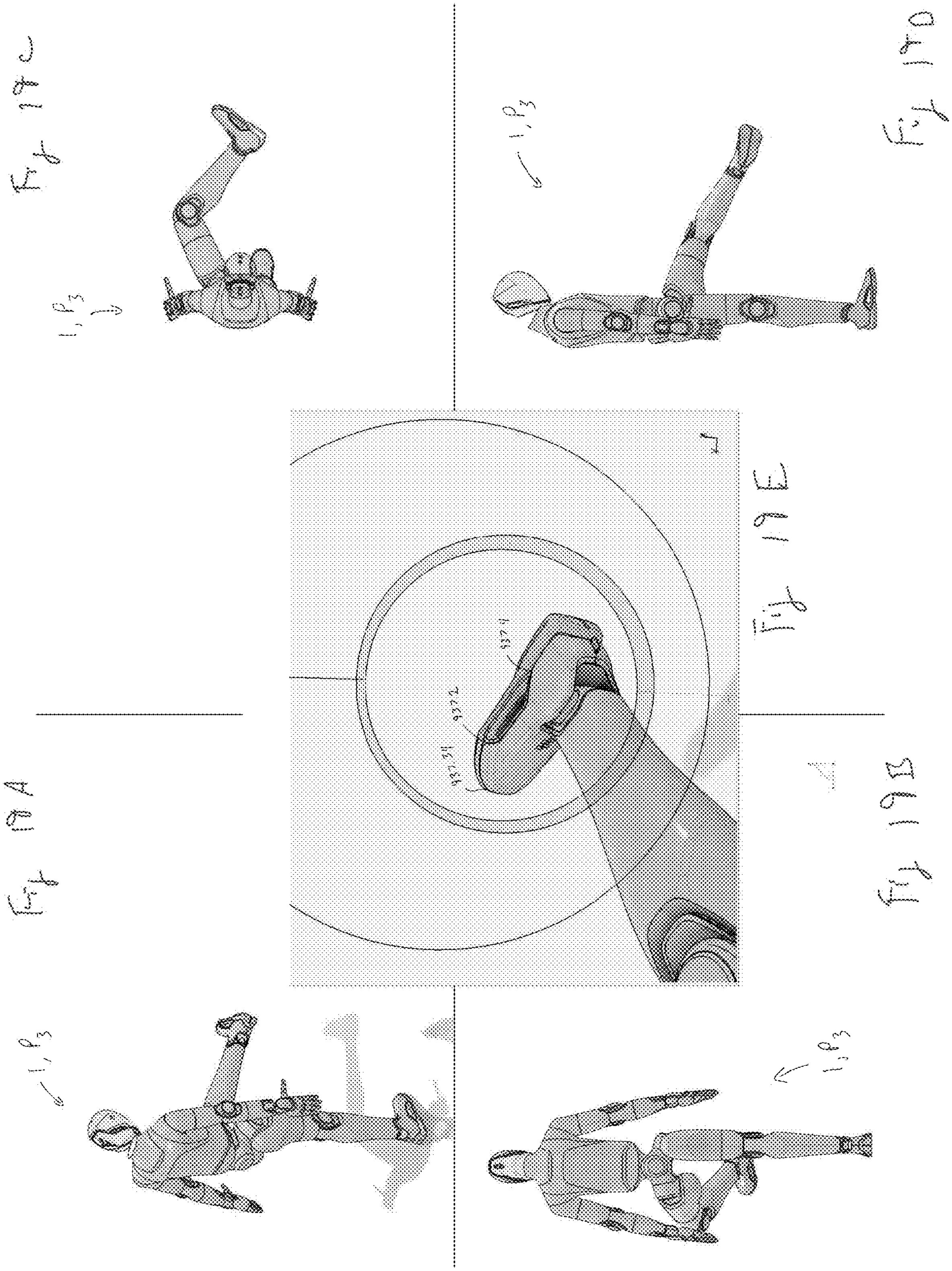
FIGS. 19A-19D are various third-person views of the humanoid robot of FIGS. 1-3B in a third pose, wherein the humanoid robot is viewing its foot in a third location.
FIG. 19E is a robot's perspective view of the foot when said humanoid robot is in the third pose.
Figures 20A, 20B, 20C, 20D, 20E:
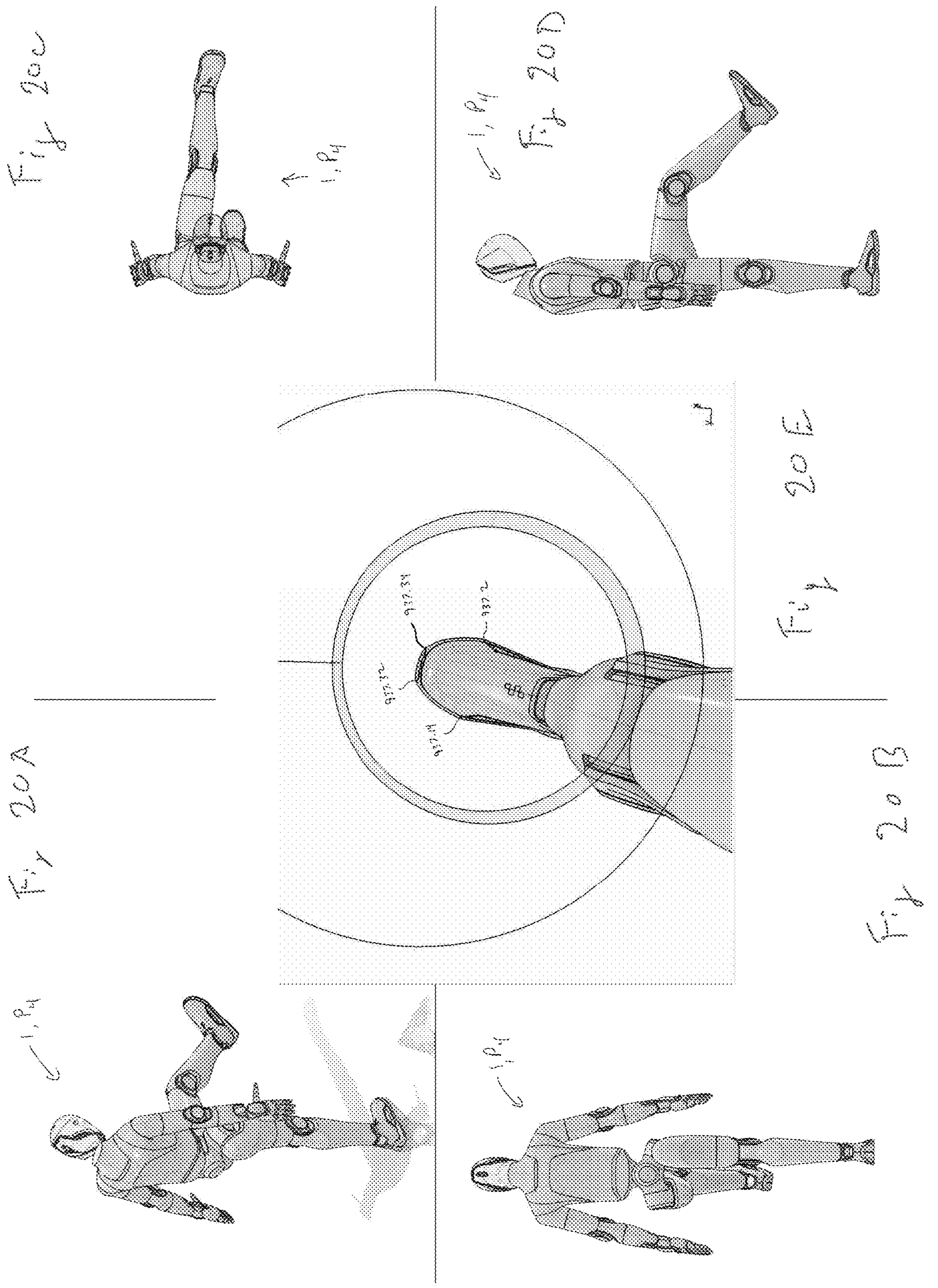
FIGS. 20A-20D are various third-person views of the humanoid robot of FIGS. 1-3B in a fourth pose, wherein the robot is viewing its foot in a fourth location.
FIG. 20E is a robot's perspective view of the foot when said humanoid robot is in the fourth pose.
Figure 19F:
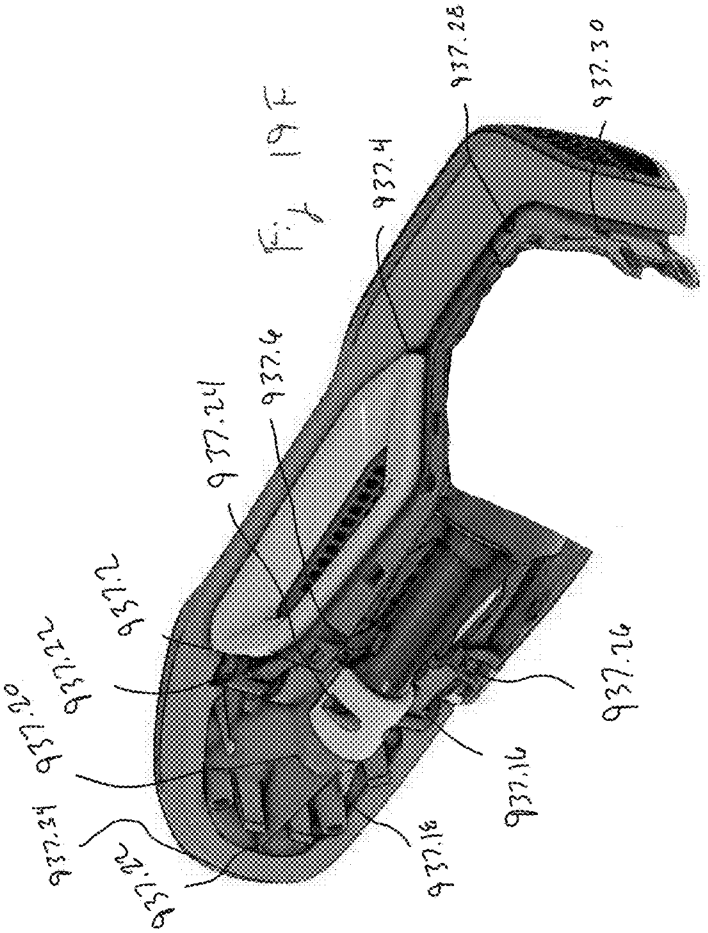
FIG. 19F is a zoomed-in view of FIG. 19E, wherein a plurality of keypoints are shown on the foot in the third location.
Figure 20F:
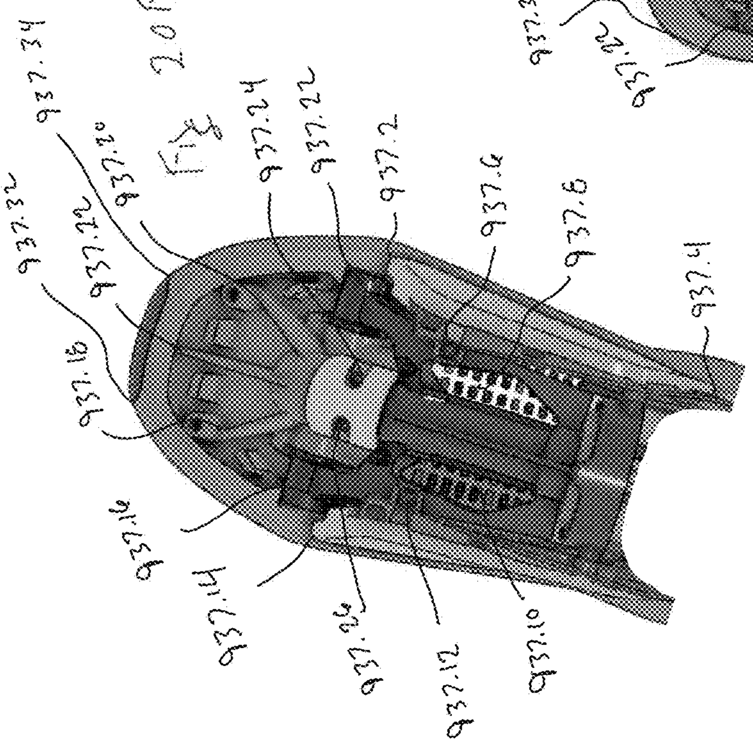
FIG. 20F is a zoomed-in view of FIG. 20E, wherein a plurality of keypoints are shown on the foot in the fourth location.

As shown in FIGS. 14-16, the robot 1 may use the deployed BSPM to calibrate the robot 1. Specifically and as shown in FIG. 14, the BSPM receives image data 3502, which can be obtained from sensors 1.2.8 (e.g., vision sensors 1.2.8.6 such as cameras 108.2.2, 108.2.4, 108.2.6, 108.2.8 installed in the head of the humanoid robot 1). The BSPM processes the image data 3502 to generate observed data 3513. Then the observed data 3513, the measured data 3512 from the robot's kinematic model, and potentially the camera parameter and sensor calibration data 3516 can be used by the BSPM to generate outputs 3520. The outputs 3520 can include: (i) the observed data-namely the observed location of a plurality of keypoints that are positioned on the end effectors and feet using the BSPM, (ii) the calculated differences between the observed data (i.e., observed-based location of the plurality of keypoints on said end effectors and/or feet) and a measured data (i.e., kinematic-based location of the plurality of keypoints on said end effectors and/or feet), and/or (iii) determining the revised biases of the kinematic model's parameters to minimize the discrepancy between observed data and the measured data.

It should be understood that in other embodiments and like the camera parameter data, the measured data 3512 may not be an input to the BSPM. Instead, the measured data 3512 is assumed by the model, as it is built into the training of the BSPM, and the robot 1 performs the same set of poses that were used during said training. This methodology simplifies the calculations and reduces the need for additional data input to obtain the revised kinematic biases. However, this simplified version adaptation to an unplanned set of poses may be limited, and the errors in the revised calibration biases may be greater. Said unplanned set of poses may be desirable to allow the robot 1 to refine its calibration for a specific task (e.g., threading a needle) that requires an extremely high degree of calibration.

Specifically, FIGS. 15-16, explain how the BSPM allows the robot 1 to perform said online self-calibration methodology 3600. In some embodiments, the operations of the method 3600 may be performed by one or more components of the computing architecture 1100 shown in FIG. 2. The method 3600 begins in block 3602, in which the robot 1 enters a startup process, for example in response to being powered on or otherwise activated. As part of this startup, the robot 1 may execute a checkout process or other process that performs self-tests and prepares the robot 1 for operation. In block 3604, as part of this startup or as a standalone maintenance routine, the robot is controlled through multiple predetermined poses. The robot 1 may be controlled, for example, by executing a script or otherwise commanding the robot 1 to move to one or more predetermined poses. In some embodiments, in block 3606, the robot 1 may generate arm or leg movements in joint space using a poser mode (which is described within U.S. provisional application 63/839,688, which is fully incorporated herein by reference). In the poser mode, the control system of the robot 1 moves the joints of the robot through one or more predetermined poses. In some embodiments, the robot 1 may cycle through a series of predetermined poses for a predetermined time or otherwise provide repeated movement of the robot 1. In an illustrative embodiment, the robot 1 moves its end effectors and its feet in regularly defined circular motions that are within the field of view of the vision sensors 1.2.8.6 of the robot 1. In other embodiments, the robot 1 may perform other movements of arms, legs, or other joints of the robot such that the predefined keypoints on the end-effectors and feet are within view of the vision sensors 1.2.8.6. These predefined poses may be the only poses, a majority, or at least a minority of the poses that are included in the training dataset. In other words, the training dataset may be trained on specific embodiment only data to ensure a high degree of accuracy and remove the requirement that the BSPM generalize to unknown keypoints, and/or robot morphologies. Nevertheless, said BSPM could be used in connection with unknown keypoints and/or robot morphologies. If so, then the training dataset may need to be expanded to ensure the model's proper generalization.

While controlling the robot 1 through the poses, the method 3600 proceeds to blocks 3608 and 3612. While the robot is moving through the predetermined poses, two parallel data acquisition processes can occur. In block 3608, the robot 1 can optionally record measurement data as measured by its internal control system while the robot 1 moves through the predetermined poses. This measurement data is obtained from sensors (e.g., joint encoders, hall effect sensors, current sensors, and/or torque sensors). Simultaneously, in block 3612, the robot's vision sensors 1.2.8.6 can also record images of the robot's own body parts, which contain specific keypoints, as they move through the predetermined poses. In some embodiments, image capture is triggered during low-motion windows inferred from IMU data, or de-blurred using inertial priors, to improve keypoint signal-to-noise for the solver. For example, image capture may be triggered when IMU-derived angular velocity and linear acceleration both fall below respective thresholds, and captured images may be deblurred using a point-spread function parameterized by IMU-measured motion during the camera's exposure time. Additionally, camera exposures can be synchronized to IMU timestamps to reduce rolling-shutter distortion.

Keypoints are visually distinguishable points or features on the robot's components, or around other joints (wrists, ankles, elbows, knees), that can be reliably detected and identified by a perception system.

Example keypoints may include the center of a screw head, a corner vertex of a rectangular cutout, the endpoint of a linear groove, or other salient geometric features. Examples of said keypoints are shown in FIGS. 17E, 17F, 18E, 18F, 19E, 19F, 20E, and 20F. As shown in these images, the external covers may be removed from the robot 1 and/or the external covers may remain on the robot 1 during the calibration procedure. Specifically, keypoints 565.2-565.26 are shown in FIGS. 17E, 17F, 18E, and 18F, while keypoints 937.2-937.30 are shown in connection with FIGS. 19E, 19F, 20E, and 20F. It should be understood that these keypoints are only examples and the system may use fewer or more keypoints. Some embodiments may use micro-scale UV/IR patterns, such as micro-printed dot grids, applied to surfaces as on-robot micro-fiducials that are detectable by the robot but unobtrusive to users, enabling background calibration without visible markers. In other embodiments, markerless body-texture cues are used, where the system learns self-appearance descriptors that persist across panel swaps or repainting to support tag-free detection of body parts.

In block 3614, the robot 1 processes the recorded image data using the BSPM. Specifically, in this block, the BSPM may calculate the 2D or 3D positions of those observed keypoints in the camera's frame of reference for each recorded image. Over the course of the predetermined movements and poses, this process can generate a substantial dataset, potentially comprising several hundred to tens of thousands of individual data points from various keypoint positions around the robot 1. This large volume of data provides a robust basis for the subsequent steps, which aim to minimize the error between the determined location of the keypoints and the kinematic-based location of the keypoints. After recording both the measured kinematic-based location of the keypoints from the robot control system and the perceived robot configuration data from the perception model, the method 3600 proceeds to block 3616.

in block 3616, the BSPM may transform or understand the transformation via its training between (i) kinematic-based locations and/or the measured robot configuration from the robot control system, and (ii) observed-locations and/or observed robot configurations from the robot's vision system. The transformation may include translating one or more components of the data to a common reference frame, wherein said common reference frame can be: (i) the kinematic coordinate frame, (ii) the sensor coordinate frame, and/or (iii) a new or different calibration coordinate frame. Said transformation may include: (i) determining kinematic-based locations of the identified keypoints from the measurement data, and (ii) transforming the kinematic-based locations into the same coordinate frame as the observed-locations of the identified keypoints from the robot sensor coordinate frame. In other embodiments, said transformation may include: (i) determining observed joint pose (e.g., position and/or orientation) data from the observed-locations of the identified keypoints, and (ii) transforming the observed joint pose data into the same coordinate frame as the kinematic joint pose from the kinematic coordinate frame. In even further embodiments, both the keypoints and the joint poses may be calculated and compared in a single calibration coordinate frame.

Figure 21:
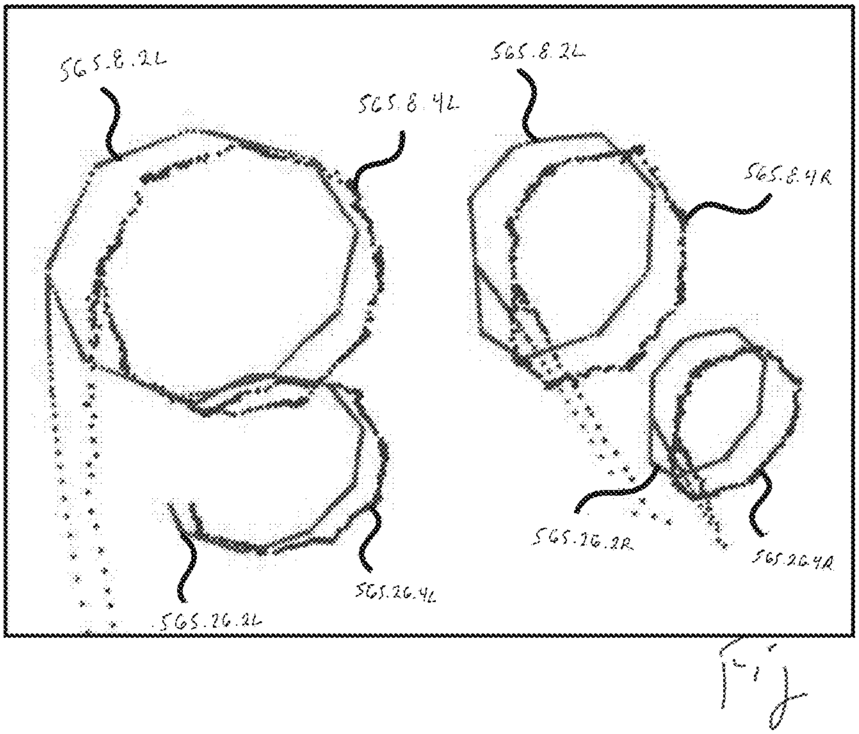
FIG. 21 graphically illustrates, during the online self-calibration process of FIGS. 15-16, a discrepancy between calculated movement of two keypoints for the left end effector and two keypoints for the right end effector, and the detected movement of the same keypoints.

FIG. 21 is a graphical illustration of the movement during the manipulation of the arm and end-effectors based upon the above described pre-planned routine, showing: (i) observed-based locations for a first left end-effector keypoint 565.8.2L (red), (ii) kinematic-based locations for a first left end-effector keypoint 565.8.4L (blue), (iii) observed-based locations for a second left end-effector keypoint 565.26.2L (red), (iv) kinematic-based locations for a second left end-effector keypoint 565.26.4L (blue), (v) observed-based locations for a first right end-effector keypoint 565.8.2R (red), (vi) kinematic-based locations for a first right end-effector keypoint 565.8.4R (blue), (vii) observed-based locations for a second right end-effector keypoint 565.26.2R (red), and (viii) kinematic-based locations for a second right end-effector keypoint 565.26.4R (blue). The offset between the kinematic-based locations and the observed-based locations indicates misalignment between these values and thus misalignment of the joints.

Finally, the BSPM in block 3618, can determine the revised kinematic biasing values based upon: (i) observed-based locations of the identified keypoints, (ii) the kinematic-based locations of the identified keypoints and the observed-based locations of the identified keypoints, and/or (iii) the kinematic-based joint poses and the observed-based joint poses. If the robot 1 is not in maintenance mode, then the identified revised kinematic biasing values will be automatically used in place of the current or original kinematic biasing values. It should be understood that the above calibration procedure may occur at any interval (e.g., any value between every 1 hour and once in the lifetime of the robot 1) that is found to be useful.

However, if the robot 1 is in maintenance mode, then the revised kinematic biasing values can be compared to the pre-programmed kinematic biasing values to determine if the error between the biasing values exceeds one or more predetermined thresholds or otherwise indicates miscalibration. For example, the predetermined threshold may be set to a certain percentage (e.g., 5% or 10%), or a certain number (e.g., 1 degree, 2 degrees, 5 degrees, or a different angle value), for any number of combinations of the joint biases. If the robot 1 is not miscalibrated because the comparison between the biasing values is below the predetermined threshold, as determined in block 3624, then the method 3600 branches to block 3636, and the robot is considered ready to operate. Upon completion, the robot 1 may continue with normal operation, for example by completing the startup process or otherwise proceeding with operation.

Referring again to block 3624, if the robot determines that it is miscalibrated (i.e., error is greater than a predetermined threshold), the method 3600 advances to block 3626, in which the robot optionally indicates miscalibration. The robot 1 may, for example, log the miscalibration or indicate the miscalibration to an operator, or otherwise indicate that a miscalibration was detected. In block 3628, the robot may optionally prompt a user to decide whether to override the existing calibration values with the newly computed optimal offsets. In block 3630, the robot determines whether the user has authorized the override. If not, the method 3600 branches to block 3638, and the robot does not operate. In this case, the miscalibration is indicated, and the robot may fail its checkout procedure, request maintenance, or otherwise indicate that it is not calibrated for operation.

If the user optionally indicates in block 3630 that the calibration values should be overridden, the method 3600 advances to block 3632. In block 3632, the robot 1 may adjust the kinematic biasing values with the revised biasing values that were previously determined by the BSPM. After adjusting kinematic biasing values, the method 3600 advances to the block 3636, where the robot 1 is considered ready to operate and may continue with its startup procedure or procced to normal operation.

Figure 22:
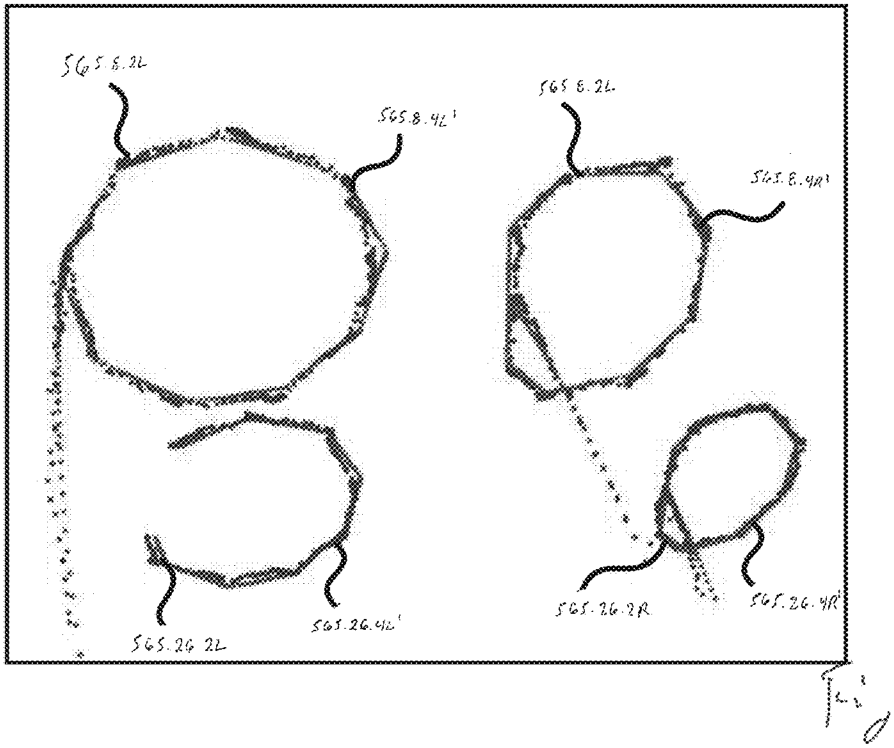
FIG. 22 graphically illustrates that the online self-calibration process of FIGS. 15-16 causes the calculated movement of keypoints to substantially match the detected movement of keypoints post-calibration.

FIG. 22 is a graphical illustration of the movement during the manipulation of the arm and end-effectors based upon the above described pre-planned routine after calibration, showing: (i) observed-based locations for a first left end-effector keypoint 565.8.2L (red), (ii) revised kinematic-based locations for a first left end-effector keypoint 565.8.4L' (blue), (iii) observed-based locations for a second left end-effector keypoint 565.26.2L (red), (iv) revised kinematic-based locations for a second left end-effector keypoint 565.26.4L' (blue), (v) observed-based locations for a first right end-effector keypoint 565.8.2R (red), (vi) revised kinematic-based locations for a first right end-effector keypoint 565.8.4R' (blue), (vii) observed-based locations for a second right end-effector keypoint 565.26.2R (red), and (viii) revised kinematic-based locations for a second right end-effector keypoint 565.26.4R' (blue). The revised kinematic-based locations substantially mirror the observed-based locations, and therefore, the robot is calibrated correctly. This mirror contrasts with the misaligned results shown in FIG. 21.

It should be understood that the properly calibrated robot 1 may not be calibrated according to an absolute truth. Instead, the calibration procedure focuses on calibrating the robot based on its sensors. This is sufficient because the robot 1 primarily utilizes its sensors to interact with the world, and further calibration to absolute truth has proven not to be a prerequisite for many tasks. However, it should be understood that if absolute calibration is determined to be beneficial, then the above described procedure may be used as a component of said absolute calibration.

f. Alternative Embodiments

A number of alternative embodiments are discussed below, wherein each alternative embodiment may supplement, replace a component of, and/or entirely replace the above described procedure. It should also be understood that the alternative embodiments may be used in combination with one another.

i. Online Self-Calibration During Operation

In another embodiment, the robot 1 may continuously perform the above described calibration procedure in the background while the robot 1 is performing tasks. In this embodiment, the robot 1 does not perform a pre-programmed routine, but instead just compares the movement of its components while it is working against the observed location of its components. This online self-calibration may allow the robot 1 to omit sensors (e.g., torque sensors) contained within the robot 1. This is beneficial because it reduces the costs of the robot and reduces failure points of said robot 1. A hybrid batch-then-online smoothing approach may combine accuracy with low-latency updates, where a short sliding window is solved via bundle adjustment, and the resulting state is propagated by a Kalman-type filter.

ii. Additional Calibration Validation

In some embodiments, further validation of the calibration of said robot 1 may be desirable. Examples of these additional validation steps are discussed below. In one example, a visual validation may involve commanding the robot to move its end-effector to a target pose and comparing its final position, as calculated by the kinematic model, with its position as measured by the camera system. Furthermore, the validation process may involve physical interaction tasks to provide a ground truth confirmation that is independent of the vision system. For instance, the robot may be commanded to perform a delicate self-contact task, such as bringing its hands together to touch fingertips using scripted self-contact "touch-to-verify" macros that create ground-truth constraints. A successful touch, confirmed by triggering force sensors integrated into the fingertips or by detecting a specific signature in the joint torque sensor data where force/torque profiles gate acceptance, would provide strong evidence of an accurate calibration. If this validation fails to meet predetermined accuracy criteria, the process can include rolling back the updated joint angle biases to a previously known good state. Similarly, the robot can be instructed to touch a known external point, such as a designated fiducial marker on a wall. The confirmation of contact via force or torque feedback at the precisely expected location validates the transformation. A combination of these methods may also be employed, where the system visually guides an end-effector to a target and then uses physical sensor data to verify the final contact.

iii. Algorithm-Based Calibration

Instead of using the BSPM to output the revised kinematic biasing values, the BSPM or another keypoint detection model (e.g., any model described herein or described in a paper incorporated hereby by reference) may be used to obtain the location of the observed keypoints. Once the locations of these observed keypoints are obtained, a translation algorithm can be used to translate the observed keypoint locations into the same coordinate frame as the kinematic-based locations (as discussed above). After the locations are translated into a single coordinate frame, they can be compared using an optimization algorithm to one another to minimize the error between the observed and kinematic locations. The optimization problem may be formulated as a cost function that represents the calibration error for a given movement over time. For example, the optimization algorithm may incorporate the observed keypoint locations, kinematic-based keypoint locations, and/or camera properties of the humanoid robot 1 over the period of time.

Specifically, given an observed keypoint ii, assume $q_i$ expresses a kinematic-based keypoint, $\theta_i$ expresses a bias as an offset between the observed reading and a kinematic measurement, and $\hat{q}_i = q_i - \theta_i$ expresses the offset-correction. Further assume that $\hat{q}_t = [\hat{q}_1, \ldots, \hat{q}_n]$ represents a multi-dimensional vector of offset-corrections for all joints for the given period of time t. In addition, $f(\hat{q}_t)$ represents a forward kinematics function for retrieving pose $(\hat{q}_t) = [p(\hat{q}_t), Q(\hat{q}_t)]$ (in which $p(\hat{q}_t)$ corresponds to position and $Q(\hat{q}_t)$ corresponds to orientation for some end-effector of the humanoid robot 1 expressed relative to the torso frame of the robot 1). Further in this example, $\bar{f}_t = [\bar{p}_t, \bar{Q}_t]$ represents a pose of the given end effector at time t. In some embodiments, the camera properties may be included with the biases (for example as an offset $\theta_i$ representing the alignment of the camera to the robot). Additionally or alternatively, in some embodiments, solving for camera properties may be iterated with solving for the joint biases. Calibration error for a given movement over time t may be represented as a cost function J(θ):

$$J(\theta) = \sum_{t=0}^{T-1} \omega_p^T |p(\hat{q}_t) - \bar{p}_t| + \omega_Q^T Q^{-1}(\hat{q}_t) Q_t \quad (1)$$

The optimization algorithm may be solved by obtaining optimal offsets θ* (i.e., optimized biases) shown in the Equation (2) by minimizing the cost function J(θ) in Equation (1):

$$\theta^* = \text{argmin}_{\theta \in \Theta} J(\theta) \quad (2)$$

To do so, the robot 1 may use a variety of solver techniques. For example, the robot 1 may perform a deterministic gradient-descent local optimization solver algorithm (e.g., L-BFGS (Limited-memory Broyden-Fletcher-Goldfarb-Shanno) algorithm), which admits a user-supplied gradient function and bounds in a search space of potential solutions. Advantageously, L-BFGS consumes a relatively limited amount of memory, which preserves resources in solving multiple optimization instances. Of course, other local optimization solvers, including conjugate gradient algorithms and Newton's method algorithms, can also effectively identify such offsets while consuming limited resources.

To determine the optimal offsets and/or alterations, the robot 1 may solve for the optimization problem multiple times. In such cases, the robot 1 may use different initial input values uniformly sampled across the search space. Doing so addresses potential issues in non-convexity and noise in the cost function J(θ). In practice, executing the optimization instances (i.e., solving for the optimization problem) between 1 and 30 times, preferably less than 10 times, has shown to be effective. Further still, the robot 1 may assign each optimization instance to a different processor or a different core of a processor to enable parallel execution of the instances. Doing so significantly increases performance speed in identifying the optimal offsets. In an embodiment, the robot 1 may also enlarge the search space by a specified multiplication factor to address potential issues of the optimization terminating early due to reaching tolerances established as stopping conditions. Enlarging the search space can mitigate such issues by downscaling offset results to desired corresponding ranges. For example, in some embodiments, the optimization may result in relatively small numbers, on the order of $10^{-1}$ or $10^{-2}$, and the search space is quite small. This causes gradients to be almost flat and also results in quickly reaching machine precision. In those embodiments, the optimization space may be enlarged by a multiplication factor, which cases the aforementioned issues, and optimization results may be downscaled back to their corresponding ranges.

iv. Calibration of Specific Joint(s)

A more targeted calibration approach may be employed for circumstances that do not require a full kinematic chain recalibration, such as during routine maintenance or following the repair or replacement of one or more specific joints. This approach is detailed in the flowchart of FIG. 23. Similar to the whole body calibration process shown in FIGS. 15-16, this keypoint-based self-calibration process reframes the robot itself as the calibration target, effectively making it a dynamic, articulated fiducial marker. The process leverages the synergy between the robot's proprioceptive sensors, such as joint encoders, and an exteroceptive vision sensor, such as its own head-mounted cameras. To enable this, a set of salient and consistently visible points, or keypoints, are defined on the robot's kinematic chain. These keypoints, which typically correspond to the centers of joint axes or other structurally significant and visually distinct locations, allow the robot's perception system to accurately track the motion of its limbs. For instance, suitable keypoints on a hand, foot, or near a joint like a wrist or elbow may include the geometric center of a screw head, a sharp corner vertex of a machined cutout, or the well-defined endpoint of a groove or seam.

Figure 23:
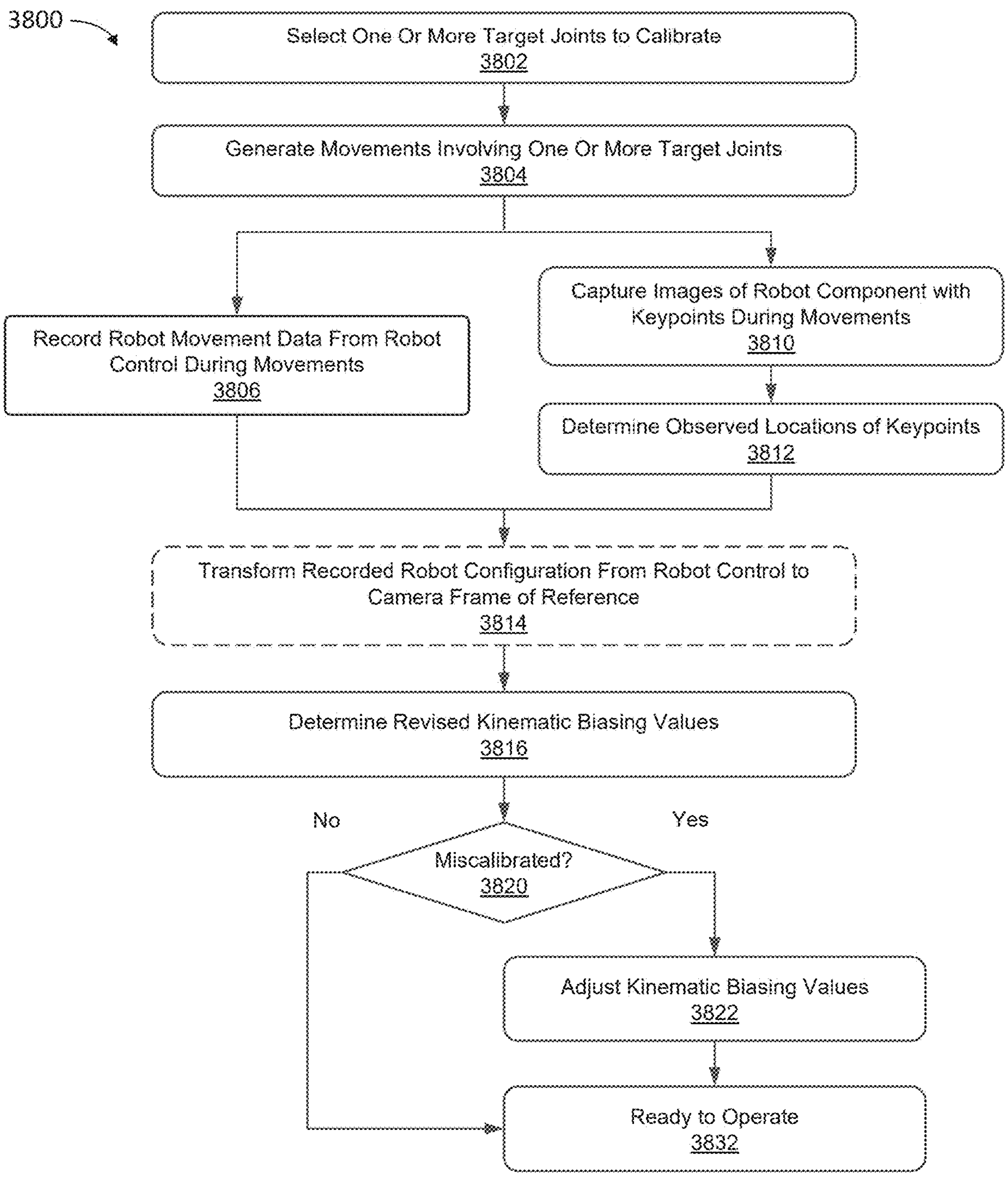
FIG. 23 is a flowchart showing an online self-calibration process for the humanoid robot shown in FIGS. 1-3B, wherein said process is utilized for a select number of specific components or joints.

Referring to FIG. 23, a method 3800 for calibrating specific joints may be initiated when circumstances do not require a full system calibration. In block 3802, one or more target joints are selected for calibration. This selection can be made manually by a technician performing maintenance or automatically by the robot's internal diagnostic systems in response to detecting anomalous behavior. In block 3804, the robot is controlled to generate movements that specifically exercise the selected target joints. These movements are designed to ensure that the keypoints on the robot parts associated with those joints are clearly and consistently visible to the robot's head-mounted cameras throughout the motion. For example, if a wrist joint is being calibrated, the robot would perform movements that articulate the wrist while an end-effector, such as the hand, remains in the camera's field of view.

While the robot executes these targeted movements, two parallel data acquisition streams are initiated. In block 3806, the robot's internal control system records its configuration data throughout the motion. This process, as detailed in block 3808, may specifically involve recording the time series of joint encoder data from all the joints involved in the movement, providing a precise, internally-sensed account of the kinematic chain's configuration. Concurrently, in block 3810, the robot's cameras capture a sequence of images of the moving robot parts that contain the predefined keypoints. In block 3812, this recorded image data is processed by a perception model, such as the BSPM, to generate a perceived robot configuration. This is accomplished by detecting the keypoints in each image and calculating their 2D or 3D positions, thereby creating a visually-derived account of the limb's movement.

Once both the internally-sensed and visually-perceived datasets have been collected, the recorded robot configuration data from the control system may be transformed into a common frame of reference with the visual data, such as the camera's coordinate frame, in block 3814. In block 3816, the system proceeds to determine the misalignment between the perceived robot configuration from the vision system and the recorded robot configuration from the internal sensors. This is achieved by solving a constrained optimization problem in block 3818 to determine the error between the perceived and recorded states. A distinction in this targeted process is that the optimization algorithm is formulated to solve only for the joint bias offsets of the selected target joints. The joint bias parameters and other kinematic parameters for all other joints in the kinematic chain are treated as fixed and known values during the optimization. This constraint isolates the calibration to only the components that require adjustment. The optimization solver then finds the specific bias values for the target joints that best align the two datasets.

Following the optimization, in block 3820, the system determines if the one or more target joints are miscalibrated by comparing the magnitude of the calculated optimal joint bias offsets against a predetermined threshold. If the calculated error is within an acceptable range, indicating no significant miscalibration, the process concludes, and the robot is considered ready to operate in block 3832. If a miscalibration is detected because the calculated biases exceed the threshold, the process proceeds to block 3822, where the system adjusts the joint biases for the target joints. Specifically, in block 3824, the optimal offsets found by the solver are applied to update the calibration parameters of only the one or more target joints. After this selective adjustment, the robot is deemed ready to operate in block 3832, having corrected the specific joint without altering the rest of the system's calibration.

This targeted approach to calibration offers significant benefits in terms of efficiency. By focusing the procedure only on the joints that have been repaired, replaced, or are due for maintenance, the complexity of the task is greatly reduced compared to a full kinematic chain calibration. The movements can be simpler and shorter in duration, as they only need to sufficiently exercise the target joints. Consequently, the amount of data that needs to be collected and processed—both from joint encoders and the vision system—may be substantially smaller. This reduction in data and complexity allows the more constrained optimization problem to be solved more quickly. As a result, this process provides a rapid and efficient method for verifying and correcting the calibration of specific joints, making it an ideal tool for routine maintenance schedules and for ensuring accuracy after any hardware modifications.

v. Alternative Keypoint Locations

In an alternative embodiment, the flexibility of the keypoint-based self-calibration method may be extended by varying the location of the keypoints on the robot's body. While the previously described methods focused on placing keypoints on the end-effectors, such as the hands and feet, this is not a strict requirement. This approach offers advantages in that the keypoints are easy to define on complex geometries and the end-effectors can be programmed to move through a nearly infinite range of poses, making it convenient to capture a rich dataset. However, keypoints, including applied micro-scale fiducial patterns, may be located anywhere along the robot's kinematic chain for the purpose of self-calibration. For example, keypoints may be defined on the wrist, forearm, elbow, or upper arm for the manipulation subsystem, or on the pelvis, thigh, calf, or ankle for the locomotion subsystem. The only requirements for these keypoints are that they correspond to visually distinct, static locations on their respective robot links and that they allow the robot's perception system and cameras to accurately and consistently track the motion of the parts upon which they are located.

The placement of keypoints on links other than the end-effectors allows for a more versatile calibration strategy. When images of these intermediate keypoints are captured during a calibration movement, any joint on the kinematic chain from the camera frame down to the link containing the keypoint may be calibrated. This allows for either a holistic or a targeted calibration of that specific chain. For example, if keypoints are defined on the robot's forearm, the system may perform a calibration of the entire arm chain by solving an optimization problem for the joint bias offsets of both the shoulder and elbow joints simultaneously. As another example, if keypoints are defined around the knee joint on both the thigh and calf, the robot can perform leg movements and the perception system can track these keypoints to calibrate the entire chain between the camera frame and the knee, including the torso, hip, and knee joints. Alternatively, if a maintenance procedure indicates that only a specific joint requires recalibration, the same keypoints can be used in a constrained optimization. In this case, if the knee joint was replaced, the joint biases for the torso and hip may be set as fixed and known parameters, and the optimization solver would only determine the bias for the target knee joint, making the process more efficient.

This flexibility enables a special use case for the calibration of a single target joint, which may be run in the background periodically or initiated on-demand to fine-tune a joint's accuracy and precision. Such a process is valuable for applications that demand sustained high-precision positioning. For example, in a task where a robot arm must track a seam for welding or dispensing a precise bead of sealant, the calibration of the wrist joints may drift over time due to thermal expansion from the process or mechanical wear. An on-demand, single-joint calibration routine can be triggered, wherein the robot performs a small, predefined wrist movement, observes a keypoint on its end-effector, and executes a quick, online optimization to calculate and apply a real-time correction to the wrist joint biases. A similar background process may be used for maintaining locomotion stability, where the robot, while walking around a house doing chores, periodically glances down at its legs to observe keypoints on its thigh. By continuously comparing the visually perceived motion of the thigh with its own internal encoder data, the robot can perform an online, real-time calibration of its hip and knee joints, correcting for any drift and ensuring a stable, efficient gait.

vi. Self-Calibration of Camera

In another alternative embodiment, the keypoint-based self-calibration framework may be adapted to specifically calibrate the cameras themselves. In this procedure, the roles of movement and observation are inverted. The robot's body is held in a static pose, with all of its limb and torso joints fixed or mechanically locked, so that keypoints on the end-effectors or any other location on the robot become a stationary, three-dimensional constellation of reference points whose positions are known from the robot's forward kinematics. The robot then moves its head, articulating the neck joints, to capture a series of images of these static keypoints from various angles and viewpoints. For example, the neck may be actuated through yaw, pitch, and roll sequences that provide at least three non-coplanar viewpoints of the keypoints. If the head contains multiple cameras, such as a stereo pair, this single set of head movements allows both cameras to simultaneously capture images of the same static keypoints. The perception system can then process the image data from each camera to generate separate datasets of perceived keypoint locations. Because the positions of the keypoints are known and fixed relative to the robot's base frame, and the biases of all body joints are considered fixed, the optimization algorithm can be constrained to solve only for the parameters of the head's kinematic chain. This process effectively calibrates the camera properties, defining the precise rigid transformation between each camera's optical frame and the head's kinematic frame.

The optimization's convergence can be accepted when the reprojection error falls below a predetermined threshold or a maximum iteration count is reached. After determining the rigid transform, a further refinement step can be performed to update each camera's intrinsic parameters. This self-calibration method stands in contrast to the camera calibration techniques that are discussed above. The self-calibration of cameras offers numerous benefits over conventional methods, especially for humanoid robots that may have complex camera setups, such as stereo camera pairs mounted inside the head. In some designs, these cameras may be in a vertical arrangement or mounted on separate structural components rather than a single rigid frame, making them prone to physical misalignment from operational stresses like vibrations during walking, thermal expansion from onboard electronics, or mechanical shock from unexpected contact. This potential for their relative poses to drift apart necessitates frequent recalibration to maintain accurate depth perception and visual-inertial odometry. The self-calibration process provides an autonomous solution that eliminates the need for external equipment and manual intervention. The robot can initiate this procedure on-demand or as part of a routine schedule, ensuring its visual system remains consistently accurate. This autonomy makes the robot more robust and adaptable, as it can recalibrate itself in any environment without specialized rigs. Furthermore, because the self-calibration process uses the robot's own body as the reference, it is less susceptible to the lighting and occlusion issues. This process also allows for each camera in a multi-camera system to be calibrated separately and independently, which is a significant advantage. If one camera's alignment drifts, it can be corrected without affecting the calibration of the other, ensuring the integrity and continued high performance of the overall stereo vision system.

vii. Calibration Other Than Joint Angles

In a further alternative embodiment, the self-calibration framework may be generalized to calibrate robot configuration parameters other than the joint angle biases. While the preceding examples have focused on correcting the joint angle (θ), which is one of the four parameters in the widely used Denavit-Hartenberg (D-H) convention, the underlying optimization method is not so limited. The D-H model defines the geometry of a robotic manipulator using a set of four parameters for each link: the link length (a), the link twist (α), the link offset (d), and the joint angle (θ). The self-calibration processes described herein may be adapted to solve for errors in any or all of these four parameters. The optimization problem would be reformulated to include these additional geometric parameters as variables, allowing the solver to find the set of corrections that minimizes the discrepancy between the visually perceived keypoint data and the configuration predicted by the kinematic model.

For example, the link length (a) of one or more links may be calibrated. The baseline values for these lengths are typically derived from the robot's computer-aided design (CAD) models, but these nominal values can differ from the true physical dimensions due to manufacturing tolerances, minute structural deformations under load, or thermal expansion and contraction during operation. To calibrate the link lengths, the robot may be commanded to move through a series of poses that cause large translational movements of its keypoints. The system would collect the perceived keypoint positions from the cameras and compare them to the positions predicted by the kinematic model. The optimization algorithm would then solve for a set of link length correction factors for the entire kinematic chain, or a subset thereof, that minimizes the aggregate positional error. This ensures that the robot's internal model of its own reach and geometry accurately reflects its physical form.

As another example, the self-calibration process may be used to identify and correct for errors in link twist (α). The link twist defines the angle between the axes of two consecutive joints, and like link length, it may deviate from its nominal design value due to small but significant assembly errors in the joint mechanisms. Such an error can cause unexpected and complex deviations in the end-effector's orientation. To calibrate for link twist, the robot may be commanded to execute motions that involve significant rotation around the relevant joint axes, as these movements will make any twist-related errors more apparent in the trajectory of the observed keypoints. By collecting the perceived and predicted keypoint data during these motions, the optimization solver can be configured to specifically adjust the link twist parameters. The algorithm would find the twist angles that cause the kinematic model to most accurately replicate the observed 3D motion of the keypoints. Correcting for link twist is particularly beneficial for improving accuracy in tasks that depend on precise control of the end-effector's orientation, such as tool manipulation or grasping objects at specific angles.

viii. Online Calibration Using Pose Estimation

Figure 24:
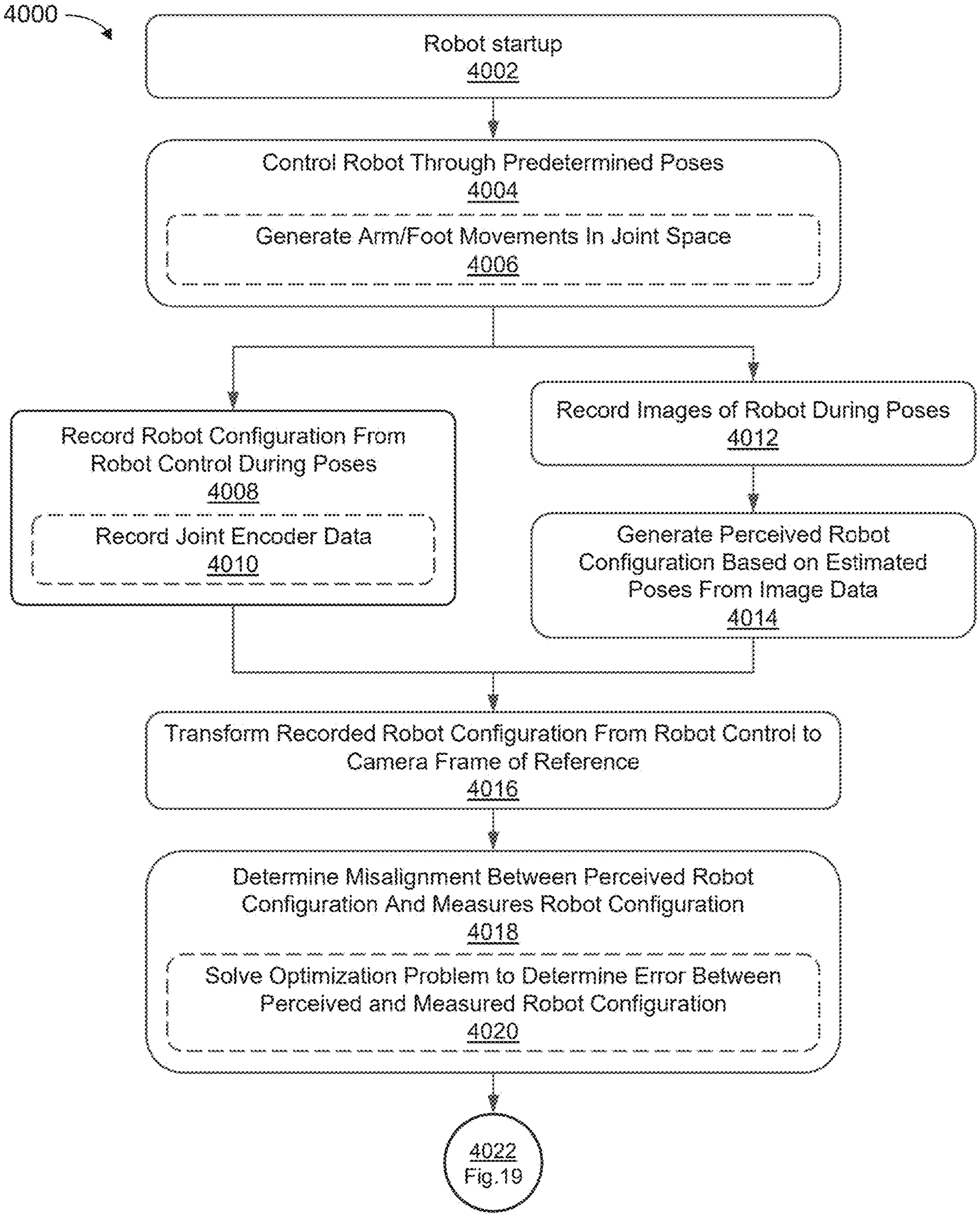
FIGS. 24-25 are flowcharts showing an online self-calibration process for the humanoid robot shown in FIGS. 1-3B, wherein said process uses a second embodiment of a BSPM that is configured to estimate the pose of one or more robot components.
Figure 25:
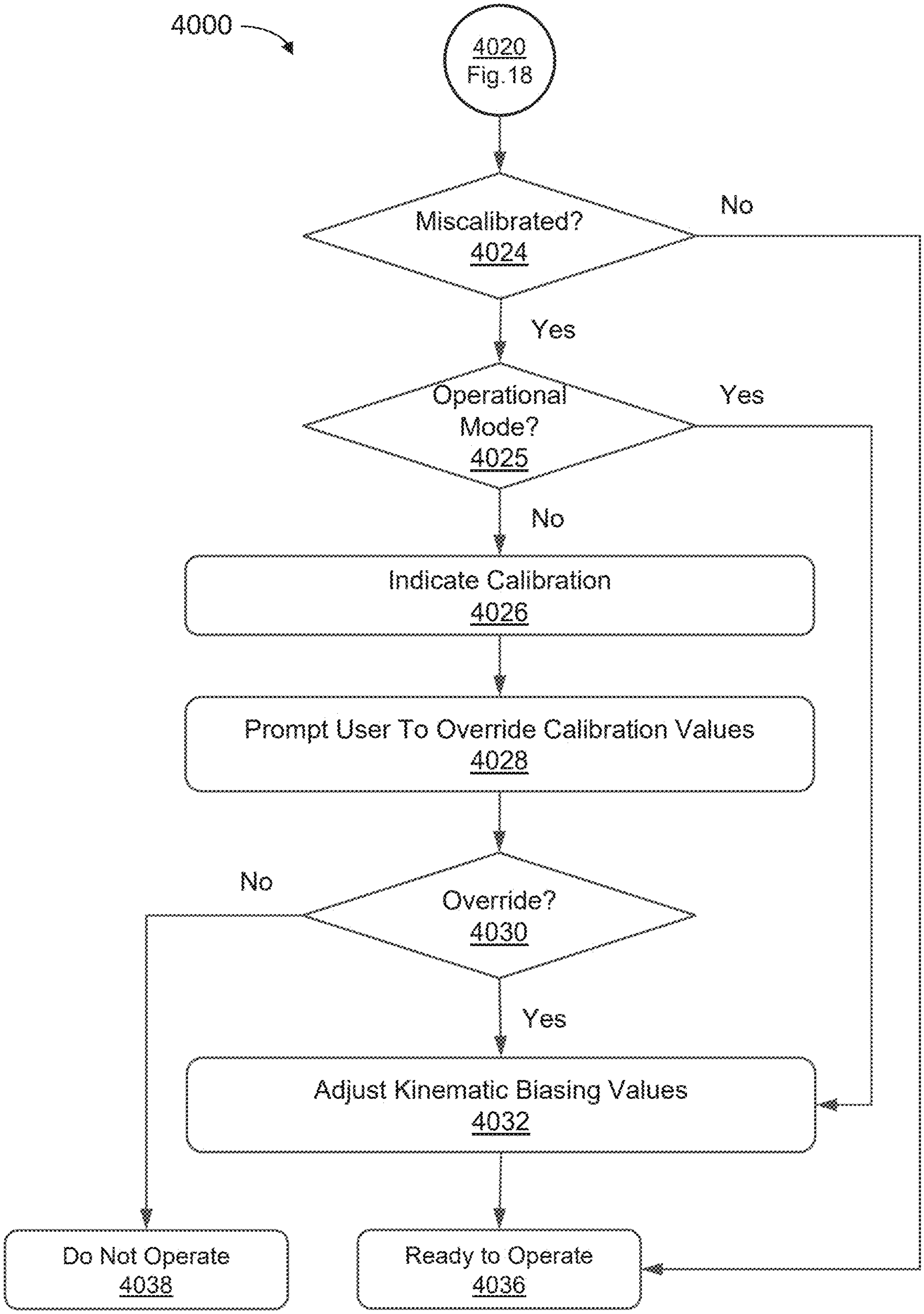

In yet another alternative embodiment, the self-calibration of the robot may be performed using holistic pose estimation rather than the detection of discrete keypoints. Referring now to FIGS. 24-25, a humanoid robot may execute a method 4000 for camera-based self-calibration that is analogous to the keypoint-based method 3600. The method 4000 may begin in block 4002, during a robot startup or maintenance procedure. In block 4004, the robot is controlled through a series of predetermined poses, which may involve, as in block 4006, generating arm and foot movements in joint space to create a varied dataset of limb configurations. As these movements are performed, two parallel data acquisition processes occur. In block 4008, the robot records its internal configuration data, which may specifically involve recording joint encoder data in block 4010.

Figure 26:
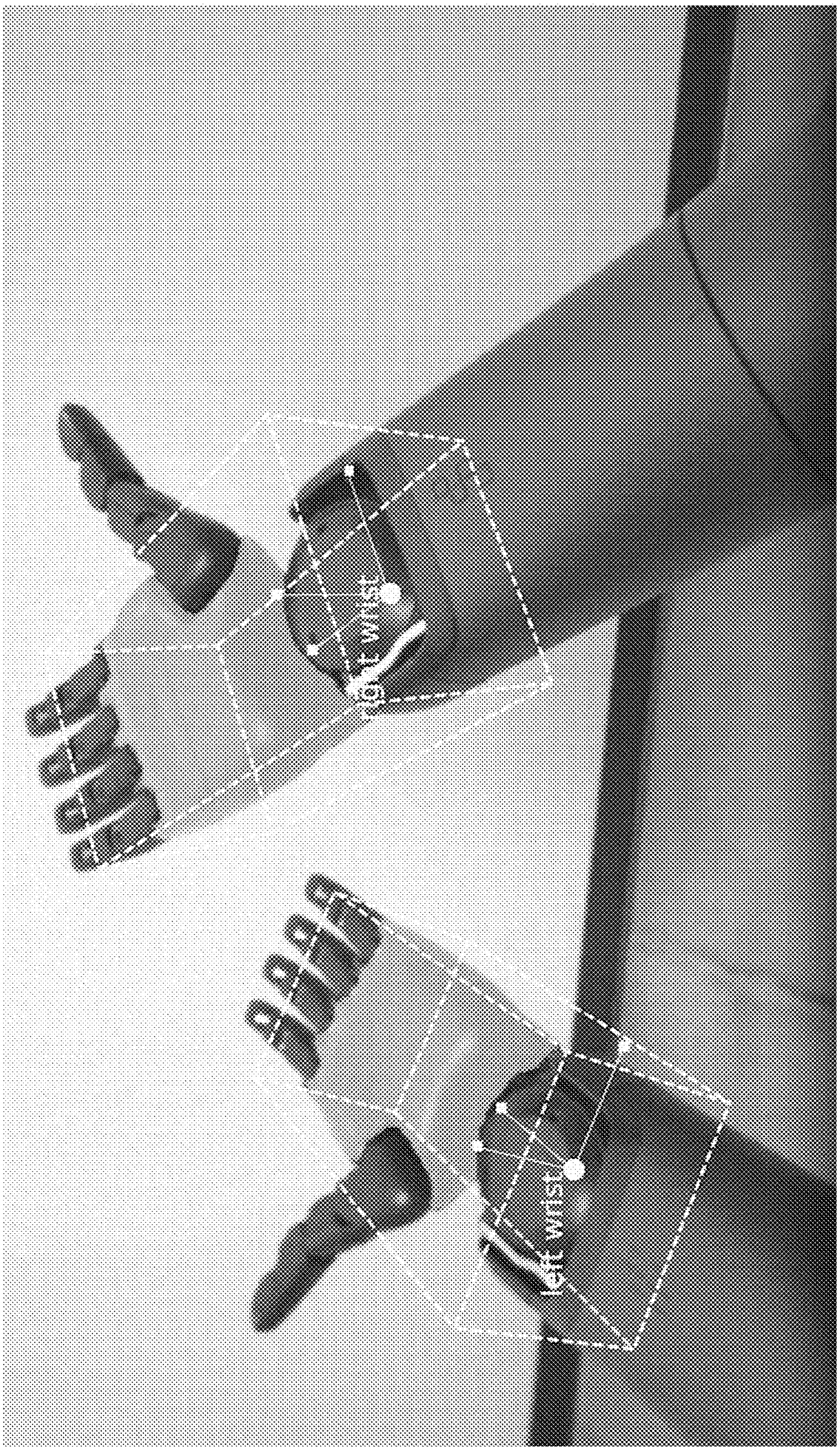
FIG. 26 is a first-person view of an end effector, wherein an estimated pose of the robot component, as determined by the second embodiment of the BSPM, is overlaid thereon.

Simultaneously, in block 4012, the robot records images of its own body parts as they move through the poses. The primary difference from the keypoint-based method lies in how this visual data is processed. Instead of detecting a sparse set of predefined keypoints, in block 4014, the robot's perception system generates a perceived robot configuration based on estimated poses of the entire end-effector or limb. An example of this is shown in FIG. 26, which depicts an image of a robot's end effector. Overlaid on the end effector is a 3D bounding box and a representation of the wrist's coordinate frame, which corresponds to the estimated six-degree-of-freedom pose (position and orientation) of the hand. A perception model, such as the BSPM, may be trained to recognize the overall shape and appearance of the robot's limbs and directly regress their full 3D pose from a single image.

After collecting both the internally measured configuration from joint encoders and the visually perceived configuration from the pose estimation model, the method 4000 proceeds. In block 4016, the system may transform the recorded data to a common camera frame of reference. In block 4018, the system determines the misalignment between the perceived and measured robot configurations, and in block 4020, it solves an optimization problem to find the joint biases that minimize this error. Based on this analysis, the robot determines if it is miscalibrated in block 4024. If it is, it indicates the miscalibration in block 4026 and may prompt a user for an override in block 4028. If the override is approved in block 4030, the system adjusts the joint biases in block 4032, which may involve calibrating the entire kinematic chain from the camera to the end-effector as in block 4034. The robot is then considered ready to operate in block 4036. If no miscalibration is found, or if an override is not approved, the process concludes at block 4038. This pose-based method can be applied to joints other than the end-effectors, and it can be used to optimize for kinematic parameters other than joint angle biases, such as link lengths, in a manner analogous to the keypoint-based approach.

ix. Two-Stage Self-Calibration

Figure 13:
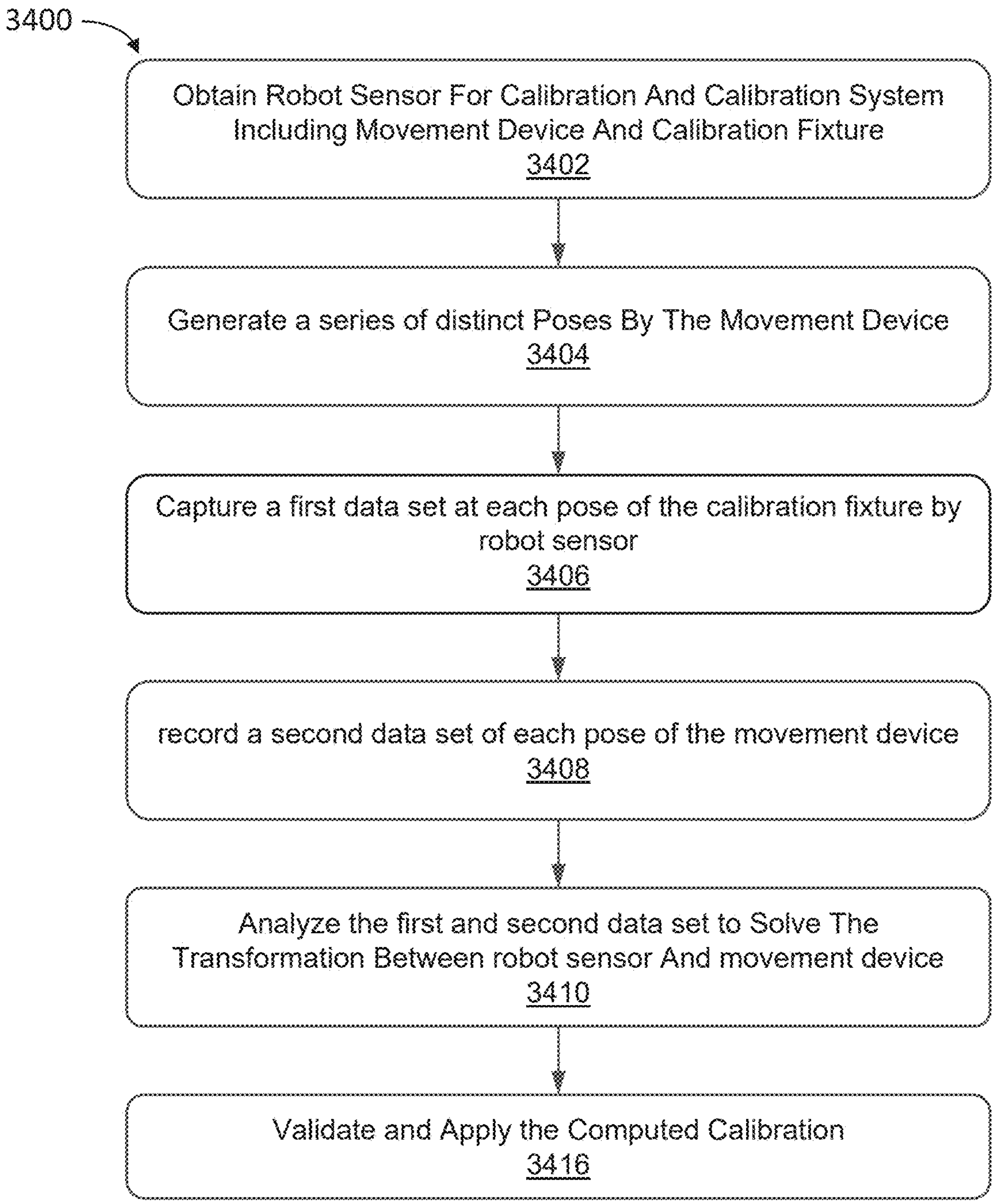
FIG. 13 is a flowchart showing a camera calibration process for calibrating cameras contained in the head of the humanoid robot, wherein said process may utilize the calibration system shown in FIGS. 12A-12C.
Figure 27:
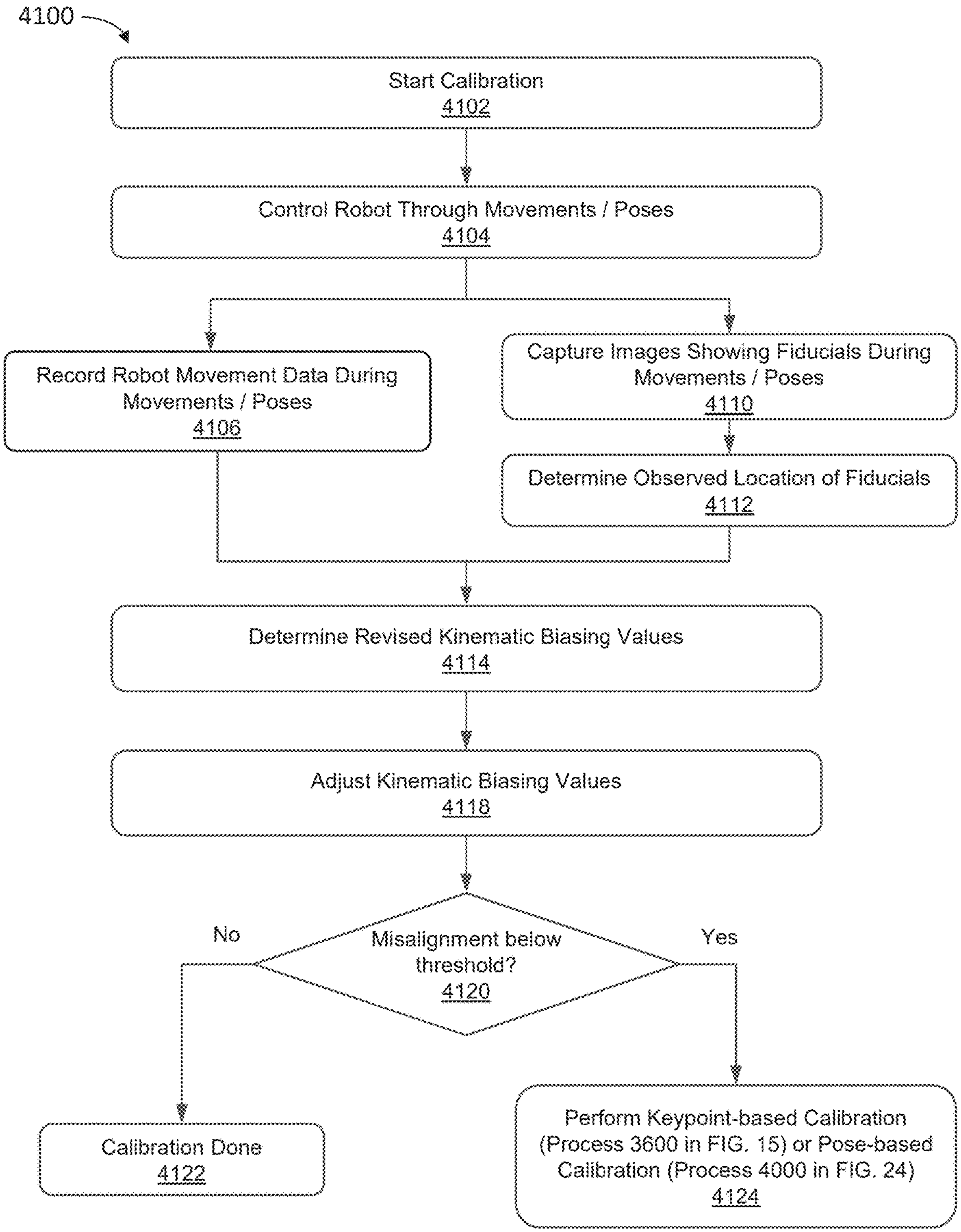
FIG. 27 is a flowchart showing a two-stage self-calibration process for the humanoid robot of FIGS. 1-3B.

In a further alternative embodiment, a multi-stage calibration process may be implemented to achieve a balance of efficiency and high precision. Referring to FIG. 27, a two-stage calibration method 4100 may be initiated as part of a startup procedure, a scheduled maintenance routine, or on-demand by an operator. The process starts in block 4102 and proceeds to block 4104, where the robot is controlled through a series of movements and poses. During these movements, a first-stage calibration is performed, which may be a fiducial marker-based method similar to the process 3400 (as shown in connection with FIG. 13, often executed during continuous robot motion. As the robot moves, it records its internal robot configuration in block 4106, which may include recording joint encoder data in block 4108. Concurrently, in block 4110, the robot's cameras capture images of a fiducial marker mounted on an end-effector. In block 4112, this image data is used to generate a perceived robot configuration.

Following this parallel data acquisition, the system, in block 4114, determines the misalignment between the perceived robot configuration from the fiducial marker and the recorded robot configuration from its internal sensors. This may involve, in block 4116, solving an optimization problem to determine the error between the perceived and recorded states. Based on this error, the system calibrates the robot's joints by adjusting the joint biases in block 4118 and evaluates the result. In decision block 4120, the system checks if the remaining misalignment is below a predefined threshold. The threshold may be adaptively set based on observed noise levels and keypoint confidence scores. If the misalignment is acceptably low, the calibration is considered complete in block 4122, as the fiducial-based method has provided sufficient accuracy for the robot's current needs.

If, however, the misalignment is not below the threshold, the system proceeds to a second stage of calibration in block 4124. This second stage is designed to further refine the initial calibration and achieve a higher level of precision. The robot may perform a more detailed and accurate calibration routine, which may be either the keypoint-based calibration described in process 3600 (as shown in FIGS. 15-16) or the pose-based calibration described in process 4000 (as shown in FIGS. 24-25). The system may adaptively select which second-stage method to use, for example employing a keypoint-based solver when sufficient keypoints are visible and a holistic pose-based solver otherwise. This two-stage approach allows for a coarse-to-fine calibration strategy, where a faster, more robust method is used initially to correct for large errors, and a more precise, but potentially more computationally intensive, method is used subsequently only when needed. This hierarchical process may be applied to the entire robot, a specific kinematic chain, or individual joints, and it may be adapted to calibrate for other kinematic parameters, such as joint angle offsets, link lengths, and link twists. The process terminates automatically when the residual falls below a convergence threshold or a predefined time budget is reached. Furthermore, other combinations of calibration methods may be deployed in a multi-stage process; for example, an initial stage using pose-based estimation for robustness may be followed by a second stage using keypoint detection for high-precision refinement, or vice versa, depending on the specific requirements of the calibration task.

F. Industrial Application

The present disclosure provides for a system and method for autonomous robot self-calibration which solves technical problems inherent in prior art calibration techniques. Pre-existing calibration methods for humanoid robots rely on external metrology equipment, such as laser trackers or physical jigs, which require precise manual alignment. These methods are factually observed to be time-consuming, prone to operator error and inconsistency, and present significant scalability challenges due to the high cost and logistical burden of deploying specialized external hardware. Furthermore, such conventional methods typically provide a static calibration at a single point in time, failing to account for kinematic drift that occurs during a robot's operational life due to component wear and environmental factors.

The disclosed system provides a direct technical solution to these problems by enabling a humanoid robot to calibrate its own kinematic structure using only its integrated sensory equipment, specifically its onboard cameras and proprioceptive sensors (e.g., joint encoders). By creating a self-contained, closed-loop system, this approach eliminates the requirement for external measurement devices, making the robot independent of specialized fixtures or controlled environments for maintaining its own accuracy.

The system comprises a specialized computer vision model, termed a Bipedal Spatial Perception Model (BSPM), which is trained to identify and determine the three-dimensional position of predefined keypoints on the robot's own body, such as on its end-effectors and feet. The BSPM is generated using a training dataset that is primarily composed of synthetic image data. This data is created by systematically and automatically varying a wide range of configurable parameters (e.g., lighting intensity and direction, robot pose, camera angles, and background textures) from a core dataset of real-world images and CAD models. This process yields a highly robust perception model specifically tailored to the robot's unique physical morphology, enabling reliable keypoint detection under diverse and unpredictable real-world operating conditions.

The calibration process involves the physical operation of the robot and the synchronized processing of data from its physical sensors. The robot is controlled to move its limbs through a series of predetermined poses, which are specifically designed to present the keypoints to the cameras across a full range of joint motion. During these movements, two distinct and time-correlated datasets are captured concurrently: a set of measurement data is recorded from the robot's internal joint encoders, representing the robot's kinematic-based configuration according to its current model, and a set of image data is captured by the robot's head-mounted cameras observing its own moving limbs, representing the ground-truth physical configuration.

The BSPM processes the captured image data to generate a perceived robot configuration by determining the precise 3D positions of the keypoints in the camera's frame of reference. An optimization algorithm then mathematically compares the perceived keypoint locations with the kinematic-based keypoint locations derived from the joint encoder data. The objective of this algorithm is to find the specific numerical offset values, or revised biases, for the robot's kinematic model that minimize the discrepancy between the visual reality and the model's predictions. These revised values are then applied directly to the robot's control system, which physically corrects for inaccuracies in the robot's movements by updating its internal understanding of its own geometry.

This autonomous self-calibration process results in a number of factual technical improvements. It provides a repeatable and rapid calibration method that can be performed without manual supervision, for instance, as an automated routine during a robot's daily startup sequence. It can also be performed continuously in the background during normal operation, allowing for real-time correction of calibration drift caused by factors like thermal expansion from motor heat, mechanical wear in gears, or minor impacts. The resulting improvement in the robot's kinematic accuracy leads to tangible and significant improvements in the performance of downstream physical tasks. By correcting small errors that would otherwise compound along the kinematic chain, the system ensures greater navigation accuracy and more precise, reliable manipulation of objects.

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one of skill in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the the humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 18/922,334, 19/000,626, 19/006,191, 19/033,973, 19/038,657, 19/064,596, 19/066,122, 19/180,106, 19/223,945, 19/224,109, 19/224,252, 19/249,517, 19/252,392, 19/252,708, 19/306,591, 19/319,712, 19/324,392, 19/323,751, 19/325,486, 19/325,415, 19/324,342, 19/329,008, 19/329,474, 19/329,485, 19/329,559, 19/337,845, 19/337,852, and 19/337,899; and (iii) U.S. Design patents application Ser. Nos. 29/889,764, 29/928,748, 29/935,680, 29/954,572, 29/967,462, 29/993,115, 29/998,761, 30/024,341, and 30/024,351; (iv) U.S. Provisional Patent Application Nos. 63/556,102, 63/557,874, 63/558,373, 63/561,307, 63/561,311, 63/561,313, 63/561,315, 63/561,317, 63/561,318, 63/564,741, 63/565,077, 63/573,226, 63/573,528, 63/573,543, 63/574,349, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,113, 63/633,405, 63/633,920, 63/633,931, 63/633,941, 63/634,042, 63/634,599, 63/634,697, 63/635,152, 63/677,087, 63/685,856, 63/690,334, 63/692,747, 63/692,765, 63/694,253, 63/694,304, 63/696,507, 63/696,533, 63/697,793, 63/697,816, 63/700,749, 63/702,185, 63/705,715, 63/706,768, 63/707,547, 63/707,897, 63/707,949, 63/708,003, 63/715,117, 63/715,270, 63/720,222, 63/722,057, 63/753,670, 63/757,440, 63/759,665, 63/760,617, 63/763,209, 63/766,911, 63/770,620, 63/770,654, 63/772,440, 63/773,078, 63/776,429, 63/792,520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this Application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A method for calibrating a humanoid robot, comprising:

obtaining a humanoid robot with a set of original kinematic biasing values;

controlling the humanoid robot through a plurality of predetermined poses automatically;

capturing image data of one or more body parts of the humanoid robot using one or more vision sensors mounted on the humanoid robot while the humanoid robot moves through the plurality of predetermined poses;

determining a set of revised kinematic biasing values by processing the image data using a bipedal spatial perception model, wherein the bipedal spatial perception model is trained using synthetic image data that contains one or more keypoints; and replacing the set of original kinematic biasing values with the set of revised kinematic biasing values.

2. The method of claim 1, wherein the one or more keypoints correspond to visually distinct geometric features on the one or more body parts.

3. The method of claim 1, wherein controlling the humanoid robot through the plurality of predetermined poses automatically comprises moving its end-effectors in defined circular motions that are within a field of view of the one or more vision sensors.

4. The method of claim 1, wherein determining the set of revised kinematic biasing values further comprises:

recording measurement data from one or more joint encoders of the humanoid robot while the humanoid robot moves through the plurality of predetermined poses;

calculating kinematic-based locations of the one or more keypoints from the measurement data;

using the bipedal spatial perception model to obtain observed-locations of the one or more keypoints from the captured image data; and using an optimization algorithm to minimize a discrepancy between the kinematic-based locations and observed-locations.

5. The method of claim 1, wherein the method is performed as an automated routine during an initialization process of the humanoid robot without manual supervision.

6. The method of claim 1, wherein the method is performed continuously in the background during normal operation of the humanoid robot.

7. The method of claim 1, wherein the method is performed to calibrate only a targeted subset of joints that were previously selected for maintenance or replacement, while kinematic biasing values for all other joints remain fixed.

8. The method of claim 1, wherein the bipedal spatial perception model determines the revised kinematic biasing values without obtaining measurement data.

9. The method of claim 1, wherein determining the set of revised kinematic biasing values comprises:

using the bipedal spatial perception model to estimate a six-degree-of-freedom (6-DoF) pose of the one or more body parts from the image data;

calculating a kinematic-based pose from measurement data obtained from one or more joint encoders of the one or more body parts; and using an optimization algorithm to minimize a residual between the estimated 6-DoF pose and the kinematic-based pose.

10. The method of claim 1, further comprising performing an extrinsic calibration of the one or more vision sensors prior to said capturing image data, said extrinsic calibration comprising:

(i) positioning at least one of the one or more body parts in a static pose to serve as a calibration target; and (ii) controlling the humanoid robot to move the one or more vision sensors relative to the calibration target.

* * * * *